US008132121B2

(12) United States Patent
Risch et al.

(10) Patent No.: US 8,132,121 B2
(45) Date of Patent: Mar. 6, 2012

(54) MULTIDIMENSIONAL STRUCTURED DATA VISUALIZATION METHOD AND APPARATUS, TEXT VISUALIZATION METHOD AND APPARATUS, METHOD AND APPARATUS FOR VISUALIZING AND GRAPHICALLY NAVIGATING THE WORLD WIDE WEB, METHOD AND APPARATUS FOR VISUALIZING HIERARCHIES

(75) Inventors: John S. Risch, Kennewick, WA (US); Scott T. Dowson, West Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 974 days.

(21) Appl. No.: 12/057,086

(22) Filed: Mar. 27, 2008

(65) Prior Publication Data
US 2008/0270946 A1 Oct. 30, 2008

Related U.S. Application Data

(62) Division of application No. 10/690,307, filed on Oct. 20, 2003, now Pat. No. 7,373,612.

(60) Provisional application No. 60/420,241, filed on Oct. 21, 2002.

(51) Int. Cl.
*G06F 13/00* (2006.01)
*G06F 15/00* (2006.01)
(52) U.S. Cl. .................... 715/850; 715/848; 715/851
(58) Field of Classification Search .......... 715/762–765, 715/713–715, 848–853, 840
See application file for complete search history.

(56) References Cited

U.S. PATENT DOCUMENTS

| | | | |
|---|---|---|---|
| 5,295,243 A * | 3/1994 | Robertson et al. | 715/848 |
| 6,243,093 B1 | 6/2001 | Czerwinski et al. | |
| 6,711,577 B1 * | 3/2004 | Wong et al. | 707/694 |
| 7,895,191 B2 * | 2/2011 | Colossi et al. | 707/717 |

OTHER PUBLICATIONS

Risch, J.S., et al., The STARLIGHT Information Visualization System, Proceedings of 1997 IEEE International Information Visualization Conference, Aug. 27-29, 1997, 9 pgs.
Webpage http://www.i2.co.uk/Products/Analysts_Note/Default.asp, Analyst's Notebook, i2 Ltd., Sep. 22, 2003, 4pgs.
Webpage, http://www.spotfire.com/products/decision.asp, Spotfire DecisionSite, Spotfire, Inc., Sep. 22, 2003, 5pgs.
Webpage, http://esri.com/software/aregis/, ArcGIS is a scalable system of software for geographic data fore every organization . . . , ESRI, Sep. 22, 2003, 13 pgs.
Webpage, http://map.net/, Visual Net Improves the Value of your Database, Antarctica Systems, Inc., Sep. 22, 2003, 1 page.
Webpage, http://222.entrieva.com/entrieva/index.htm, Active Information Discovery, Entrieva, Inc., Sep. 22, 2003, 7 pages.
Risch, J.S., et al., A virtual Environment for Multimedia Intelligence Data Analysis, IEEE Computer Graphics and Applications, pp. 33-41, 1996.
Inselberg, A., et al., Parallel Coordinates: A Tool for Visualizing Multi-Dimensional Geometry, IEEE—Proceedings of Visualization, 90, pp. 361-378, 1990.

* cited by examiner

*Primary Examiner* — Cao "Kevin" Nguyen
(74) *Attorney, Agent, or Firm* — A J Gokcek

(57) ABSTRACT

A method of displaying correlations among information objects includes receiving a query against a database; obtaining a query result set; and generating a visualization representing the components of the result set, the visualization including one of a plane and line to represent a data field, nodes representing data values, and links showing correlations among fields and values. Other visualization methods and apparatus are disclosed.

28 Claims, 49 Drawing Sheets

| Relationship Type: | General Similarity | Explicite Reference | Field Value Co-occurrence | Parent/ Child | Spatial | Temporal |
|---|---|---|---|---|---|---|
| Model Type: | Vector-Space | Network | Multidimensional Index | Hierachical | Spatial | Ordinal Index |
| | ○ ○ ○ ○ ○ ○ ○ | ○─○─○ ○─○─○─○ ○ | Name: Pete Age: 27 | ○ ○ ○ ○─○ ○ | ○ ○ ○ | ↑ ○ ○ ○ |
| Examples: | Reports, articles, DB record's | References and citations, hyperlinks | DB records, document metadata | File paths, toxonomies, IP addresses | Geolocations, CAD models | Event descriptions |
| | 40 | 42 | 44 | 46 | 48 | 50 |

*Fig. 2*

| Items | Rel. | Date | EventPlacename | EventType | Crime Group | MaterialType | MaterialForm |
|---|---|---|---|---|---|---|---|
| Incident00587 | – | 199802-Feb-09 12:00 | Country01, City | Seizure | Preditory | Uranium235 | Bar |
| Incident00588 | – | 199802-Feb-11 12:00 | Country02, City | Theft | – | Radioactive | Scrap |
| Incident00589 | – | 199802-Feb-14 12:00 | Country03, City | Seizure | – | Radioactive | Scrap |
| Incident00590 | – | 199802-Feb-17 12:00 | Country04, City | Investigation | Mafia | Radioactive | Scrap |
| Incident00591 | – | 199802-Feb-19 12:00 | Country05, City | Seizure | – | Uranium | Ore |

Incident00590

SHEILD Nuclear Smuggling Incident

Incident 590

Event Date: 14 February 1998
Chronology Number: 401

Event Type: Seizure
Event Location: City Country03
Transportation Method: Truck
Law Enforcement Involvement: City Country officers Material Type: Radioactive                Material Form: Scrap Event Description:
City officers on the Country03 border crossing (with Country07) stopped a truck with trailer carrying 'radioactive' scrap iron (439 above).

Comments:
Cel #539 above

Source[s]:
[FBIS Report Environment Issues]: Officials Stop Radioactive Cargo on Border with Country03

Fig. 15

Nuremberg Trials
International Military Tribunal set to try Nazi officials for actions committed during World War II.
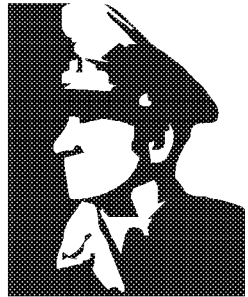
Baldur von Schirach
Karl Donitz
Hans Frank
Frick Wilhelm
Herman Goring
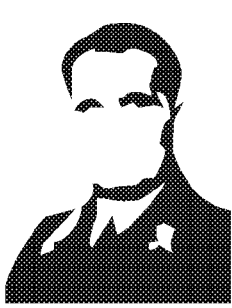
Rudolf Hess
Ernest Kaltenbrunner
Wilhelm Keitel
Erich Raeder
Alfred Rosenberg
Fritz Sauckel
Julius Streicher
*Fig. 23*

MULTIDIMENSIONAL STRUCTURED DATA VISUALIZATION METHOD AND APPARATUS, TEXT VISUALIZATION METHOD AND APPARATUS, METHOD AND APPARATUS FOR VISUALIZING AND GRAPHICALLY NAVIGATING THE WORLD WIDE WEB, METHOD AND APPARATUS FOR VISUALIZING HIERARCHIES

CROSS REFERENCE TO RELATED APPLICATION

This application is a divisional of U.S. Ser. No. 10/690,307, U.S. Patent Publication Number 2004-0090472 A1, filed on Oct. 20, 2003, now U.S. Pat. No. 7,373,612 which claims priority to U.S. Provisional Application Ser. No. 60/420,241, filed Oct. 21, 2002. Both applications are incorporated herein by reference.

GOVERNMENT RIGHTS

This invention was made with government support under contract number DE-AC0676RLO1830 awarded by the U.S. Department of Energy. The Government has certain rights in the invention.

TECHNICAL FIELD

The invention relates to information visualization systems and methods. More particularly, embodiments of the invention relate to the use of computer-supported, interactive, visual representations of abstract data to amplify cognition and to information system that graphically depict their contents for analytical purposes.

BACKGROUND OF THE INVENTION

Information visualization systems are known in the art. Information visualization is the use of computer-supported, interactive, visual representations of abstract data to amplify cognition.

The advantages of using visual metaphors to facilitate identification of relationships within complex data are increasingly being recognized.

Various visualization techniques are known in the art. A CIA Office of Research and Development project ("P1000") eventually spawned software known as SPIRE and other text visualization techniques developed by the Information Systems and Engineering (IS&E) organization of the assignee of the present invention. This work, in turn, built upon earlier visualization work pioneered by the bibliometrics community in the early 1990's. Other existing visualization products are Analyst's Notebook by i2, Ltd.; Spotfire DecisionSite by Spotfire, Inc.; ArcGIS by ESRI, Inc.; Visual Net by Antarctica Systems, Inc.; and SmioMap by Entrieva.

In addition, there exists considerable prior art related to the graphical representation of hierarchical structures. Many of these use 2D or 3D radial layout approaches. These include the "cone tree" representation described in U.S. Pat. No. 5,295,243, titled "Display of hierarchical three-dimensional structures with rotating substructures."

What is needed is a system and method that takes an integrated approach to visualization, for visually analyzing a variety of information types, or that addresses shortcomings of the prior art offerings.

SUMMARY OF THE INVENTION

Some embodiments of the invention provide a method of displaying correlations among information objects comprises receiving a query against a database; obtaining a query result set; and generating a visualization representing the components of the result set, the visualization including one of a plane and line to represent a data field, nodes representing data values, and links showing correlations among fields and values.

Other embodiments of the invention provide a text visualization method comprising receiving vectors that characterize conceptual content of a plurality of text documents, each document being represented by a vector of arbitrary length; and displaying a multi-dimensional representation of the document collection that conveys information about topics and subtopics described by the plurality of text documents, each document being represented by a multi-dimensional glyph, the displaying including sorting the glyphs into groups and arranging the groups into clusters such that clusters containing documents that are conceptually similar are located together in near proximity.

Other embodiments of the invention provide a method comprising generating a graphical representation of an Internet directory structure, the Internet directory structure having characteristics, the generating including providing a shaded-relief terrain image as a visual metaphor for the Internet directory structure, the shaded-relief terrain image having characteristics representing the characteristics of the Internet directory structure.

Other visualization methods and apparatus are provided.

BRIEF DESCRIPTION OF THE DRAWINGS

Preferred embodiments of the invention are described below with reference to the following accompanying drawings.

FIG. 2 is a chart illustrating major components of an information model according to some embodiments of the invention.

FIG. 15 is a screen shot of an example database record that has been formatted for display using an XML stylesheet.

FIG. 23 is a screen shot showing an example of digital imagery as a type of spatial information supported in various embodiments.

FIG. 47a illustrates a downprojection of directory centroids via MDS. FIG. 47b illustrates establishment of directory region areas, FIG. 47c illustrates triangulation of centroids and initialization of force-directed placement routine, and FIG. 47d results of force-directed layout. The procedure continues recursively, generating layouts for the subdirectories of the root-level directories in a similar fashion.

DETAILED DESCRIPTION OF THE PREFERRED EMBODIMENTS

Introduction

Figure 1:
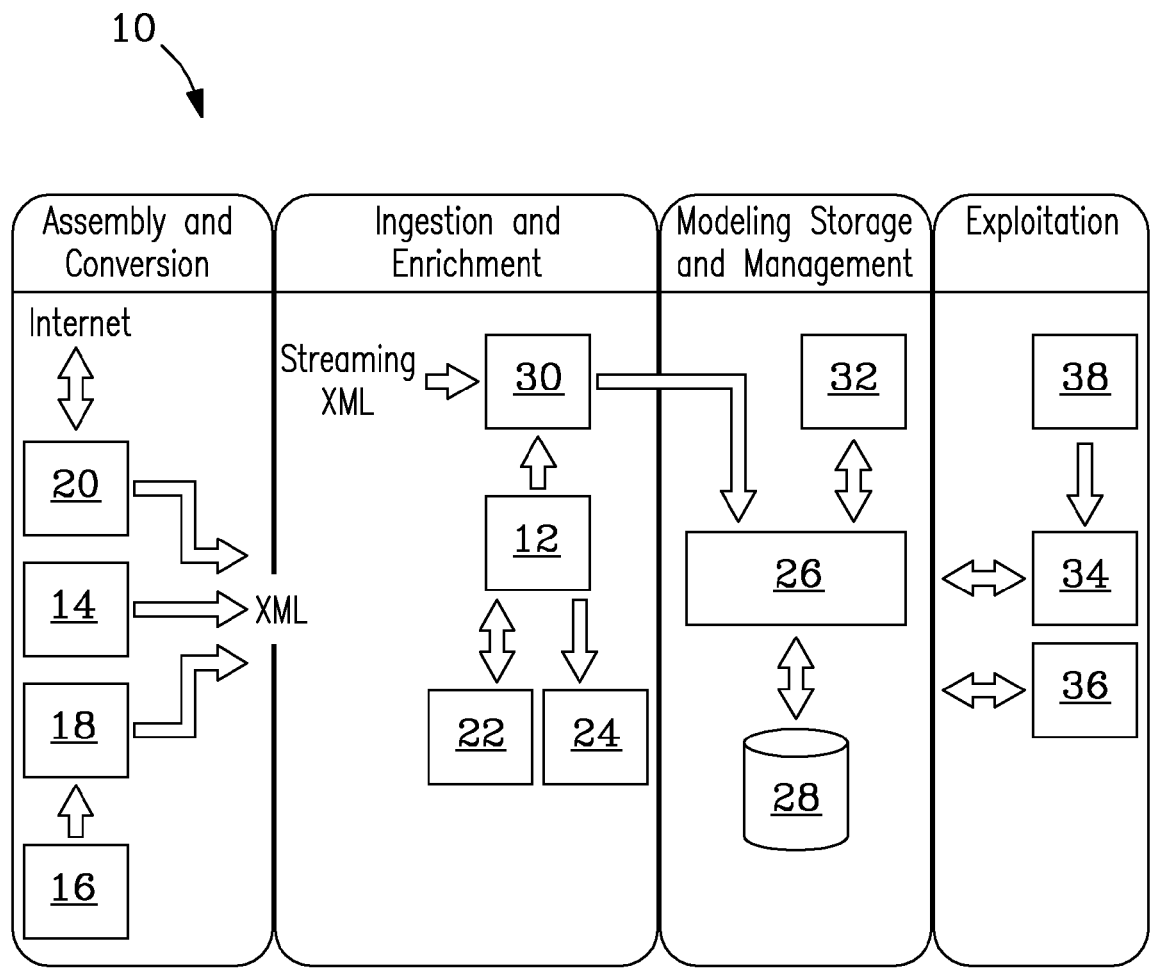
FIG. 1 is a block diagram of a system embodying various aspects of the invention.

Disclosed herein are various embodiments of a system 10 that couples information modeling and management functionality with a visualization-oriented user interface. This approach makes relationships that exist among the items in the system 10 visible, enabling exciting and powerful forms of information access, exploitation, and control.

In some embodiments, a single, integrated, information system 10 is provided capable of a variety of different types of information visualization capabilities and capable of supporting a wide range of analytical functions. This system's visualization tools employ a common XML-based information model capable of effectively capturing multiple types of relationships that may exist among information of disparate kinds. Together, these features enable the concurrent visual analysis of a wide variety of information types. The result is a system capable of both accelerating and improving comprehension of the contents of large, complex information collections.

The motivation for visualization will now be explained. Consider an arbitrary set of "information objects," for example, a collection of Web pages or database records, or perhaps a group of related email messages. The inventors argue that such a collection is potentially useful and valuable because it can be used to help solve problems and, further, that its value for problem solving lies in one or both of two places: (1) within individual items (i.e., taken in isolation); and (2) in the relationships among the items.

Deriving value of the first sort is an information retrieval problem: a matter of finding and examining the item or items that have a certain property. Deriving value of the second type is an information analysis problem. Human cognitive analysis is largely a matter of comparison: comparing various properties of items with one-another, and comparing such properties with prior knowledge. As the volume and complexity of information increases, however, human ability to make these kinds of comparisons mentally degrades rapidly. Visualization technologies can effectively reverse this trend.

Visualization is a potentially powerful tool for information analysis because it enables humans to make rapid, efficient, and effective comparisons. A good rule of thumb to use when evaluating visualization designs is to ask two questions: 1) What information does this design let me compare?, and 2) How easy is it to make the comparison?

In practical terms, enabling "visual" analysis of information is a two-step process. First, the relationships that exist among information objects are captured in a computer-manipulable form. Relationships are captured in a digital construct (such as a data structure) generically referred to as an information model. The information model of the system 10 is capable of accommodating a wide variety of relationship types, including discrete property (i.e., field/value pair), co-occurrences, free-text similarity, temporal relationships, parent-child associations, network relationships, and spatial (e.g., geospatial) relationships.

After this is achieved, interactive graphical representations of the relationships are generated for analytical purposes.

In some embodiments, the model is designed to capture relationships among XML objects. Because the model is designed to capture relationships among XML objects, it can flexibly accommodate the full range of information types expressible in XML (i.e., almost any type of digital information). Finally, the model is human-oriented, explicitly designed for capturing and manipulating the types of relationships humans need to understand in order to solve complex, multifaceted, real-world problems.

After relationships have been explicitly captured, the system 10 can generate graphical representations of various aspects of the model that enable the underlying relationships to be visually interpreted. In some embodiments, visualizations are interoperable, enabling viewers to interactively move among multiple representations of the same information in order to uncover correlations that may span multiple relationship types. For example, email messages can be related to one another in a number of different ways. There may be topological relationships among the senders and recipients. There may be conceptual similarities among the message contents, or temporal correlations among the messages. Different email messages may even mention different places that are, in fact, physically near one-another: a spatial correlation.

To illustrate the potential power of this approach, consider again an arbitrary collection of email messages. A user of the system may choose to graphically depict such "email spaces" in any of a number of different ways, depending on the problem he or she is trying to solve at any given moment. An analyst may initially wish to view the collection as a network diagram in which the emails are portrayed as edges connecting nodes that represent senders and recipients. This method enables the viewer to identify important topological relationships among individuals based on "who sent what to whom." After a particular subset of email had been identified based on its network topology, an analyst might switch to a "conceptual" representation of the same information that summarizes the concepts described in the items of interest. Following that, the user could switch the display to another alternate representation that spatially groups the items according to author or recipient. In this way, even extremely complex and multifaceted relationships that exist in the collection can be quickly and easily characterized and assimilated.

The following is an overview of the system's design and functionality. This includes descriptions of the system's principal features and general software architecture, as well as an explanation of the system's visualization capabilities and the underlying information model that supports them.

Overview

The system 10 is an information visualization system; that is, an information system that has been designed to support the visual analysis of relationships among the contents of information collections. As an information system, it incorporates some functions for ingesting, storing, retrieving, and otherwise managing information. Beyond this, the system also generates graphical representations of the information in the system. Further, these representations are designed to enable software users to visually compare multiple aspects of the information simultaneously, to graphically interact with the represented information, and to smoothly move among a variety of different visual information analysis tasks.

Some embodiments provide features such as a visualization-oriented user interface, information graphics, advanced information model, sophisticated query tools, text information extraction engine, data/text mining functionality, integrated geographic information system, extensible markup language based system, client-server software architecture, MS Windows NT/2000/XP platform. Benefits provided by some embodiments include information integration, complexity management, holistic analysis, workflow continuity, accelerated interpretation, and improved understanding.

System Architecture

In the embodiment illustrated in FIG. 1, the system 10 includes components organized into four major functional classes. On the left hand side of the diagram are components for assembling and ingesting collections of XML documents and specifying how they are to be modeled by the system. Towards the right are components for generating and managing the models, and for enabling users to exploit them.

Within these divisions, the major functional components of the system 10 include a construction wizard 12, an XML preprocessor 22, a server 26, and a client 34. The construction wizard 12 is a utility for specifying how a particular collection of XML documents is to be processed into a database known as an InfoSet. The construction wizard 12 receives as inputs native XML 14, non-XML data 16 via a conversion utility 18, or information from the Internet via a Netscanner utility 20. The construction wizard 12 also receives doctype processing instructions 24.

In the illustrated embodiment, the XML preprocessor 22 performs a variety of XML enhancement operations including information extraction, place-name geo-referencing, and date-time normalization.

The server 26 performs information modeling, and storage and retrieval. The server 26 is in communication with an infoset store 28, an update service 30, and a server administration component 32.

The client 34 is the component that incorporates the system's visualization and analysis functionality.

In some embodiments, the system 10 includes a collection of Windows 2000 applications and services configured in a client-server architecture. Consequently, the various components of the system can be deployed in a variety of configurations in a networked Windows environment. While all of the components will run on more-or-less "stock" Windows 2000 platforms, certain items can benefit from more advanced hardware. For example, for optimal performance, the Client should include high-performance OpenGL graphics acceleration hardware. Both the Client and Server are heavily multithreaded, so can take advantage of multiprocessor PC hardware. Following is a list of recommended hardware for a variety of configurations.

To better enable one of ordinary skill in the art to make and use the system, specific hardware configurations of clients and server will now be described. It should be kept in mind, however, that a wide variety of alternatives is possible.

A. Stand-Alone Workstation
Dual PIII (or better) 1+ GHz CPUs
1+ GB RAM
3D Graphics Accelerator Subsystem, one of:
High-end: 3Dlabs Wildcat III 6210 (preferred)
Mid-range: ELSA Gloria4 or ATI FireGL 8800
Low-end: GeForce4 Ti 4600
Monitor(s), one of:
Sony GDM FW900 (16:10 widescreen) or equivalent
Dual 21" LCD or CRT Monitors
30+ GB Storage
CDROM Drive
Wheel Mouse (Microsoft Intellimouse Explorer preferred)
Windows NT Workstation or Windows 2000 Professional (preferred)
Server, Preprocessor, and Client Software
Note: Inventors recommend a dual-processor Dell Precision 530 workstation with the Wildcat III 6110 graphics option and the Sony GDM FW900 monitor (purchased separately)

B. Dedicated Server
Dual or Quad PIII (or better) 1+ GHz CPUs
2+ GB RAM
21" Monitor
100 GB+ RAID Storage
CDROM Drive
Windows NT Server or Windows 2000 Server (preferred)
Server and Preprocessor Software C. Client-Only Workstation
Single or Dual (preferred) 1+ GHz CPU
512+ MB RAM
3D Graphics Accelerator Subsystem, one of:
High-end: 3Dlabs Wildcat III 6210 (preferred)
Midrange: ELSA Gloria4 or ATI FireGL 8800
Low-end: GeForce4 Ti 4600
Monitor(s), one of:
Sony GDM FW900 (16:10 widescreen) or equivalent (preferred)
Dual 21" LCD or CRT Monitors
30+ GB Storage
CDROM Drive
Wheel Mouse (Microsoft Intellimouse Explorer preferred)
Windows NT Workstation or Windows 2000 Professional (preferred)
Client Software
Note: Inventors recommend a dual-processor Dell Precision 530 workstation with the Wildcat III 6110 graphics option and the Sony GDM FW900 monitor (purchased separately)

D. Laptop
DELL PRECISION™ MOBILE WORKSTATION M50
nVidia Quadro4 500 GoGL Graphics
512 MB RAM
48 GB HD
Wheel Mouse (Microsoft Intellimouse Explorer preferred)
Windows 2000 Professional
Server, Preprocessor, and Client Software
Optional secondary LCD display (recommended): EIZO NANAO FlexScan L771 19.6"

Various embodiments of the system 10 also include a number of supporting utility applications. These include utilities for harvesting information from the Internet (e.g., Netscanner utility 20), utilities for preparing geospatial, terrain, digital images, and other spatial resources 38 for ingestion, and for monitoring server activity. Additional components include Java-based (for example) "thin-clients" 36 that encapsulate selected subsets of system functionality in a form that can be run on a range of computer platforms.

Collectively, these components are directed towards helping users discover and interpret correlational patterns that may exist among the contents of large information collections. The first part of this process is to identify and capture these relationships in an exploitable form. This is described below.

Information Model

Before information can be exploited by a user, graphically or otherwise, it is captured and related in some way. The term for a generic description of information entities, properties, and relationships is "information model." The information model adopted by an information system can define and constrain its capabilities. The inventors believe that any system intended to promote information interpretation should employ an information model that captures information semantics as accurately as possible, with minimal loss or distortion.

The information model centers on the concept of "information objects," the basic units, or "packages," of information handled by the system. These objects may correspond to text documents, image or video metadata, event descriptions (e.g., news stories or intelligence reports), relational database records, web pages, or just about any other text-based information. In the illustrated embodiment, the system 10 is based on Extensible Markup Language (XML). Thus, the term "information object," as used here, describes the contents of an arbitrary XML element. XML's flexibility can enable it to serve as a sort of lingua franca, a common information format that enables diverse types of information objects to be treated in a consistent way. Additionally, the inventors suggest that an information model based natively on XML is also capable of more accurately capturing, preserving, and relating information semantics than other approaches.

XML is increasingly becoming the format of choice for data transfer, and increasing numbers of applications support XML as either a native or export data format. If a user's data is not in XML, they should first, check to see if the information system or applications software you are currently using to process your data supports XML as an export format. For example, Oracle has supported XML export for some time now; Microsoft Access and Excel 2002 also now support XML output. Large quantities of data still reside in legacy databases that are "XML unaware," however. The user can output data as ASCII text (if it isn't in that format already), then use a commercial data conversion utility (such as Data Junction Integration Studio, from Data Junction Corporation) to convert it to XML. Note that this process will typically involve an information extraction stage, to locate particular text components of interest and associate them with appropriate XML elements (for example Author, Title, and Date), as well as an XML structuring stage. While the information extraction stage isn't strictly required (for example, a naïve conversion could be used that simply "wraps" the entire source text in a single XML root element), clearly the more structure that can be derived, the more valuable the information becomes. For highly complex or mission-critical data, we recommend the development of a custom parser (e.g., a PERL script or dedicated software application) to ensure accurate conversion. In some embodiments, the system 10 includes with several utilities for converting a number of standard data formats (e.g., HTML) to XML.

As previously stated, information models describe relationships among information objects and their properties. Consider the ways in which the elements of an arbitrary information collection may be related. They may have common structured or discrete (i.e., field-value pair) properties. They may contain free text sections that describe the same, or similar, concepts. They may be organized into related categories in some kind of ontology. They may explicitly reference each other. They may mention proximal geographic locations, or have been published on the same, or consecutive, or widely separated dates. Any of these (or other possible) relationships, as well as the actual contents of specific items, may be germane to the solution of a particular problem. An ideal information model is capable of explicitly capturing all such relationships, so that key pieces of information can be rapidly and precisely retrieved, and so that important trends and patterns can be identified.

The major components of an information model according to aspects of the invention are shown in FIG. 2. In the illustrated embodiment, the information model is a hybrid model of a number of submodels, each designed to capture a specific type of relationship that may exist between information objects in a given information collection. The inventors place no constrains on the properties of the objects themselves, only relationship types are predefined.

A particular instance of a collection of information objects and its corresponding information model is commonly called a database. The system includes utilities for processing collections of arbitrary XML documents into databases, which are referred to herein as information sets or InfoSets, a more generic term intended to reflect their potentially heterogeneous compositions. After an InfoSet has been constructed, it is ready for exploitation.

FIG. 2 shows that a vector space model 40 is used for a general similarity relationship type (e.g., reports, articles, database records), a network model 42 is used for an explicit reference relationship type (references, citations, hyperlinks), a multidimensional index model 44 is used for a field/value co-occurrence relationship type (database records, document metatags), a hierarchical model type 46 is used for a parent/child relationship type (file paths, taxonomies, IP addresses), a spatial relationship type 48 is used for spatial models (geolocations, CAD models), and an ordinal index model 50 is used for a temporal relationship type.

Visualization Capabilities

A basis of the invention is the conviction that the human mind is an unparalleled pattern recognition engine, and that the visual channel is the most efficient and highest bandwidth interface to that engine. The inventors feel that the key to harnessing this power for problem solving is to first capture information relationships in semantically meaningful ways, and then to present these relationships in intuitive graphical forms. As a consequence of this philosophy, visualization techniques are used pervasively throughout the system.

Information graphics of the system 10 are classified according to the type of information they portray. The two major divisions are:

(1) non-spatial information graphics, which are spatial representations (or "spatializations") of non-spatial information such as text and numeric data (i.e., the contents of InfoSets), and
(2) inherently spatial information graphics, which are depictions of information containing intrinsic spatial coordinates, such as geospatial or CAD data.

In some embodiments, the system 10 is able to integrate these two types of information so that they may be analyzed together.

Non-spatial information graphics are pictorial representations of information models. Representations of non-spatial information fall into two distinct categories. These include Global Information Views, which are graphical representations of entire information collections, and Local Information Views, which are representations of some limited subset of the information under study. Global Views are presented in a virtual 3D display environment called the Information Space. Local Views portray more detailed information about fewer items, are generated in response to a query operation of some kind, and are presented in independent windows within the Client application.

Inherently spatial (or just spatial) information, as previously stated, is information that has explicitly defined spatial coordinates associated with it. Such information typically consists of collections of spatial features (objects) of some kind that may have associated non-spatial attributes. The system 10 can correlate non-spatial information objects with inherently spatial objects if they share non-spatial attributes, or if non-spatial objects have spatial attributes.

Information Space

The system 10's main visualization venue is a 3D virtual display area called the Information Space, or I-Space. The primary function of the I-Spaces is to host graphical representations of entire InfoSets (that is, of Global Information Views). I-Spaces and their contents are presented in display windows called I-Space Views. I-Space Views display the contents of an I-Space from a particular 3D vantage point. The virtual position and orientation of these vantage points can be interactively maneuvered (or "flown") throughout the I-Space display region to enable the selective display of features of interest. In this way, system users can interactively control the amount of detail the display presents.

Information Space displays serve at least three purposes. First, they show large-scale patterns of relationships among the individual components of information collections. This enables viewers to get a sense of the overall "form" or trend of particular aspects of the collection. Secondly, they provide a mechanism for evaluating individual items in relation to this overall form, that is, for placing specific items within the context of the whole. Finally, in addition to relationships between individual items and overall trends, I-Space displays can also show specific relationships among particular items of interest. In this way, the system can enable the visual comparison of multiple relationships among large numbers of items while enabling users to maintain a sense of the contextual relevance of those items.

Figure 3:
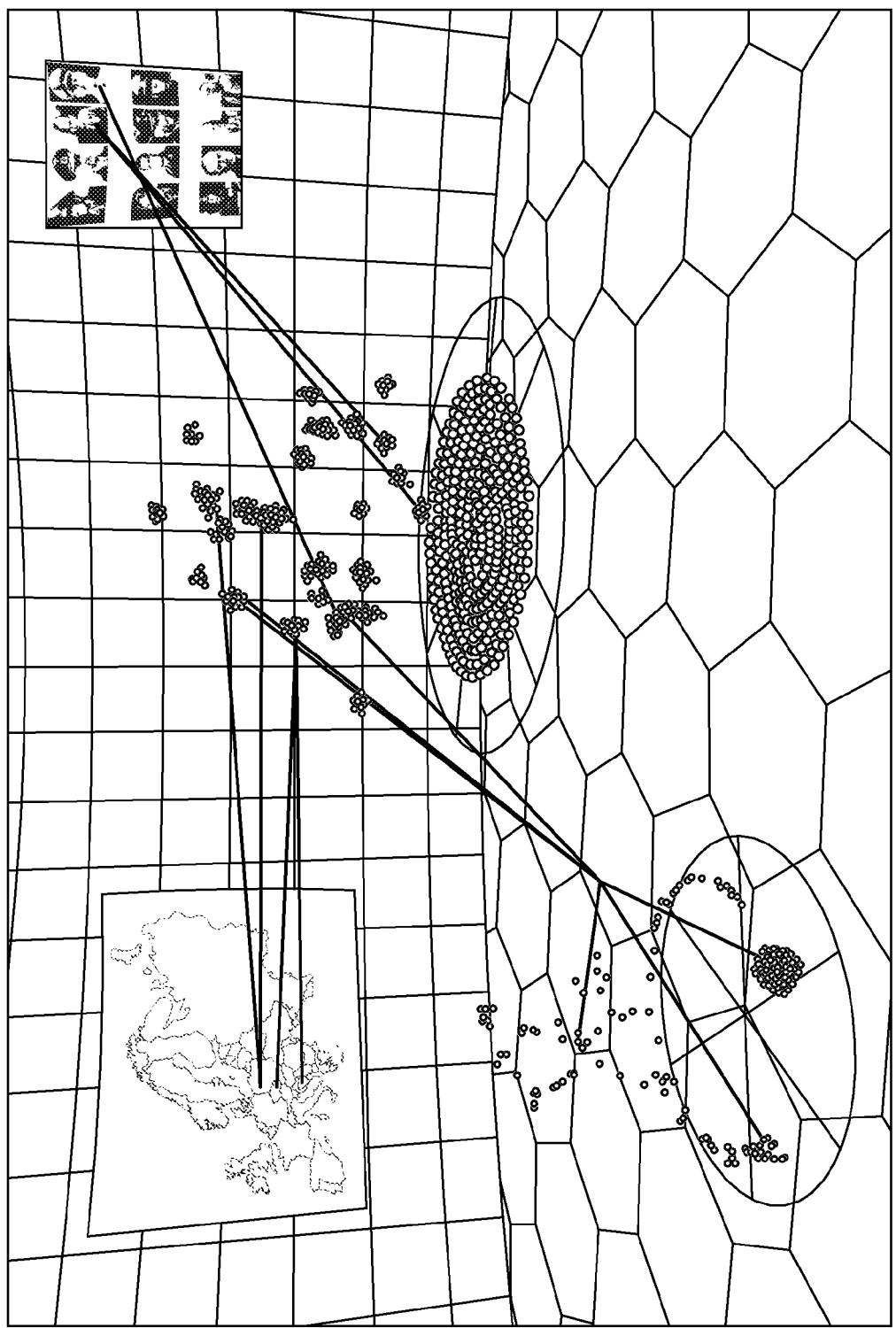
FIG. 3 is a screen shot of an Information Space according to some embodiments of the invention.

I-Spaces typically contain (see FIG. 3) one or more of the following graphical features:
(1) I-Space Bounds—The boundaries of the I-Space are delineated by a pair of graphical features termed the I-Space Wall and Deck. The I-Space Deck serves as the "floor" of the display, providing a visual ground plane for orientation purposes. The lateral extents of the I-Space are delimited by the Wall, a curved, circular partition that surrounds the main display area. In addition to marking the extents of the display, the Wall and Deck can both host displays of other information, such as maps or images used to provide graphical contexts for the information under study.

(2) Information Object Representations—The I-Space typically contains graphical representations of information managed by the system 10. Each individual piece of information is represented by a glyph, a 3D graphical object that signifies a discrete "information object" contained within an InfoSet, or information collection. Collections of glyphs are typically arranged in 3D spatial configurations to portray relationships that exist among the objects in a collection. Glyph colors and shapes can be selectively assigned to depict various properties of the information objects they represent. Glyphs can also be highlighted if their corresponding information objects fall in Content Query results of interest.

(3) Information Collection Representations—In the illustrated embodiment, every InfoSet has a corresponding content-specific information model. Depending on the type of information in the collection, and the type of submodels selected at the time of InfoSet construction, a particular InfoSet will have one or more associated graphical representations. These are described more fully below. Note that multiple InfoSet Representations can be loaded into an Information Space simultaneously so that their contents can be jointly analyzed.

(4) Link Displays—The Information Space may also include Link Displays, patterns of lines connecting information objects that share specific discrete (i.e., structured) properties. Link Displays in the Information Space are controlled via a corresponding Link Array, which is described below. Link Arrays, in turn, are generated in response to an Association Query operation. Note that these displays can connect items in multiple independent InfoSets, providing a mechanism for uncovering discrete property correlations that span more than one information collection. Additionally, multiple Link Displays can be presented in the Information Space simultaneously, enabling the results of multiple Association Query operations to be compared with one another.

(5) Spatial Information—In addition to displays of information contained within InfoSets, a variety of "inherently spatial" information types can also be displayed in the I-Space. These items, termed Ancillary Information Resources (AIRs), are typically used to provide graphical context for the properties of InfoSet Elements (individually or collectively). Examples of AIRs include maps, terrain models, digital images, and 3D CAD models. While such items can be the primary foal point of analysis, they typically play a supporting role to the analysis of text-based information.

Global Information Views

Global Information Views are graphical representations of entire information collections (that is, of InfoSets) that depict various types of relationships between the information objects in such collections. Because no single representation can effectively portray all possible relationships in a given InfoSet, InfoSets are polymorphic, in the sense that an InfoSet can be represented by more than one graphical form. The particular forms that an InfoSet may take depend on the types of relationships that have been captured in the information model for that particular collection. A user may switch between these various representations at will during the course of an analysis session, depending on his or her immediate need.

In the illustrated embodiment, the system 10 has four types of Global Information Views. These include Discrete Views, which portray discrete property (i.e., field/value pair) co-occurrences; Concept Views, which portray conceptual or topical similarity among item free-text content; Hierarchical Views, which depict explicitly defined parent-child relationships among items; and Network Views, which portray explicit item-to-item references.

Global Information Views share a number of characteristics. InfoSets are portrayed in an Information Space as collections of glyphs, each of which represents a discrete item (e.g., Web page, database record, text document) in the collection. These glyphs can be color- or shape-encoded to reflect various discrete properties of the information objects they represent, and their currently assigned colors and shapes are maintained from one InfoSet representation to the next as a user switches among various Views. The glyphs may also be highlighted to indicate that their corresponding information objects are part of a result set for a Content Query, and this highlighting is also maintained across InfoSet representations. The glyphs may also be highlighted to indicate that their corresponding information objects are part of a result set for a Content Query, and this highlighting is also maintained across InfoSet representations. In each of the four View types, the various relationships among their constituent items are depicted via some 3D spatial arrangement of the corresponding glyphs. These glyph configurations may be supported by additional 3D graphical constructs that make certain aspects of the inter-object relationships more clear. The four Global Information Views differ chiefly in the particular way their glyphs are arranged, the supporting graphical frameworks they employ, and the way they emphasize or de-emphasize particular items in response to query operations.

The four types of Global Information Views are described in more detail below.

Discrete Property Views

The simplest type of Global Information View supported by the system is the Discrete Property View, also known as the Data Sphere. These types of information representations enable users to sort information objects into various groups based on shared discrete (i.e., field/value pair) properties, so that users can perceive such groups as independent objects in their own right. These groups are distributed over the surface of a sphere in order to minimize ambiguous line crossings in concurrently presented Link Displays. In some embodiments, objects may be dynamically regrouped according to the contents of any single-valued field that has no more than 200 unique values.

Figure 4:
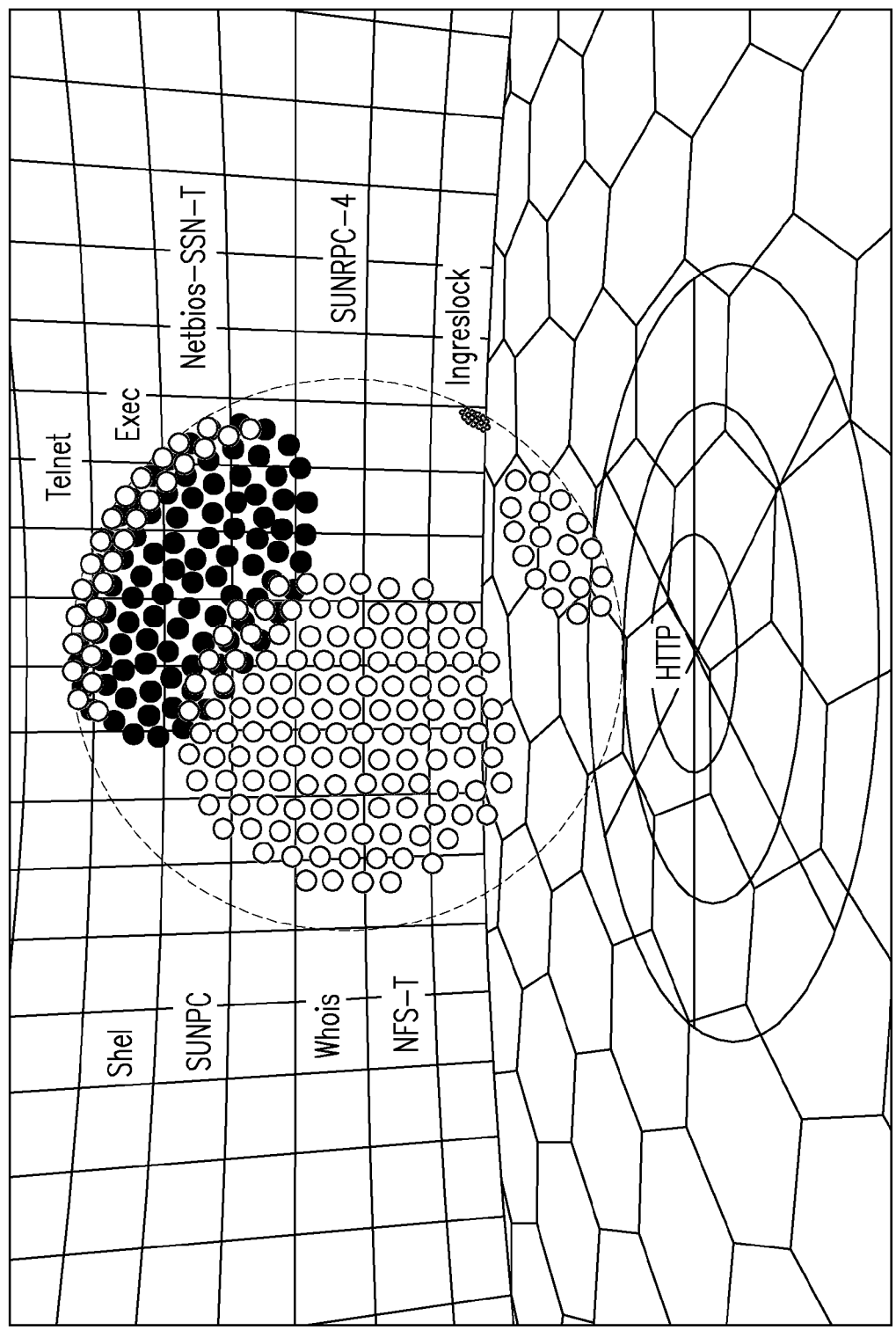
FIG. 4 is a screen shot of a visualization of a collection of records generated by a computer network intrusion detection system (IDS).

FIG. 4 shows, as an example, a collection of approximately 12,000 records generated by a computer network intrusion detection system (IDS). The IDS records have been sorted into primary groups according to the network service involved, with a secondary sorting by time spiraling outwards from the center of each group. In the illustrated embodiment, they have been color-encoded according to degree of intrusion event severity, ranging from dark blue to light blue for the least to moderately critical events, with the most critical events ranging from yellow, through orange, to red for the most severe. The display clearly shows that the three services responsible for the most events were, in order, telnet (the large group at the top rear), smtp, and ftp. Note the interesting temporal/criticality correlations in the smtp grouping at the front of the sphere. These correlations can be quickly explored in more detail by generating a Link Array from the contents of this group.

Figure 5:
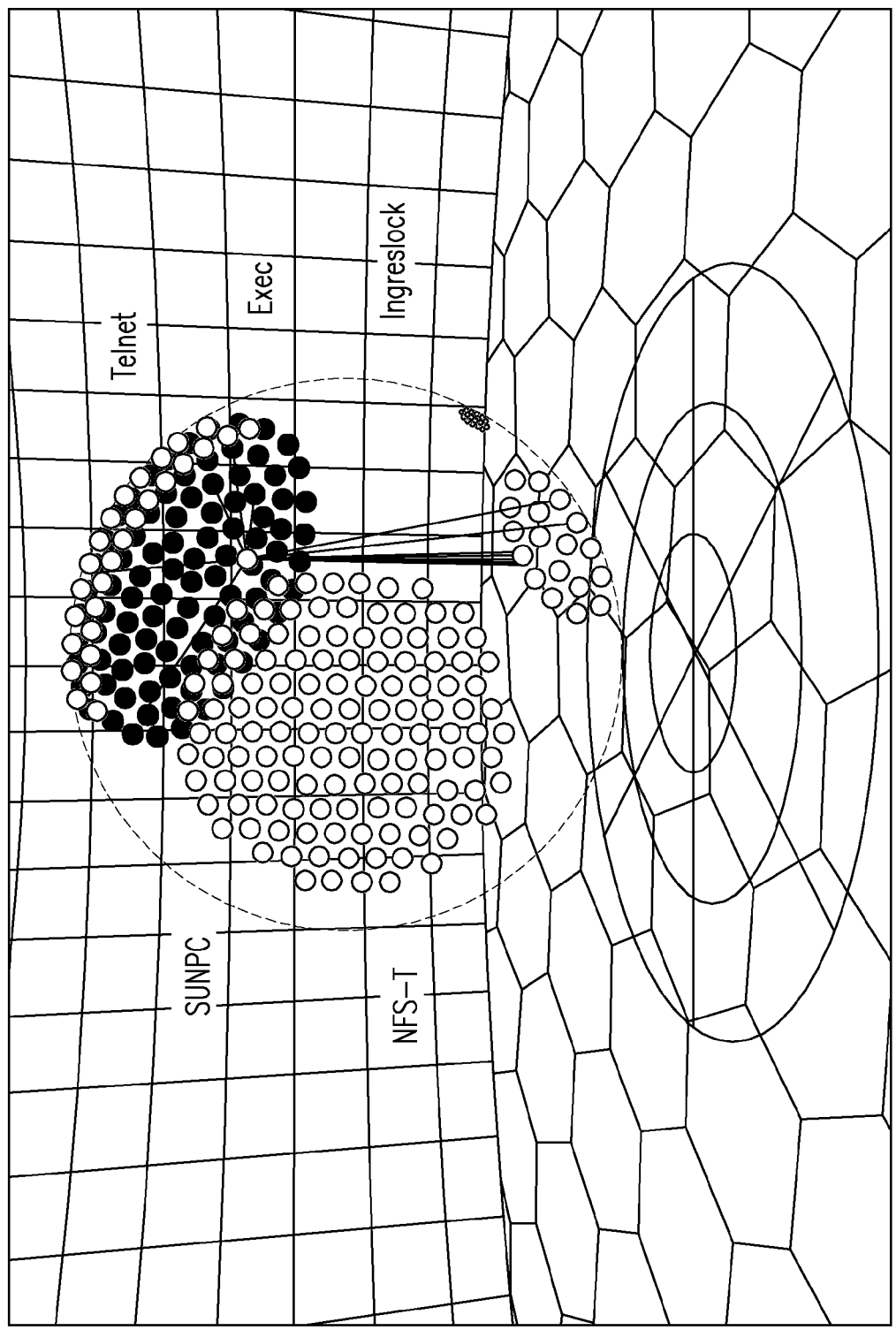
FIG. 5 is a screen shot of the view of FIG. 4 after a Content Query.

FIG. 5 is the same Discrete View after a Content Query for all events with durations of longer than ten minutes, and an Association Query for events with a particular originating IP address. In some embodiments, for some or all InfoSet representation types, the glyphs for each event in the Content Query result are automatically highlighted, all others are dimmed. When viewing the information of FIG. 5, in combination with the Link Array resulting from the Association Query (not shown here), the analyst exploring this information is able to quickly evaluate and assimilate over a dozen dimensions of the retrieved items simultaneously, in full detail.

Concept Views

Concept Views show general conceptual or topical similarities among the information objects, based on their free-text content. In the embodiment illustrated in FIG. 6, individual items are first grouped into topically related clusters. Each cluster is represented in the display as a semitransparent sphere surrounding the glyphs that correspond to the items in the cluster. Within the sphere, the glyphs are arranged three-dimensionally such that items with text that is conceptually most similar (i.e., that use similar word patterns) end up near one another, while items that are more dissimilar are more widely separated. The clusters are also arranged relative to one another, such that similar clusters end up near one another. Each cluster is labeled with terms that describe the most prevalent concepts found within that grouping. The whole picture provides a sort of automatically generated "table-of-contents" that simultaneously shows both general and detailed topical similarities and dissimilarities.

Figure 6:
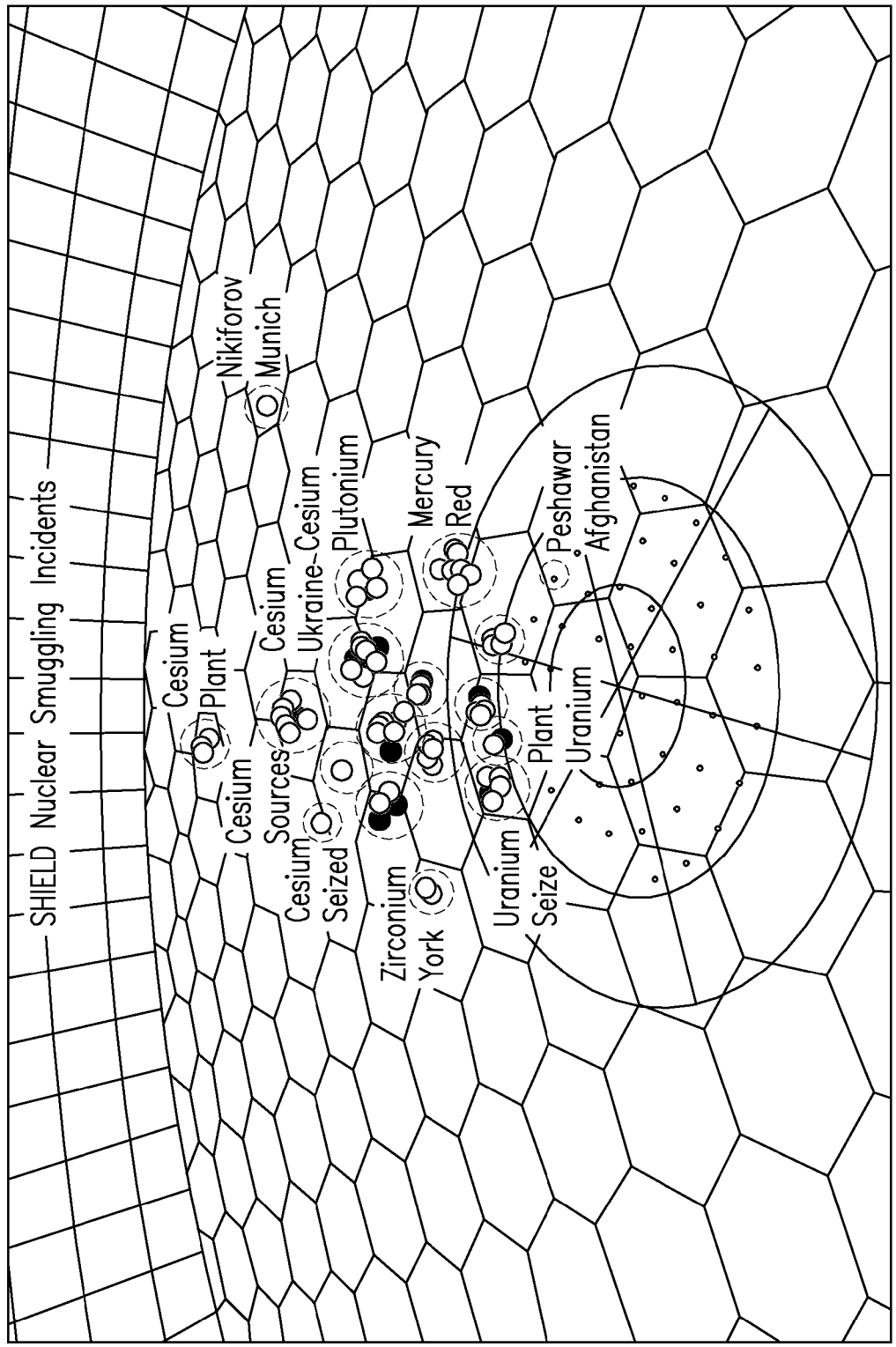
FIG. 6 is a screen shot of a visualization of a concept view illustrating individual items grouped into topically related clusters.

The Concept View that is shown in FIG. 6, by way of example, shows similarities among the textual descriptions of approximately 800 nuclear material smuggling events. Each point in the display represents a single event, and the events are color-encoded according to their date of occurrence, with the events occurring in 1999 colored yellow, and those occurring in 2000 colored red. Older events are depicted in varying shades of blue. Other colors or coding techniques could be used.

Figure 7:
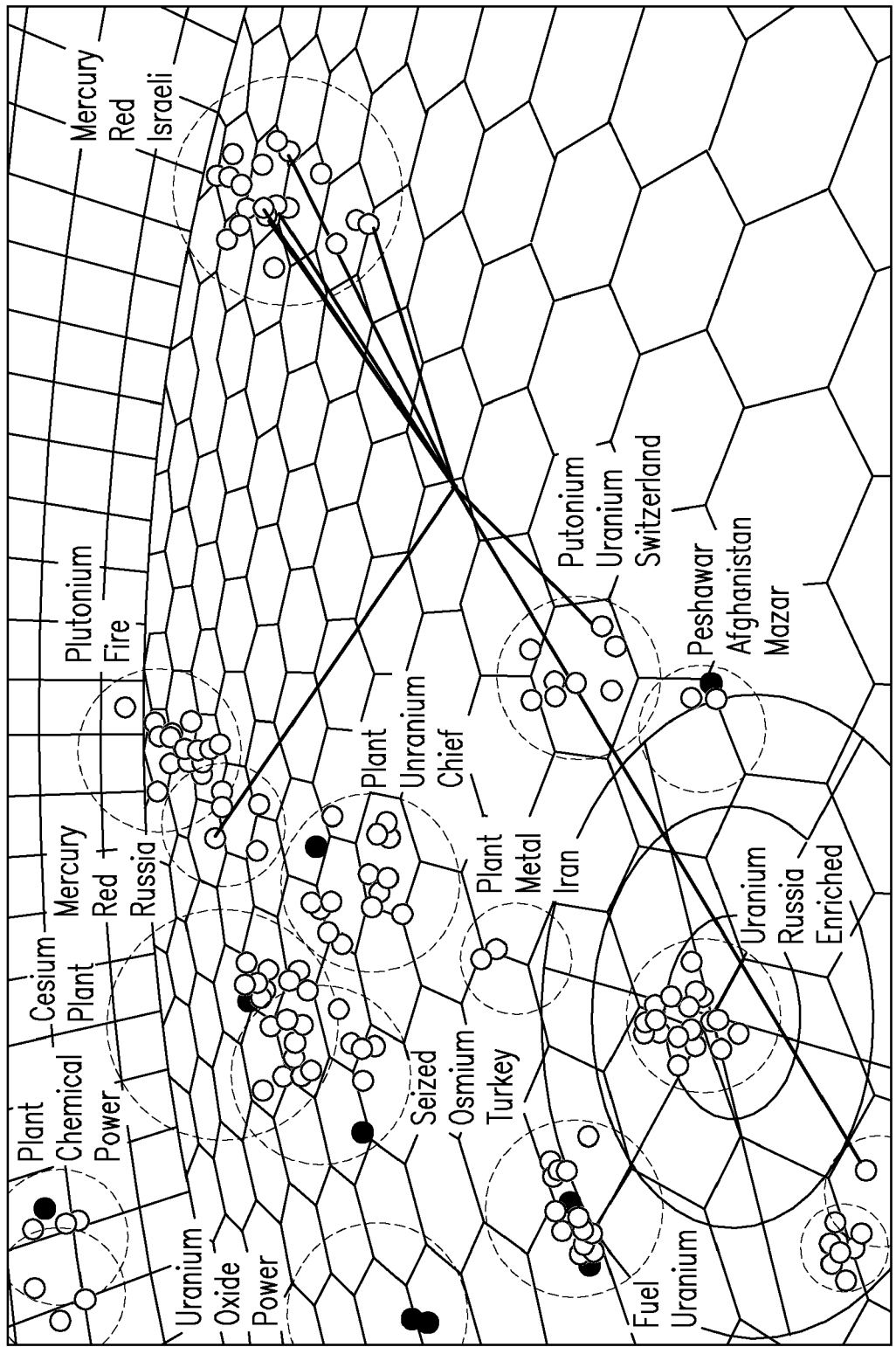
FIG. 7 is a screen shot of a close-up view of several event clusters after an analyst has executed a Content Query.

FIG. 7 shows a close-up view of several event clusters after an analyst has executed a Content Query for all events categorized as offers to sell nuclear materials. In some embodiments, with some or all InfoSet representation types, the glyphs for each event in the Content Query result are automatically highlighted, all others are dimmed. In the illustrated embodiment, varying degrees of brightness of the cluster labels provide a general indication of the number of query results in that cluster, with brighter labels indicating higher occurrences of the relevant items. The view also contains a single Link Display that connects events involving the material "Red Mercury" that occurred within a specific time period.

Hierarchy Views

While the system 10 employs a variety of pattern recognition algorithms to automatically or semi-automatically organize input information, the best and most useful information orderings are most often those that are human-generated. One of the most commonly used such orderings is the categorical ontology, a hierarchical information structure that assigns a particular piece of information to a location in a predefined category tree. Examples of common categorical ontologies include file directory structures and Web directories such as Yahoo. Because of the ubiquity and utility of such information structures, the system provides mechanisms for both modeling and displaying information that has been explicitly organized into hierarchies. Further, the system's hierarchical information visualization design (a representation called a pan-tree) enables the display of hierarchies up to an order of magnitude larger than other existing 3D tree visualization methods.

Figure 8:
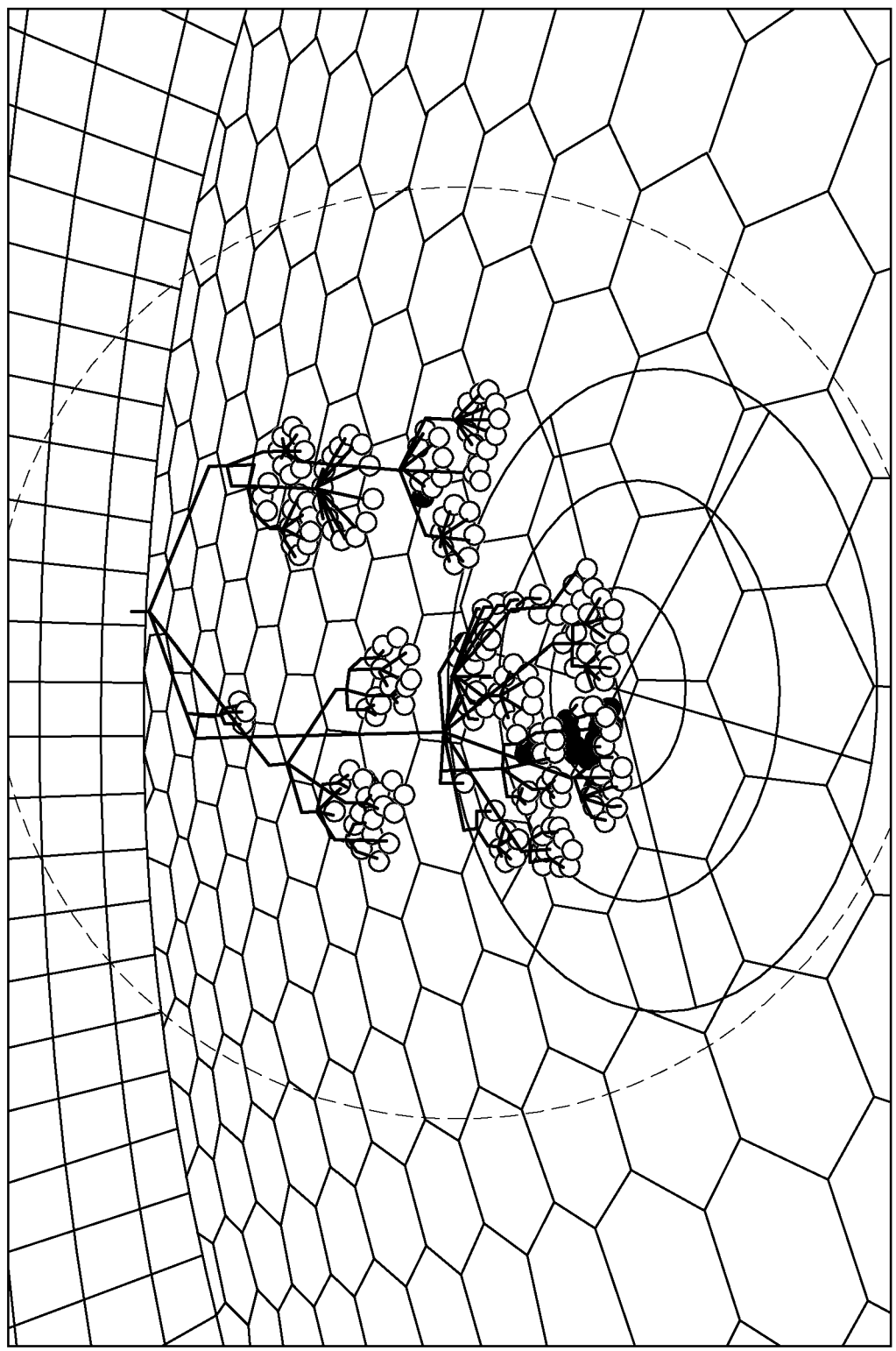
FIG. 8 is a screen shot of a Hierarchy View.

FIG. 8 shows a Hierarchy View of the general organizational structure of the Pacific Northwest National Laboratory that was generated from information in the PNNL phone directory. Each glyph in the display represents an individual employee record (about 4000 total), and the glyphs have been color-encoded according to employee type. The glyphs have been spatially organized into a pan-tree structure according the organizational code contained within each record.

Figure 9:
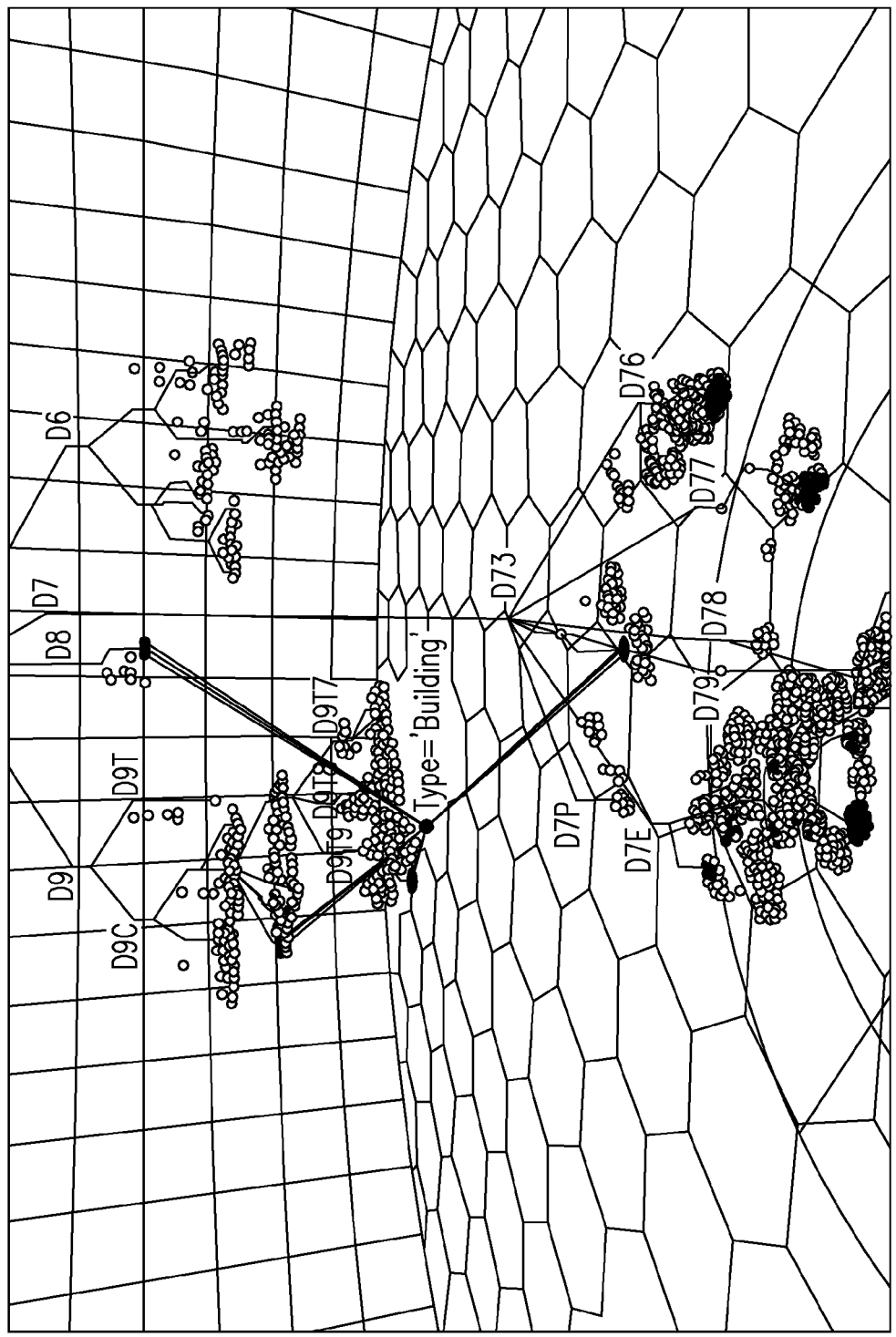
FIG. 9 is a screen shot showing the view of FIG. 8 after several Content Queries have been executed.

FIG. 9 shows, by way of example, the same View after several Content Queries have been executed for people sharing particular mail stops, as well as an Association Query for people who have offices in the same building. Note that, as with the other InfoSet representation types, the results of Content Queries are highlighted in the display in the illustrated embodiment. However, in the case of Hierarchy Views, the paths through the hierarchy corresponding to the items that satisfied the query are also highlighted, providing additional context for the items in the result set.

Network Views

Many problems can be modeled as networks or directed graphs. Financial transactions, email correspondence, hyperlinked Web pages, technical papers containing co-citations, and computer network traffic data are all examples of information types that can be represented as networks. The system's network modeling and visualization capabilities are extremely flexible, able to accommodate these and many other information types.

Networks, by definition, consist of collections of nodes connected to one another by edges. Accordingly, in the system, a distinction is made between node-oriented and edge-oriented network information. An example of node-oriented information is Web pages, which can be thought of as nodes that are connected to one another by (hyperlink) edges. An example of edge-oriented information is email, an instance of which can be thought of as an edge connecting nodes that represent the sender and recipient. The system's networks can accommodate both types of information in the same model. For instance, emails (edge-oriented) and employee records (node-oriented) can be included in the same network. Even further, because the system places no restrictions on the content of information objects, these networks can contain a generally unlimited variety of information object types. For example, network system log records and intrusion detection system records are both edge-oriented information types describing connections between computers. Both types can be merged together into the same network model in the system 10.

Figure 10:
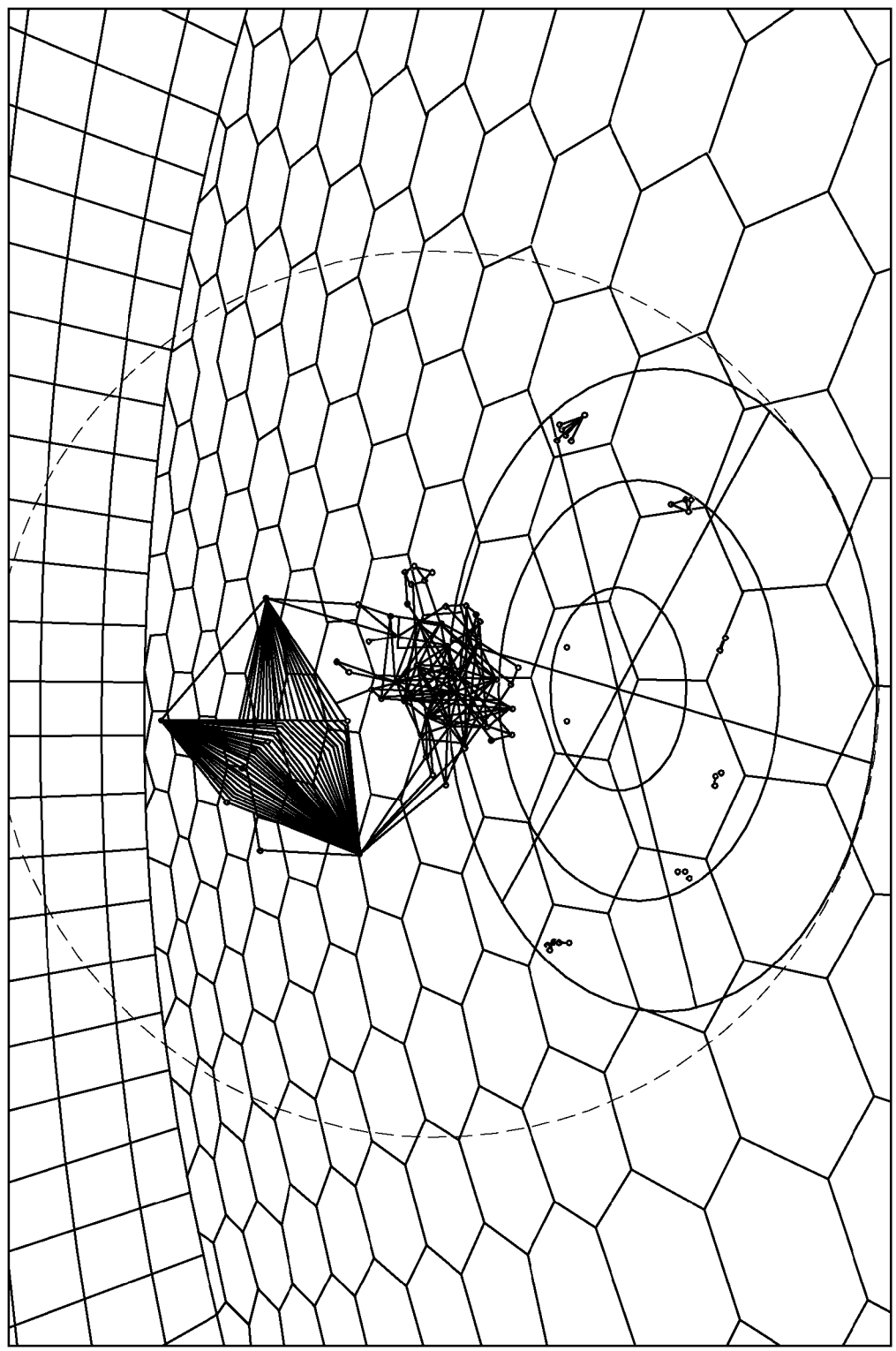
FIG. 10 is a screen shot of a Network View of hyperlink connectivity among a collection of Web pages.

FIG. 10 shows a Network View of hyperlink connectivity among a collection of about 3000 Web pages. The system 10 generates graphical representations of such network models using a 3D force-directed layout algorithm. Each connected component (i.e., graph class) in the data is laid out independently. The largest component is positioned, by default, in the center of the InfoSet display. Smaller, connected components are arranged in a circle around the lower periphery of the display, ordered according to their size and topological complexity. These independent classes may be maximized into the center of the display or minimized back to the periphery according to the user's degree of interest in them from moment to moment.

Figure 11:
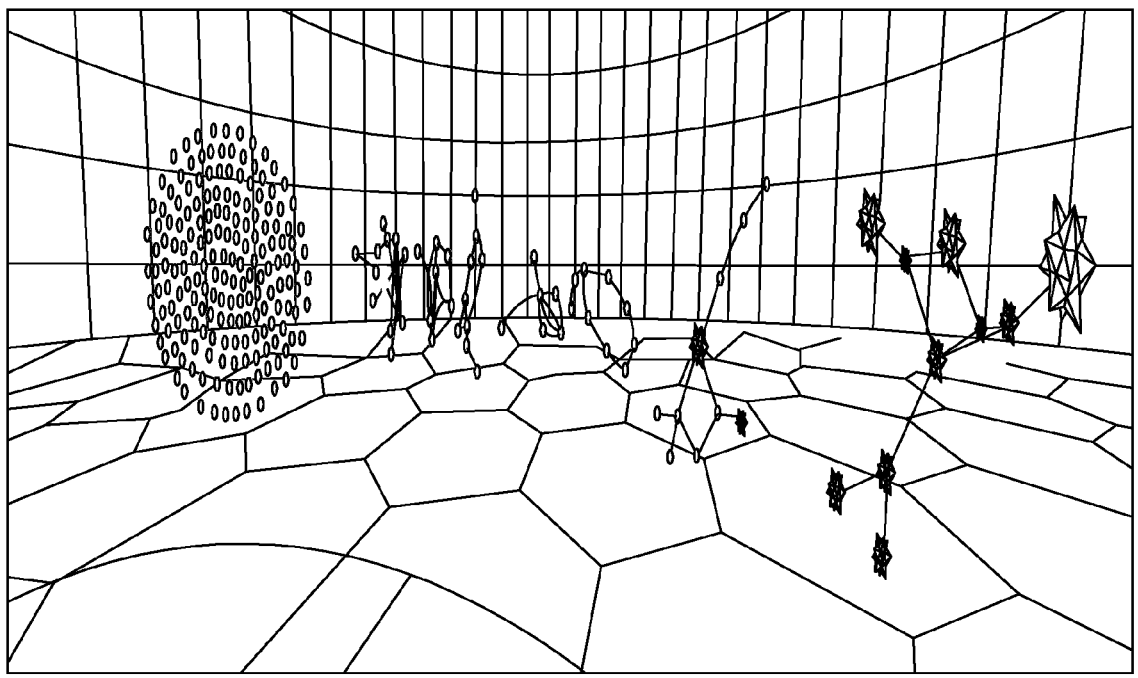
FIG. 11 is a screen shot illustrating completely unconnected nodes ("singletons") and pairs of nodes that are connected only to each other ("simpletons").

The simplest components, including completely unconnected nodes ("singletons") and pairs of nodes that are connected only to each other ("simpletons") are collected together into a separate "primitives" group. As shown in FIG. 11, this group is represented as a sort-of spiky ball, with the singletons evenly distributed over the surface of a sphere at the center, and the simpletons arranged radially about them in a concentric fashion. This approach simultaneously collects these components into a single compact display, while maximizing their visibility from all view angles.

Figure 12:
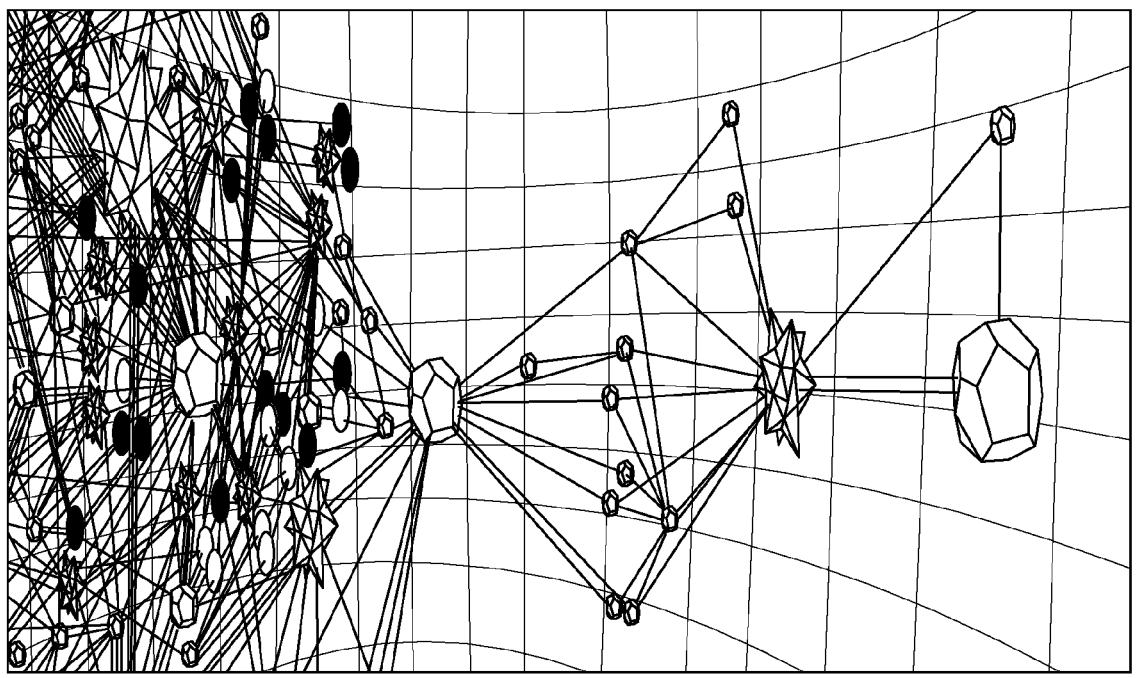
FIG. 12 is a screen shot showing graph substructures having unique representations in a network display, in accordance with embodiments of the invention.

Because network models can be extremely complex, the system provides facilities to optionally "collapse" various portions of the network displays to improve their interpretability. These include, for example, automatic identification and collapsing of clique structures, i.e., collections of nodes that are fully connected to one-another, and clusters, collections of nodes that connect only to a single other "hub" node. These types of graph substructures have unique representations in the network displays, as shown in FIG. 12. In the display shown in FIG. 12, the "soccer balls" (actually, dodecahedra) represent cliques, while the "mace heads" (stellated dodecahedra) represent clusters. Note that, because the graph topologies of cliques and clusters are completely known, replacing their component nodes and edges with iconic representations can result in a significant simplification of the display with no loss of topological information.

Figure 13:
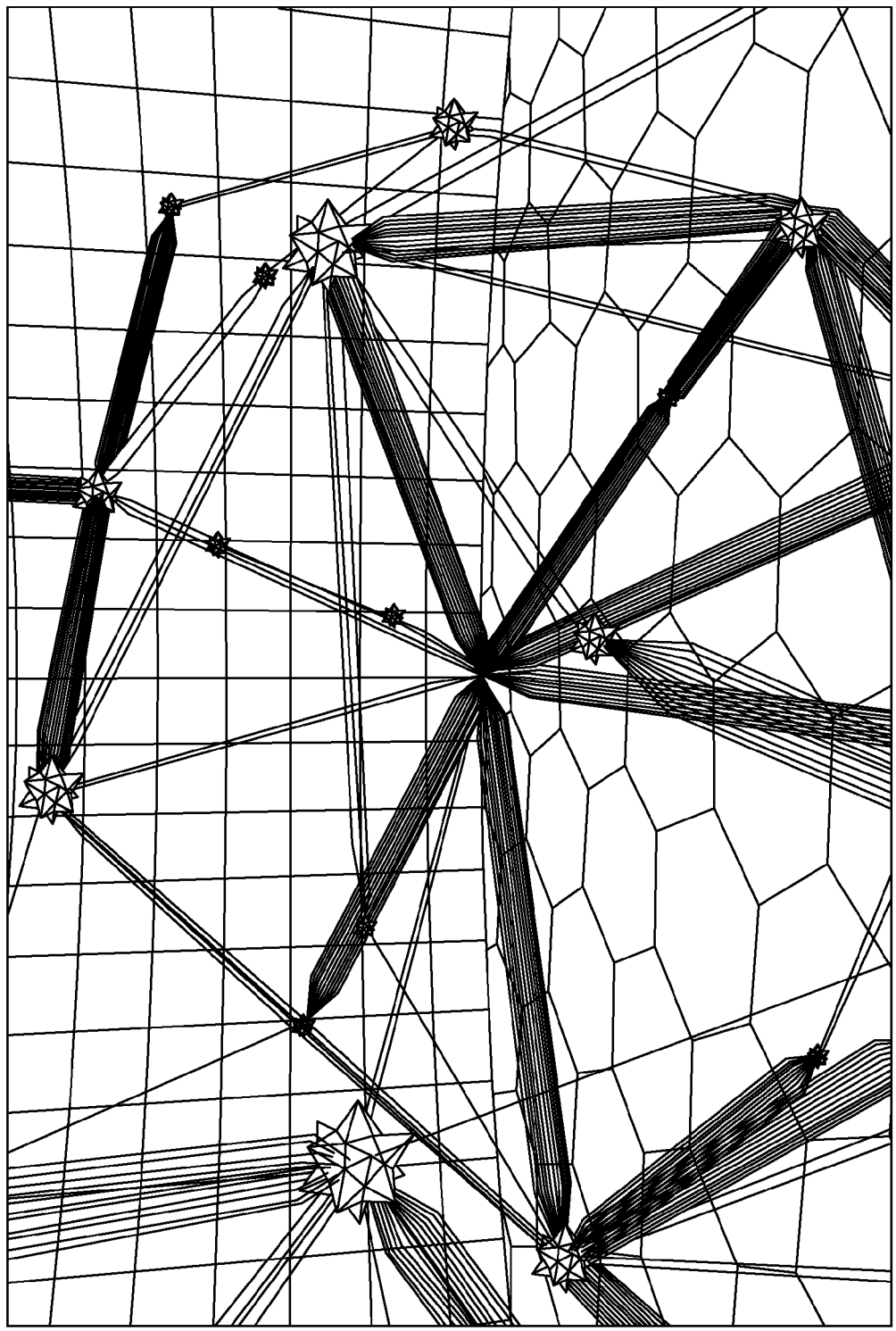
FIG. 13 shows an example screen shot of a Network View of edge-oriented data, in accordance with embodiments of the invention.

FIG. 13 shows an example Network View of edge-oriented data. In this display, each edge represents a computer network system log entry describing a logical connection between two computers, while the nodes represent the IP addresses of the computers involved. In the illustrated embodiment, multiple connections between the same two machines (or clusters) are represented by multiple arcs arranged radially between their corresponding nodes. Such "bundles" of multiple edges can be collapsed into a single line to further simplify the diagram as needed. In the illustrated embodiment, the information objects (i.e., the edges) in the display of FIG. 13 have been color-encoded according to "warning level," with red indicating the most critically important connections.

Figure 14:
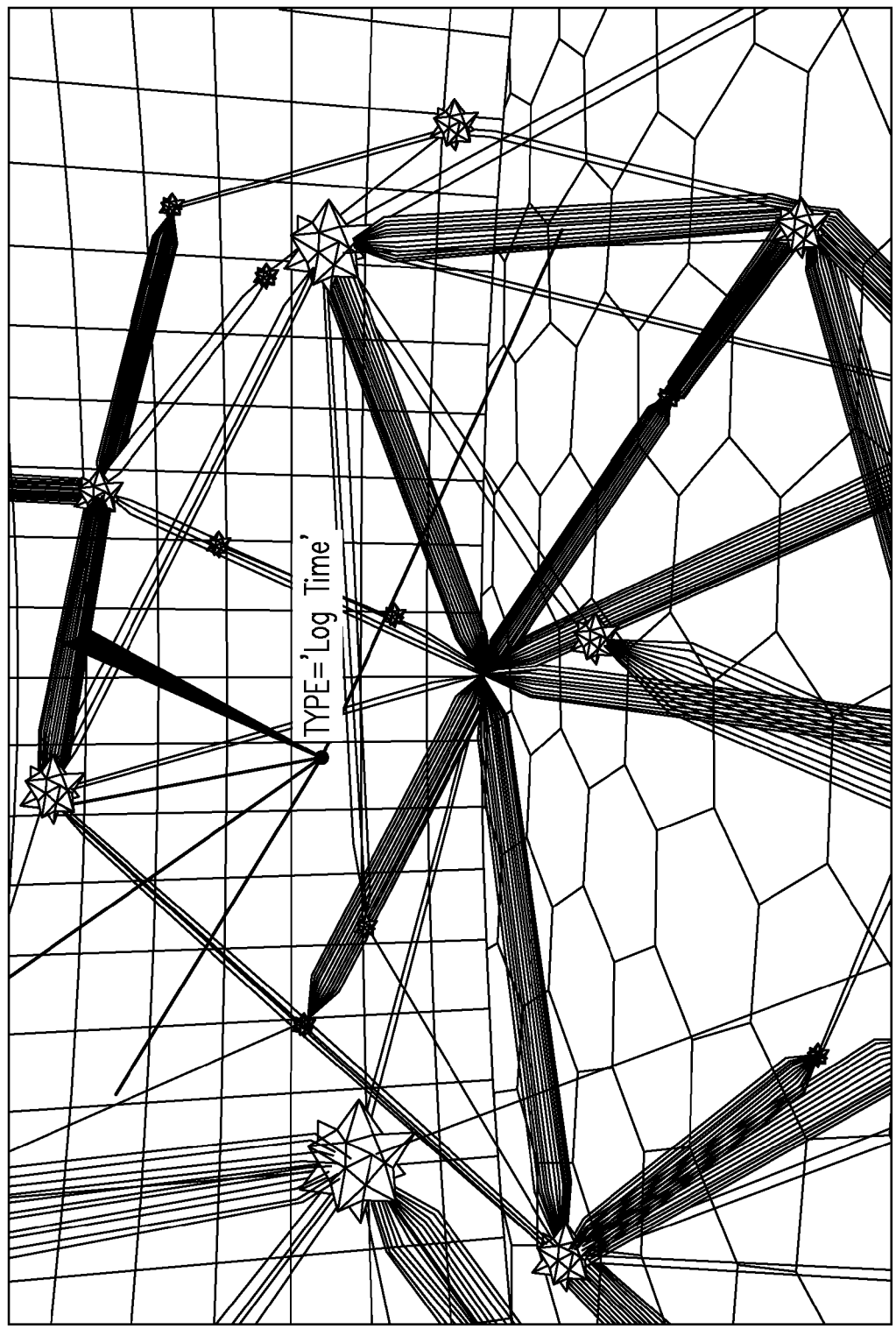
FIG. 14 is a screen shot of the same Network View as shown in FIG. 13 following a Content Query.

FIG. 14 is the same Network View following a Content Query for all log entries generated by the same source computer. Note that, in the illustrated embodiment, in addition to edges, clique and cluster representations also become highlighted if they contain either nodes or edges that satisfied the query. The image illustrated in FIG. 14 also shows a Link Display connecting records (again, represented as edges in this network diagram) generated within the same time period. As with the other View types, Link Displays enable the comparison of co-occurrences of arbitrary secondary or tertiary item properties with the primary display geometry, in this case graph topology.

Local Information Views

The second major class of non-spatial information graphics comprises Local Information Views. Local Views provide more detailed information about fewer items than do Global Information Views, and are generated in response to a query or graphical selection operation. In the illustrated embodiment, there are two different types of Local View, namely Working Sets and Link Arrays. Other embodiments are possible. Working Sets use a list-type presentation of query results to provide quick access to the actual contents of the information objects that satisfied the query. Working Sets are generated by Content Queries or by graphical selection of individual or groups of glyphs from any of the various Information Views. Link Arrays are generated by Association Query operations, and depict relationships or associations among the structured properties of the items in the result set. Link Arrays enable the user to visualize many aspects of the items in the result set simultaneously.

Both Working Sets and Link Arrays support a wide variety of user interactions, enabling users to quickly explore relationships among the contents of arbitrary subsets of information in great detail, or to quickly access and inspect particular items of interest. Further, interactions with Working Sets and Link Arrays may result in changes to not only the item directly affected, but also to other, related displays. For example, in some embodiments, selecting a particular item for display in a Working Set causes the corresponding item to blink in the Information Space, as well as in any Link Arrays in which it may appear. This feature enables users to quickly navigate and assimilate the complex webs of inter-object relationships that typically exist in even relatively small information collections.

Working Sets

Working Sets are one of the types of Local Information Views. Generated as the result of a Content Query or some form of graphical selection, Working Sets are so named because they are generally used as "staging areas" for interesting subsets of the items currently in the system. These subsets may be an end in and of themselves, but more typically they serve as an intermediate stage of an analysis process. These subsets can also be used to limit the scope of other Content or Association Queries, or indicated in the Information Space through highlighting of the glyphs that correspond to their items.

In the illustrated embodiment, Working Set display windows are divided into two main sections. The upper part of the window is called the results list. Each row in this list represents one item in the set, which may or may not be ranked according to query relevancy depending on the operation used to generate it. The left-hand column of the results list displays the unique identifiers of the information objects in the list, and the items can be selected for display in the content display area (described below) by, for example, double-clicking on their associated identifiers. The area to the right of the identifiers column is called the discrete properties matrix. This customizable display area is used to show various discrete properties of the items in the set that may be of special interest. To the left of the identifiers column is the link indicator area. Items in the Working Set that are also linked to in one or more Link Arrays are so designated by a small link icon in this location.

The lower portion of Working Set windows is taken up by the content display area. In the illustrated embodiment, this area is capable of displaying XML or HTML-formatted information. Note that the system's support of XML stylesheet (XSLT) technology provides a simple, powerful, and flexible means for users to add custom user interface functionality. For instance, FIG. 15 shows an example database record that has been formatted for display using an XML stylesheet. In the illustrated embodiment, several of the discrete fields associated with the record have been formatted as hyperlinks, such that clicking on them initiates a new query for all other items in the system that share that particular property. In this way, users can quickly navigate to additional information of interest with a minimum of effort and cognitive interruption.

Figure 16:
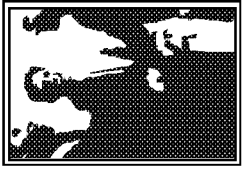
FIG. 16 is a screen shot of an example Working Set, in accordance with embodiments of the invention, containing a collection of Web pages.

FIG. 16 shows an example Working Set containing a collection of Web pages. Note that the hyperlinks in such pages are typically modified in the system such that links to pages cached in the system open the associated pages in a new Working Set within the system, while links to pages not in a currently open InfoSet open an external browser window so that the material can be retrieved from its original source. This approach provides an almost seamless interface between content within and outside the system.

Link Arrays

Link Arrays, like Working Sets, are representations of subsets of information generated as the result of a query operation. Unlike Working Sets, which can be generated a variety of ways, in the illustrated embodiment, Link Arrays are generated only as the result of Association Queries, which operate solely on the discrete properties of information objects. The scope of Association Queries can be limited to the contents of one or more Working Sets, however, providing a flexible means of generating Link Arrays containing specific items of interest. Another difference between Working Sets and Link Arrays is that, while Working Sets are designed to provide fast access to information content, Link Arrays are designed to show relationships among the discrete properties of the items in the result set.

Graphically, Link Arrays are 3D constructs that portray item properties and property relationships as series of lines, planes and icons. Link Arrays are comprised of four main graphical components. These are:

(1) object glyphs, which are representations of the information objects in the result set, (2) field representations, which are planes and/or lines representing the discrete fields occurring in the items in the set, (3) value representations, which are columns placed on field representations depicting the unique field values in the items, and (4) links, which are lines that connect related field/value representations in the display.

In the illustrated embodiment, Link Array link displays are dynamic, changing in response to graphical user interactions with the value representations and other components of the system's user interface.

Typically, (see FIG. 17) the lowermost plane in a particular Link Array is the identifier plane containing the object glyphs that represent the information objects that satisfied the query. These glyphs reflect the same color- and shape-encoding and highlighting state currently applied to glyphs in the I-Space. Arrayed above the identifier plane are the field and value representations corresponding to the discrete properties of the objects in the set. The particular field and value representations present in any given Link Array are a function of the query used to generate it. Note that Link Arrays can present integrated displays of information associated with objects that may exist in separate InfoSets.

Clicking on a particular value representation column generates a display of one or more links passing through all of the other fields and values shared by the items that have the selected field/value pair in common. At the same time, the values associated with the linked items are also displayed adjacent to them. Link displays can be further modified through the application of temporal or numeric filters if the query result contains these types of values. Together, these capabilities enable rapid exploration of the discrete property relationships among the items in the set.

Figure 17:
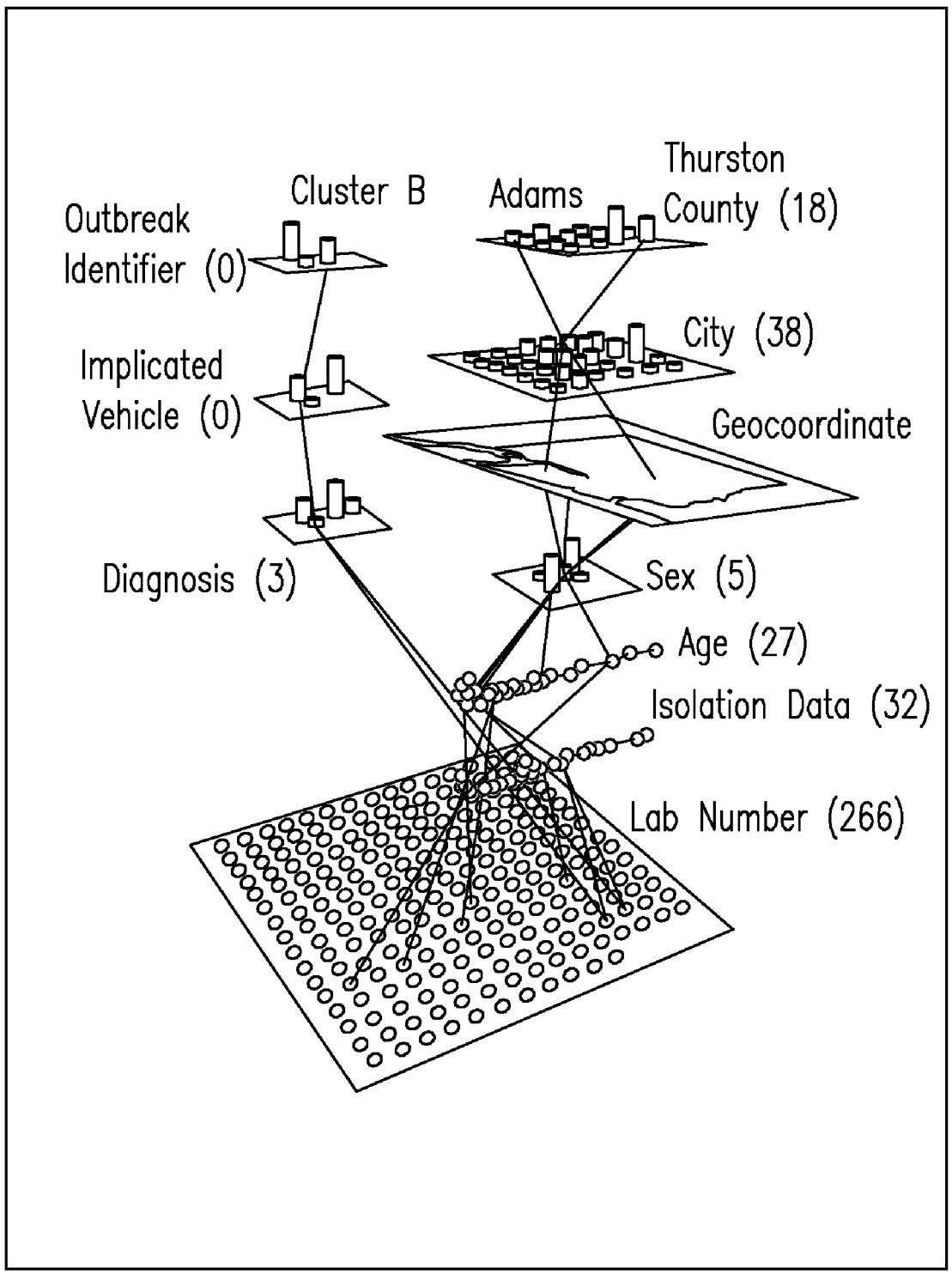
FIG. 17 is a screen shot of a Link Array including an identifier plane in accordance with embodiments of the invention.

FIG. 17 shows a Link Array depicting information associated with several *E. coli* outbreaks that occurred in the state of Washington in 1998. The lowermost plane shows that 236 items satisfied the Association Query used to generate this display. An analyst has selected two particular cities of interest (Olympia and Ritzville), and the resulting link display shows the particulars of the *E. coli* cases that occurred in those areas. Note that the analyst has applied a map to the "Geocoordinate" plane to provide a spatial context for those values. Such visual context can also be provided for non-geospatial field types through the application of MetaImages to the planes (see the Image Views page for more details). For example, an organizational chart (in MetaImage form) could be used to provide a visual context for the values associated with an "Organization" field.

Those familiar with Geographic Information system (GIS) technology will recognize that Link Arrays represent a powerful way to explore complex relationships among the properties of geospatial features. A typical GIS is capable of displaying only a very limited number of feature properties at the same time through the use of color, symbology, and text labels, and comparing these properties in meaningful ways can be difficult, especially when the number of properties is large. The system's Link Arrays can make it possible to quickly interpret relationships among dozens of spatial feature attributes.

Figure 18:
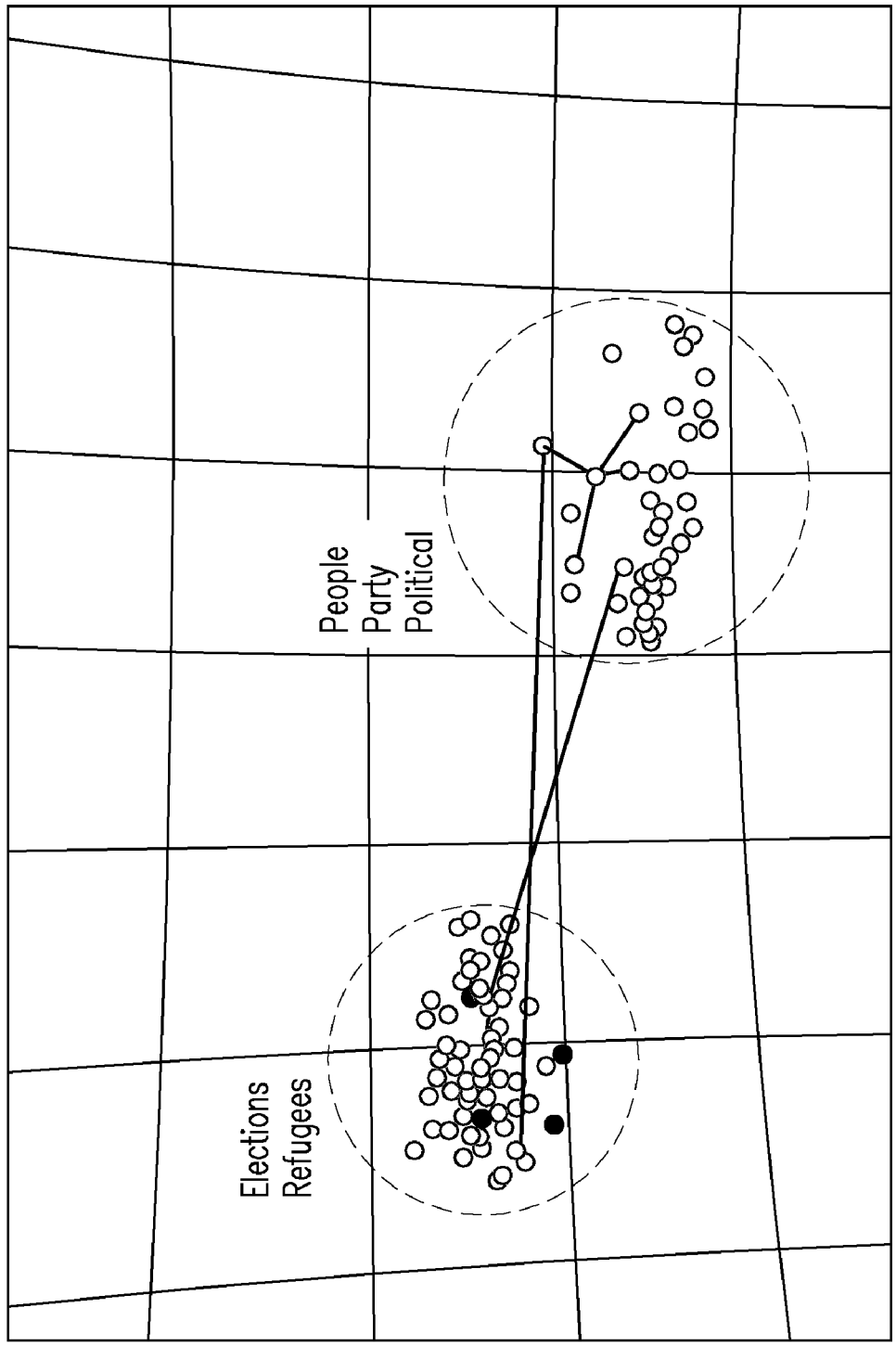
FIG. 18 is a screen shot showing a Link Display including a central Link Node, and a set of links connecting the Link Node.

In the illustrated embodiment, whenever a Link Array is generated, a corresponding Link Display is placed in the Information Space. As shown in FIG. 18, a Link Display includes a central Link Node, located at the midpoint of the items that are part of the Array, and a set of links connecting the Link Node to the glyphs of items involved. Note that Link Displays don't show the details of how these items are related, simply that they are. Users can access the full detail of these relationships at any time by simply clicking on a particular Link Node to access its corresponding Link Array. Additionally, in the illustrated embodiment, the links in the I-Space Link Display are dynamically coupled to those in the corresponding Link Array, such that user Link Array interactions are immediately reflected in the Link Display, as well. Finally, note that Link Displays enable Association Query results to be placed within the context of entire (or even multiple) information collections, and also enable multiple Association Query results to be compared with one another.

Figure 19:
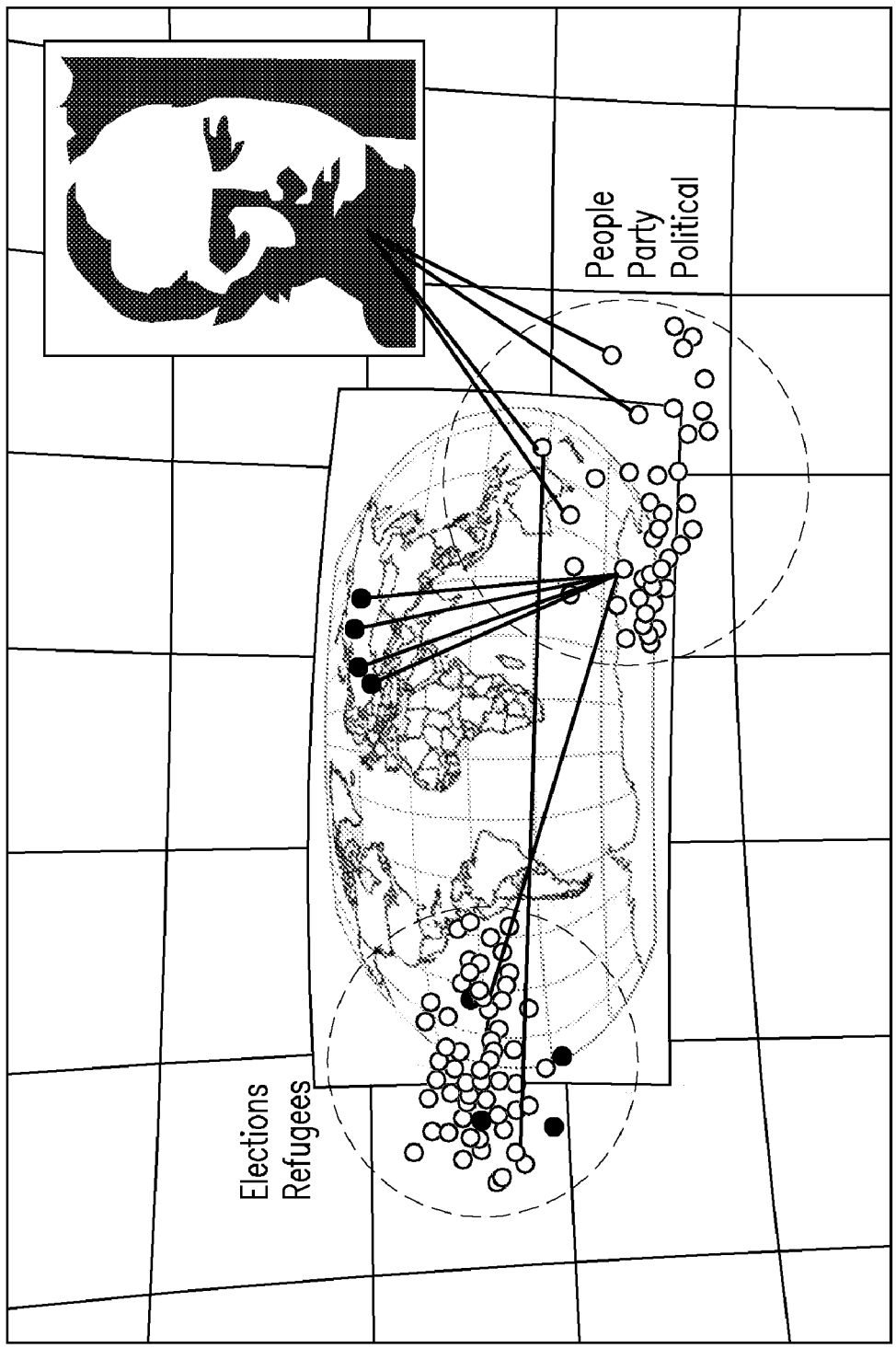
FIG. 19 is a screen shot that illustrates associating Link Displays with maps and imagery in the I-Space, in accordance with embodiments of the invention.

Link Displays provide an effective way to visualize and compare multiple aspects of information in Starlight InfoSets simultaneously. As the number and complexity of Link Displays increase, however, it becomes increasingly difficult to keep track of these relationships. To improve interpretability, some embodiments of the system provide a mechanism for associating Link Displays with maps and imagery in the I-Space (as well as in Link Arrays), as shown in FIG. 19. Such images can not only provide valuable contextual information, but also serve as a powerful mnemonic aid to assist recall of the significance of particular associations among different pieces of information.

Spatial Information Views

One of the features of the system is its capacity for integrating spatial and non-spatial information so that they can be analyzed together. By creating spatial representations of non-spatial information, then placing these representations into the same visualization environment with inherently spatial information, interesting and powerful new forms of visual information analysis become possible.

System visualizations of spatial information are called Spatial Information Views. Spatial Information Views may be presented in the I-Space, in a stand-alone view window, or both at the same time. Additionally, Spatial Views are coupled with the other components of the user interface, such that interactions in Spatial Views may be reflected in other parts of the display, and vice-versa. This capability enables users to make smooth, seamless transitions between different analysis tasks.

In the illustrated embodiment, the system has different types of Spatial Information View, four of which are described below by way of example.

Map Views

The system incorporates a basic Geographic Information System (GIS) into its design. Map Views are 2D map windows that encapsulate this functionality. Map Views support the display of both raster and vector geospatial data in industry-standard formats. Geocoordinates associated with the contents of any InfoSets currently in use are automatically added as map layers whenever a new Map View is opened. This enables integration of spatial data with non-spatial information that has associated spatial attributes. Map views provide a range of standard GIs analysis functions, including graphical feature selection and spatial and feature attribute query operations. Map query results involving InfoSet object properties can subsequently be used as the basis for Content or Association Query operations, enabling information analysts to quickly access non-spatial information that is correlated with spatial features of interest. Further, the contents of Map Views can be added to Link Array Planes as well as to the I-Space Wall or Deck, to provide a geospatial context for other information.

Figure 20:
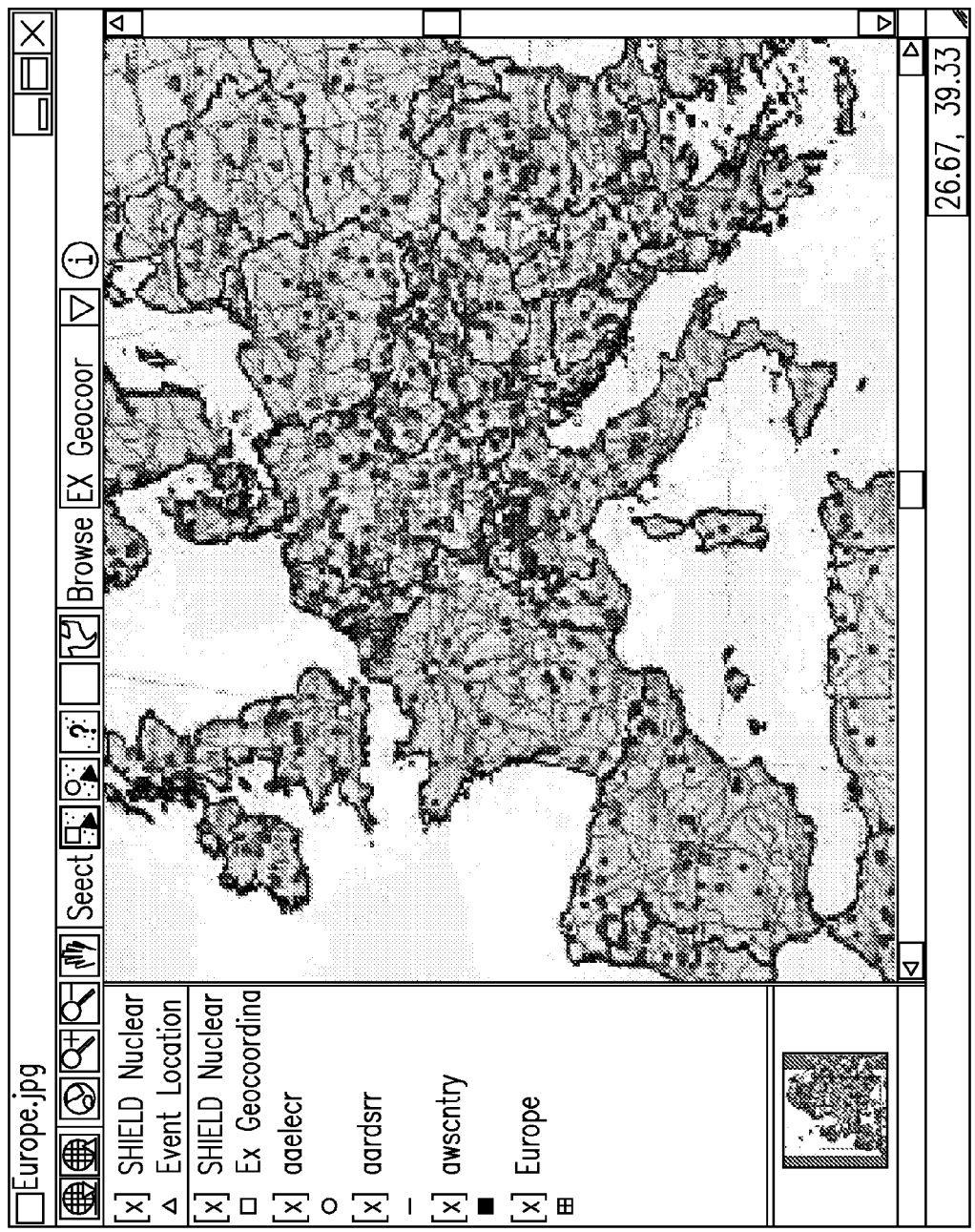
FIG. 20 is a screen shot showing an example Map View displaying several types of geospatial data.

FIG. 20 shows an example Map View displaying several types of geospatial data. The base map is a public domain CIA raster map of Europe. The original (unprojected) digital raster was processed with a MapTool utility to derive appropriate map projection information for the image. As shown in FIG. 20, the raster base map has been overlain with several vector map layers, including (bottom to top) country borders, major roads and railroads, and the locations of European electrical power generating facilities, in this example. The top two layers are associated with information in a InfoSet that has been loaded into the I-Space. These map layers were generated by the InfoSet Construction Wizard at the time the InfoSet was built, and were automatically added to the map as soon as it was opened. The InfoSet in question is a collection of reports of smuggling or theft incidents involving nuclear materials. The first InfoSet map layer (red triangles) shows the reported locations of the incidents, while the second layer (light blue squares) shows the locations of places mentioned in the text descriptions of the incidents. These latter place names were automatically extracted from the text and geo-referenced by the Preprocessor Service.

Figure 21:
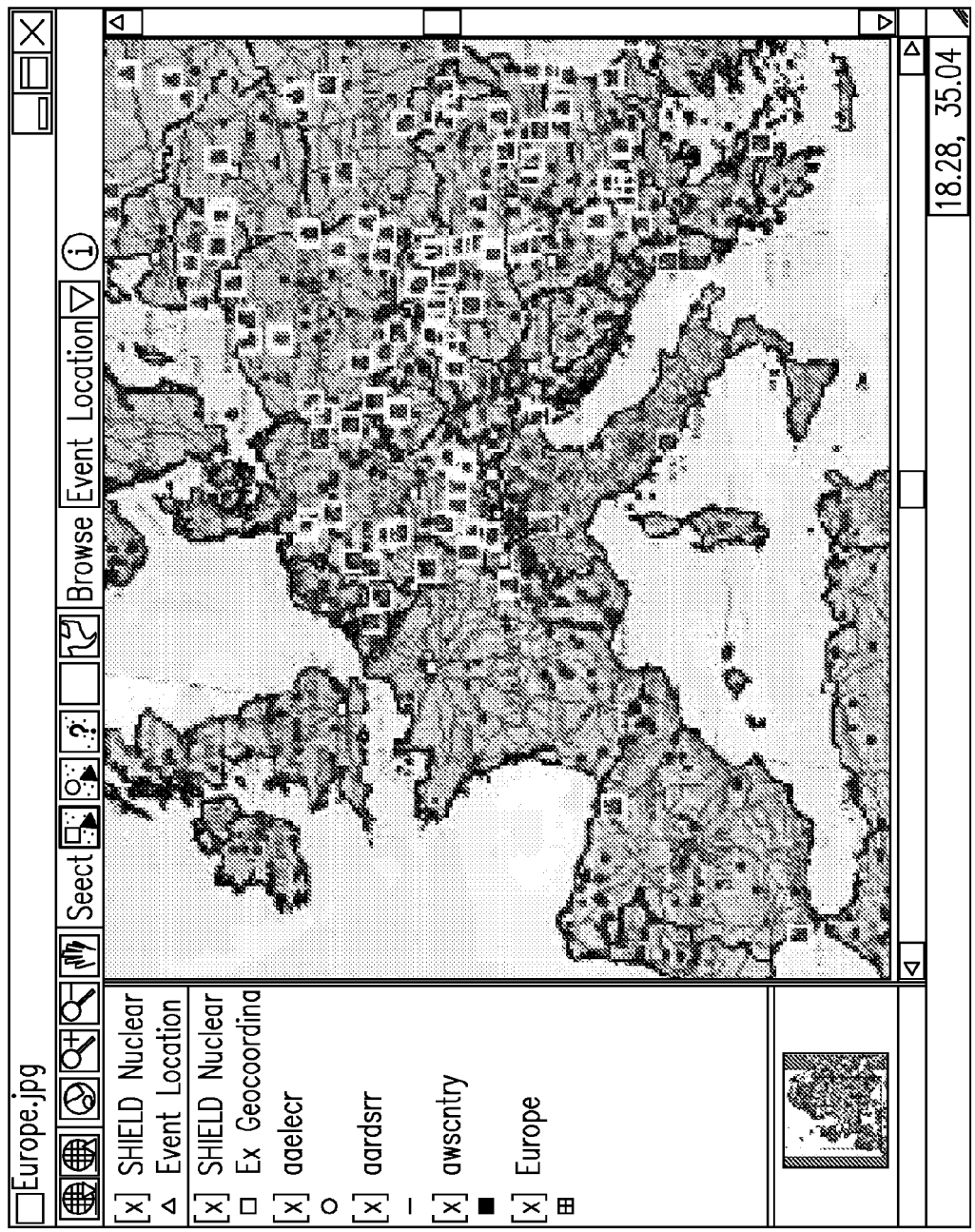
FIG. 21 is a screen shot showing the result of an example of a query for incident locations.

FIG. 21 shows the result of a query for all incident locations that have the attribute "IncidentType: Seizure." The user is about to intersect these locations with the border of Italy in order to identify all seizures of nuclear material that occurred in that country. Incident reports associated with the resulting locations can then be immediately sent to a Working Set for quick perusal, or used to generate a Link Array showing other relationships (if any) among the events.

Terrain Views

In some embodiments, the system includes a utility called TerraGen for processing elevation and raster overlay data into 3D terrain models for display in the I-Space. Such Terrain Views each have a dedicated Map View associated with them that serves as a display controller, in the illustrated embodiment. That is, any data displayed in a Terrain View's associated Map View will be automatically "draped" onto the terrain model. Locations on Terrain Views can also be graphically linked to information objects contained within concurrently displayed InfoSets by adding the terrain model's corresponding Map View to a Geospatial-type Link Array Plane.

Figure 22:
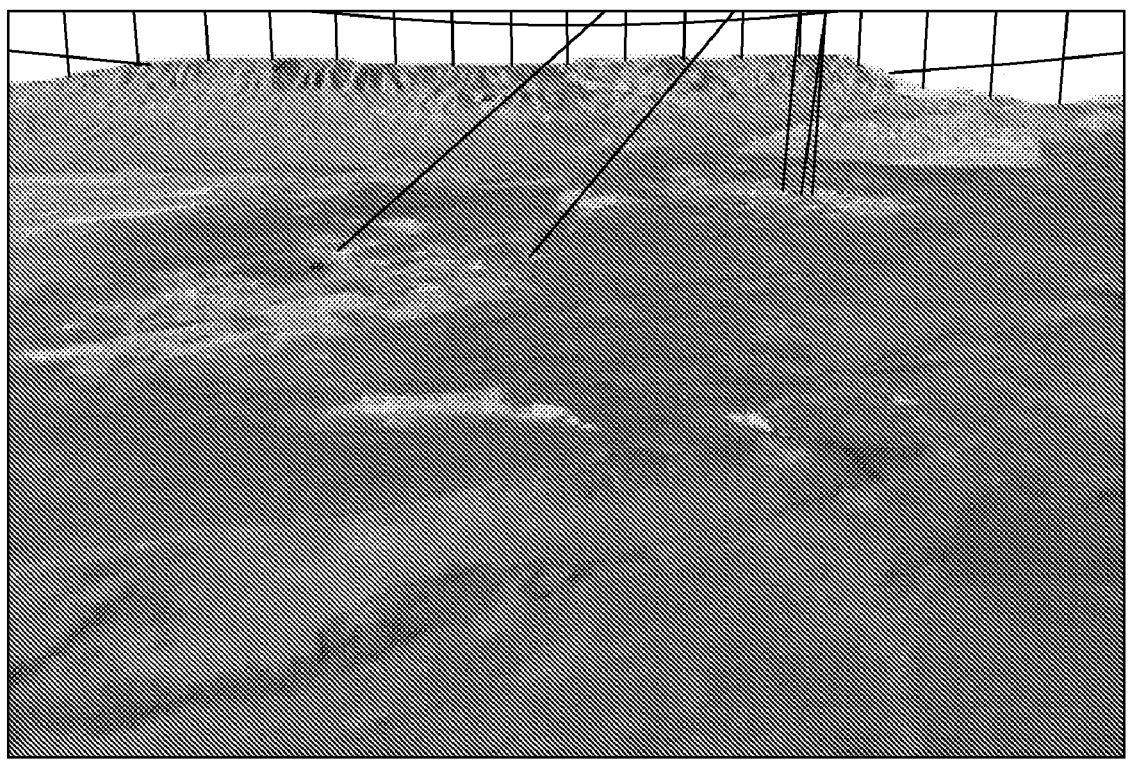
FIG. 22 is a screen shot of an example Terrain View.

FIG. 22 shows an example Terrain View of a portion of the U.S. Department of Energy's Hanford site. The terrain model was constructed from USGS DEM elevation data and is draped with a Landsat false-color infrared image overlay. The view is southwest across the Hanford 200E and 200W plutonium reprocessing areas, with Rattlesnake Mountain in the background. The view includes a Link Display that connects information in an InfoSet (out of view, above) to referenced geolocations on the terrain model.

Image Views

Figure 24:
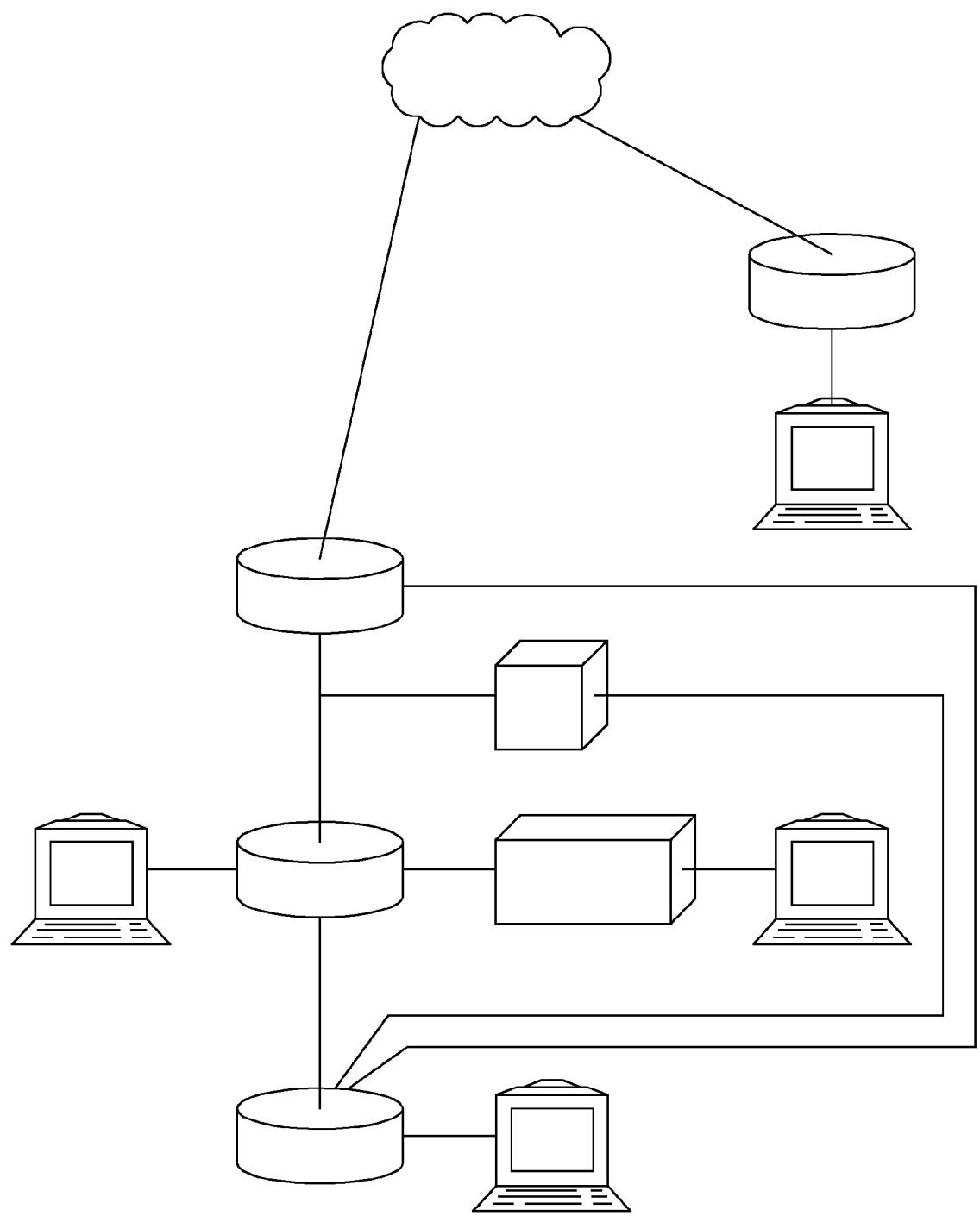
FIG. 24 is a screen shot showing another example of digital imagery as a type of spatial information supported in various embodiments of the invention.

Another type of spatial information supported by the system is digital imagery (see FIGS. 23 and 24). Digital images are used in the system primarily to provide a visual context and mnemonic aid for non-spatial information under analysis. Such images are prepared with a utility called MetaImage Tool that enables a user to manually specify metadata about images and assemble them into image libraries. Among other information, this metadata typically includes the spatial locations of features of interest in the images (e.g., the location of a particular person in a crowd scene, position of an organization on an organizational chart) along with a discrete field/value pair that describes the feature (e.g., Name: Frodo Baggins). After this step has been completed the images can be loaded into the system and treated in much the same way as are maps. A MetaImage can be opened from an Image Library into an Image View window, and the contents of the window can be subsequently added to a Link Array Plane or to the I-Space Wall or Deck and graphically linked to information contained in one or more InfoSets.

3D Model Views

Figure 25:
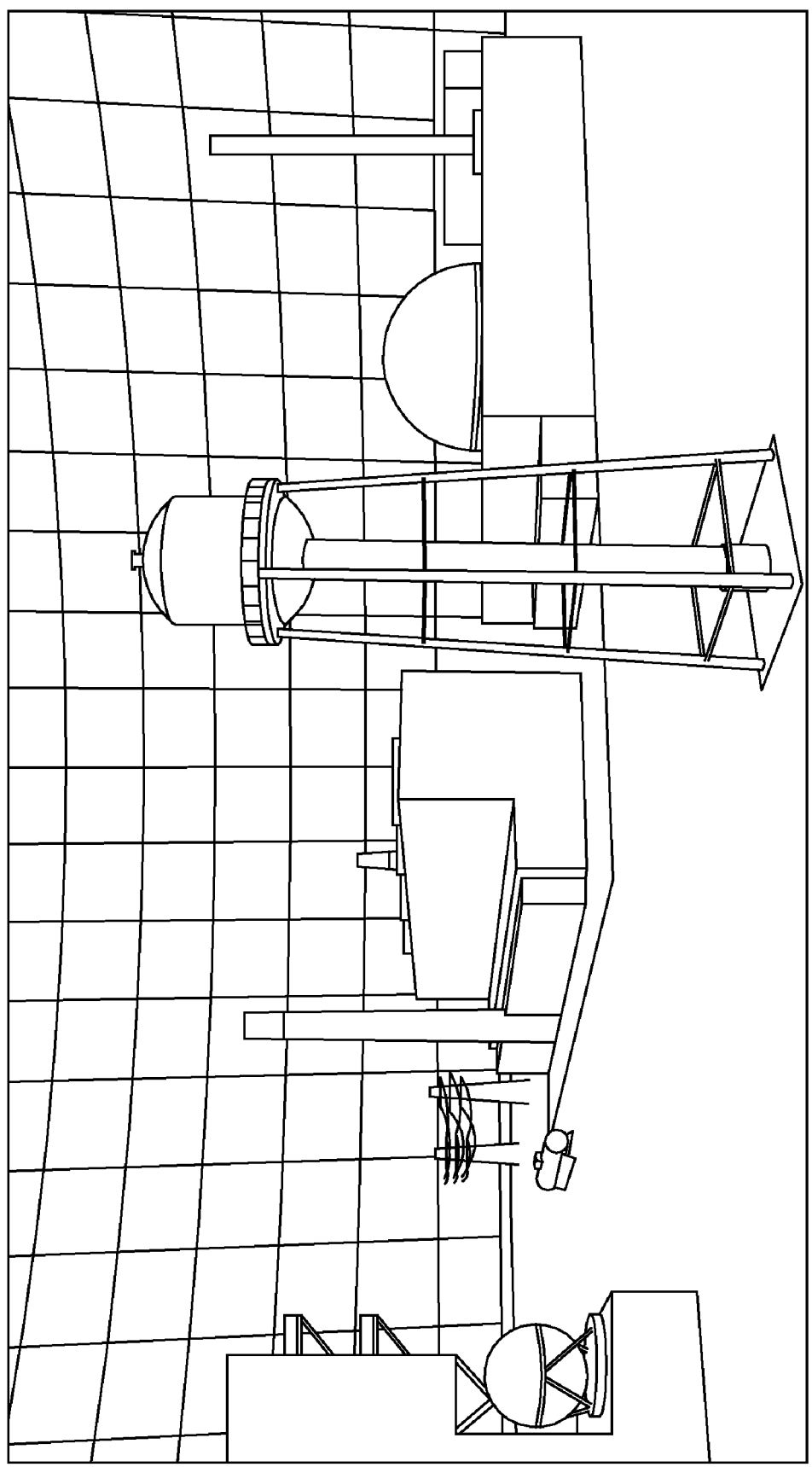
FIG. 25 is a screen shot illustrating that spatial information integration and analysis capabilities can include support for arbitrary 3D object models.

Spatial information integration and analysis capabilities can include support for arbitrary 3D object models that have associated attribute information. See FIG. 25. The system 10 includes a parser for 3D CAD data in DesignXML format that extracts feature attribute information from the models and converts the 3D object geometry into a system-standard 3D object format. Users can jointly analyze CAD data and related non-spatial information, for example, 3D aircraft models and repair records that reference particular aircraft parts. A 3D model analogue to MetaImage Tool enables users to specify their own object metadata if it does not preexist. Users can load 3D object models in either Inventor or VRML-format into the I-Space.

Applications

The system is a generic information visualization tool that is applicable to a wide range of problems, such as military intelligence, web communities, file management, and network security.

The system's information integration capabilities make it well suited to analyzing the contents of multisource intelligence collections. With its integrated information extraction and geospatial analysis tools, users can quickly discover the "who, what, when, and where?" aspects of complex, dynamic situations.

Figure 26:
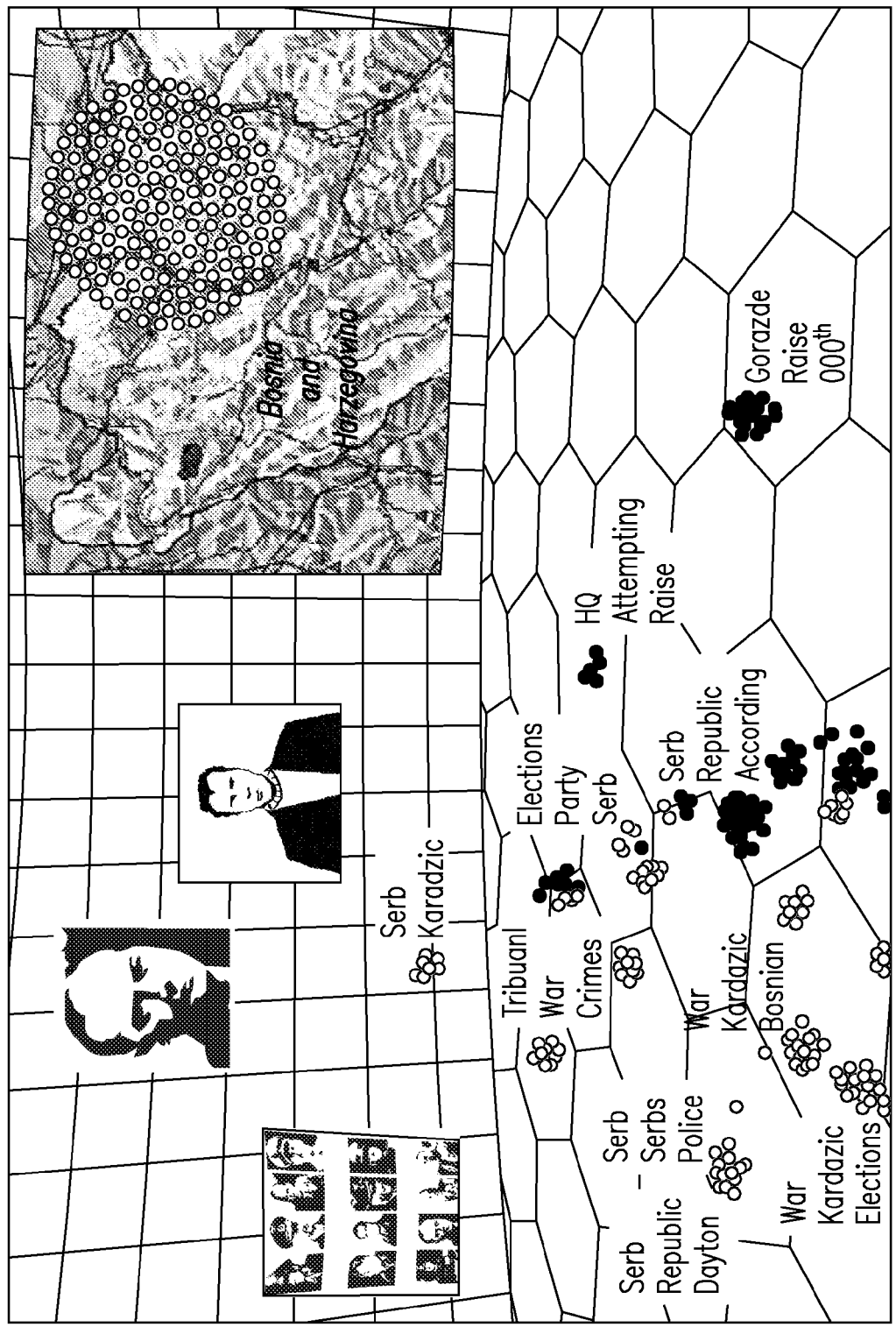
FIG. 26 is a screen shot illustrating an application of analyzing the contents of multisource intelligence collections.

Real-world political and military situations are complex and multifaceted, and the information collected about them commonly reflects this. Reassembling such information into a useful "picture" of a situation typically requires the use of multiple, independent software applications. The system enables intelligence analysts to integrate a wide variety of spatial and non-spatial information types so that they can be jointly analyzed. Further, the system's visualization and analysis tools enable analysts to work with such multi-format information collections from within a single analysis environment. This capability enables them to shift smoothly among a variety of analysis modes (e.g., text analysis, data mining, geospatial analysis) with a minimum of interruption. In this example, an analyst has assembled a collection of approximately 3500 intelligence messages, of four different types, describing a (simulated) situation in Bosnia-Herzegovina. The four message types include human intelligence reports (IIRs), tactical intelligence reports (TACREPs) describing voice radio communications between military units, reports describing movements of military vehicles (REXREPs), and reports describing radar activity (TACELINTs). As shown in FIG. 26, the material has been organized into two separate databases, or InfoSets, one containing the REXREPs and TACELINTs (presented as a Discrete View), and the other containing the TACREPs and IIRs (presented as a Concept View). The analyst has also assembled supporting image and map data to provide a visual context for certain aspects of the information under study. The analyst's challenge is to reassemble these elements into a coherent picture of activity in the region, both to characterize the current situation and for predictive purposes.

Figure 27:
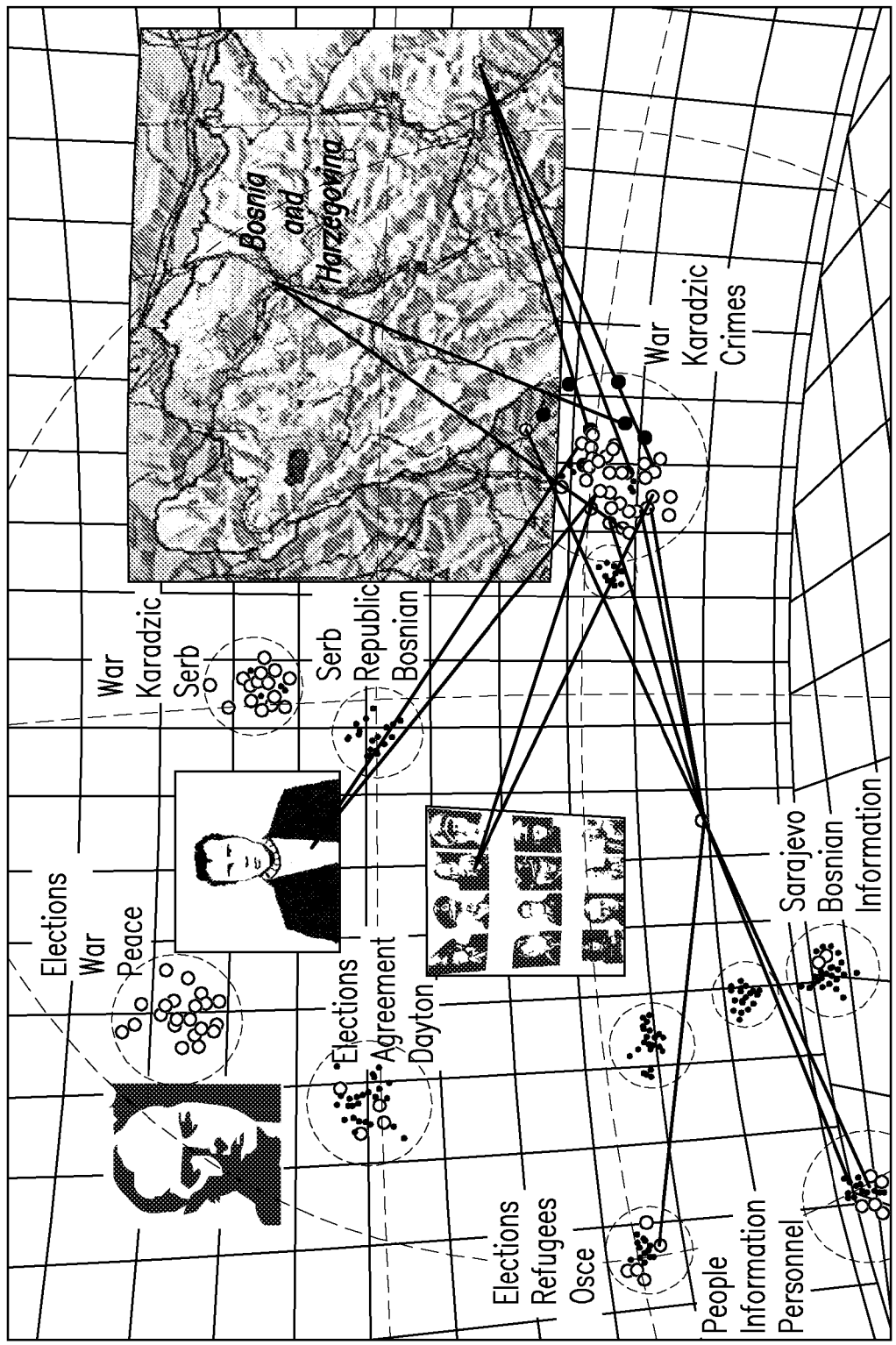
FIG. 27 is a screen shot illustrating a close-up view of several text clusters of interest in an InfoSet of FIG. 26.
Figure 28:
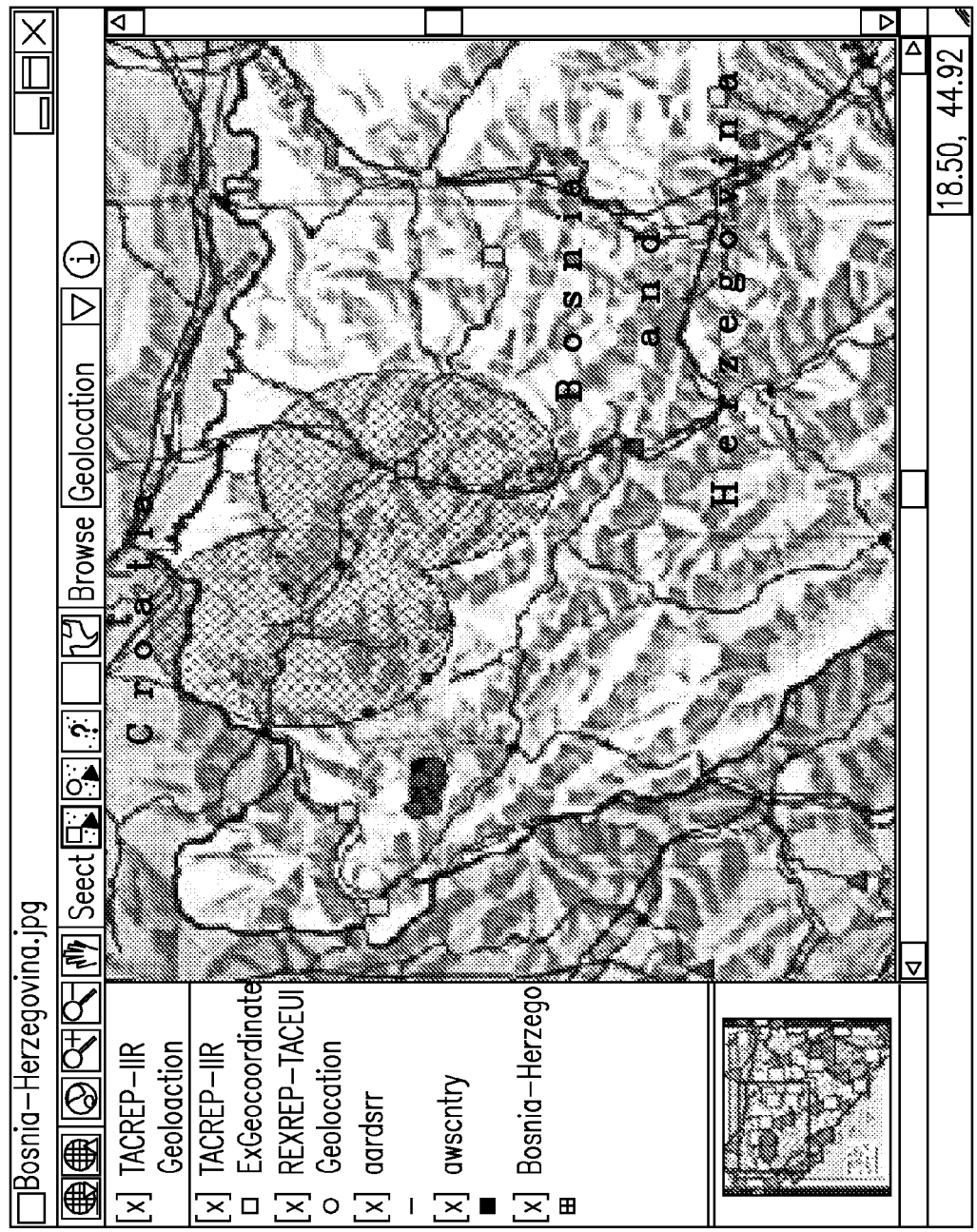
FIG. 28 is a screen shot illustrating moving to a map of the region from the view of FIG. 27.

FIG. 27 shows a close-up view of several text clusters of interest in the TACREP-IIR InfoSet. The analyst has color-encoded the messages according to message type. The human intelligence reports are colored blue and the TACREPs are colored yellow. The analyst has executed a Content Query to highlight all items containing the phrase "WAR CRIME," as well as several Association Queries to identify co-occurrences of the names of several people of interest and locations associated with the messages in the "WAR CRIME" message subset. The analyst has associated a map and several images with the results of three of the four Association Queries in order to provide a graphical context and mnemonic aid for the query results. Note that this view shows, simultaneously, 1) general conceptual relationships among items in the collection, 2) the locations within the collection of items containing a particular arbitrary text string ("WAR CRIME"), 3) locations of items that share particular extracted person and place names of interest, 4) geographic relationships among, and the geographic context of, the extracted place names, and 5) a visual context for two of the three people of interest. Noting that one of the highlighted items is a TACREP that references the city of Banja Luka, site of a regional war crimes trial, the analyst moves to a map of the region. See FIG. 28.

The analyst next executes a spatial query for TACREPS and TACELINTS describing activity near Banja Luka and Prijedor. The analyst then uses the spatial query results as the basis for another Association Query to generate a visualization showing detailed relationships among the structured properties of the identified messages.

Figure 29:
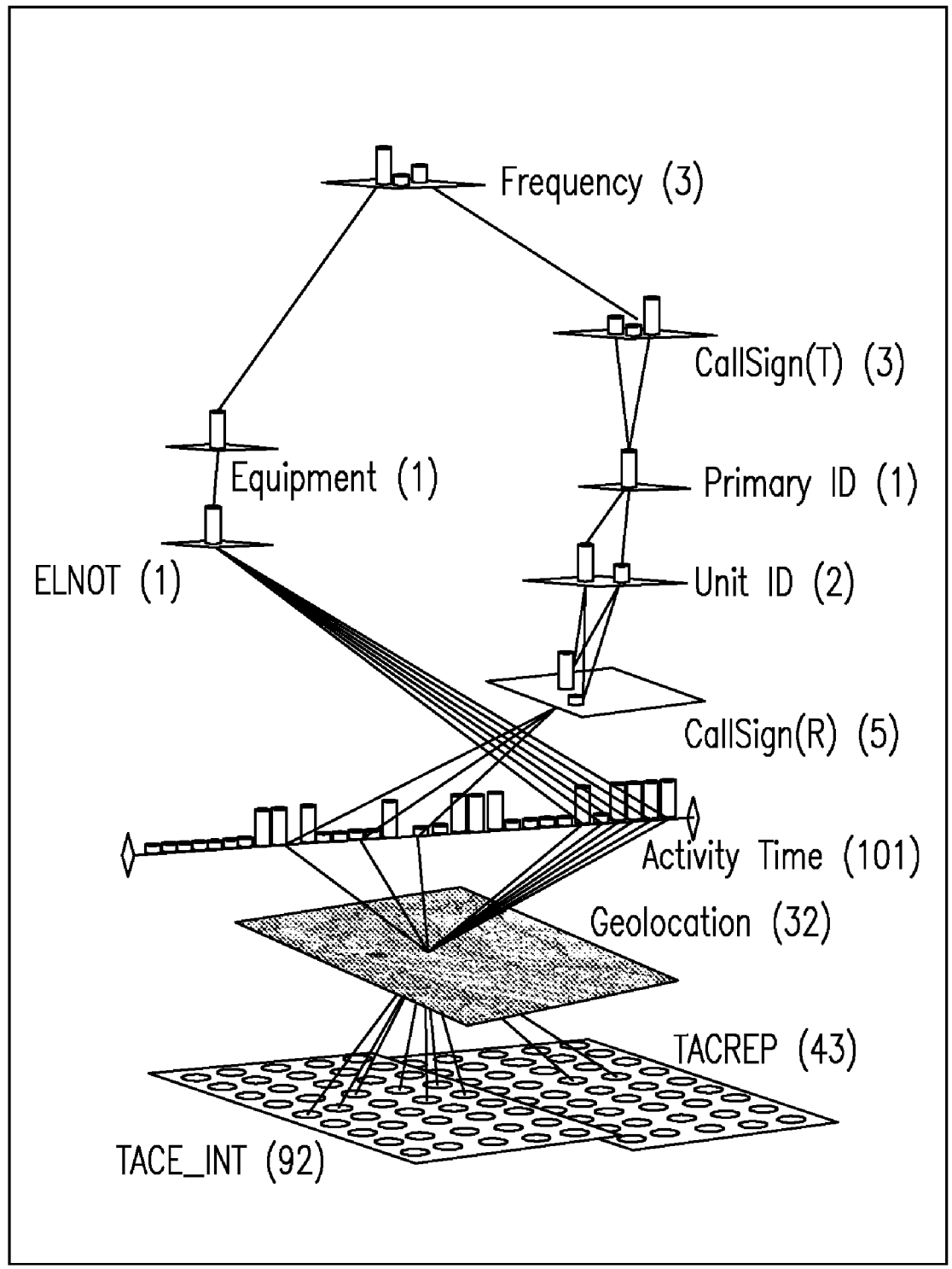
FIG. 29 is a screen shot illustrating a link array resulting from a spatial query in the example of FIGS. 26-28.

The resulting Link Array (FIG. 29) shows that 92 TACELINTs and 43 TACREPs reference locations in the area of interest, and presents a synthesized view of relationships among the structured properties of those items. The analyst quickly notes that several infantry units and an air defense radar are active in the area, that their activity has recently begun to increase, and that they are apparently on the move. Suspecting that these units are preparing for some type of action in response to the recent activity of the war crimes tribunal, the analyst returns to the Information Space View and switches the IIR-TACREP InfoSet to a Network View that now represents the TACREPS as edges in a network diagram. Next, she color-encodes the TACREPs according to the frequencies used in the transmissions. The analyst then executes an additional Content Query for all items describing activity occurring within the last twenty-four hours.

Figure 30:
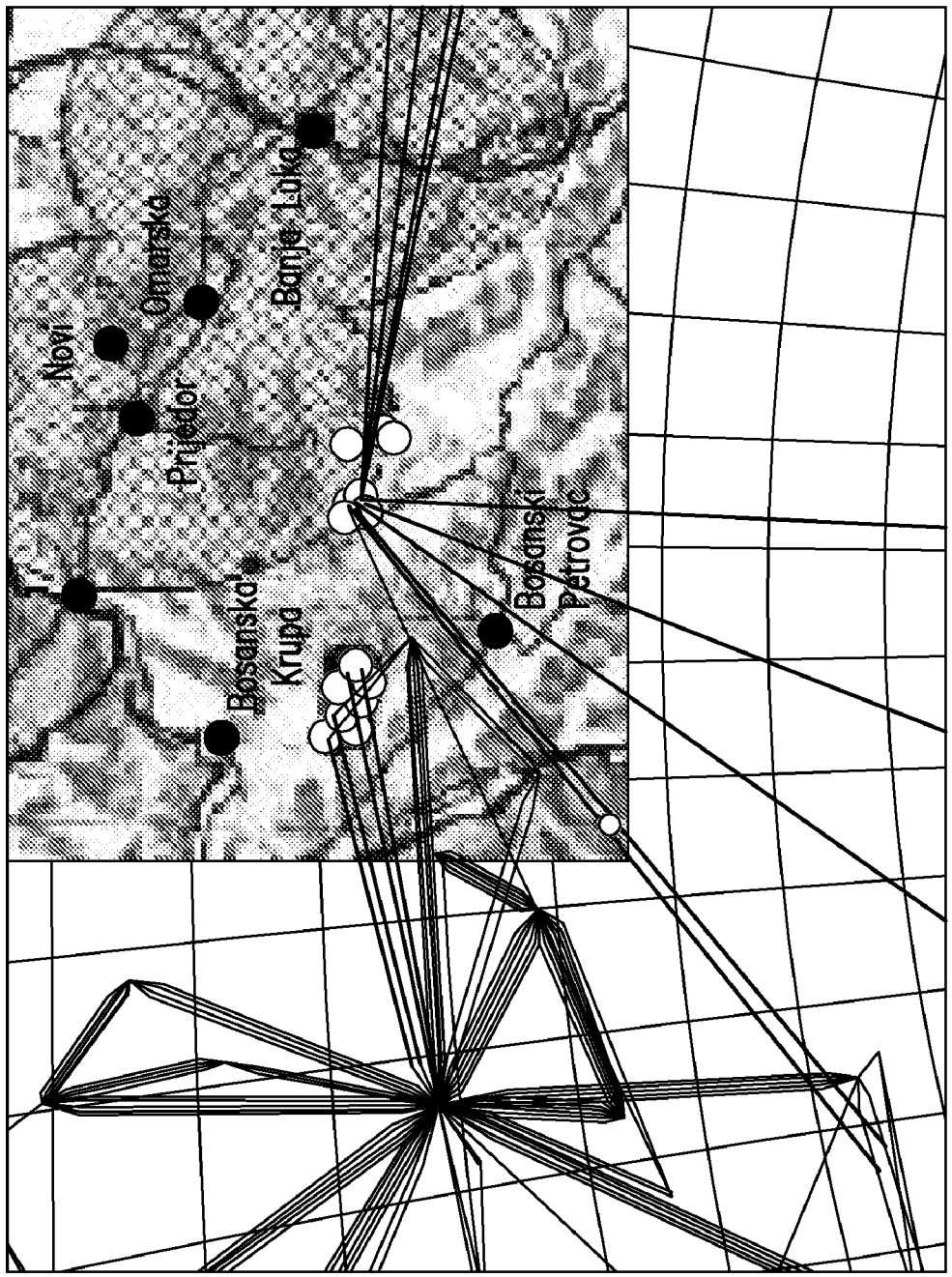
FIG. 30 is a screen shot illustrating the results of a Content Query for all items describing certain activity in connection with the example of FIGS. 26-29.

The resulting display (FIG. 30) shows widespread radio activity on a number of radio nets. At this point the analyst is in a position to quickly be able to identify the precise temporal sequence of the transmissions, the locations of the transmitters at any point in time, the topics being discussed in the transmissions of any particular unit or the units sharing a particular radio net, retrieve human intelligence reports describing the same concepts, or analyze relationships among the voice radio communications and patterns of radar activity.

Web Communities

The Network View can be used to find and interpret interesting features in Web page hyperlink structures. When coupled with the Concept View text visualization capabilities, new forms of Web exploration become possible.

Figure 31:
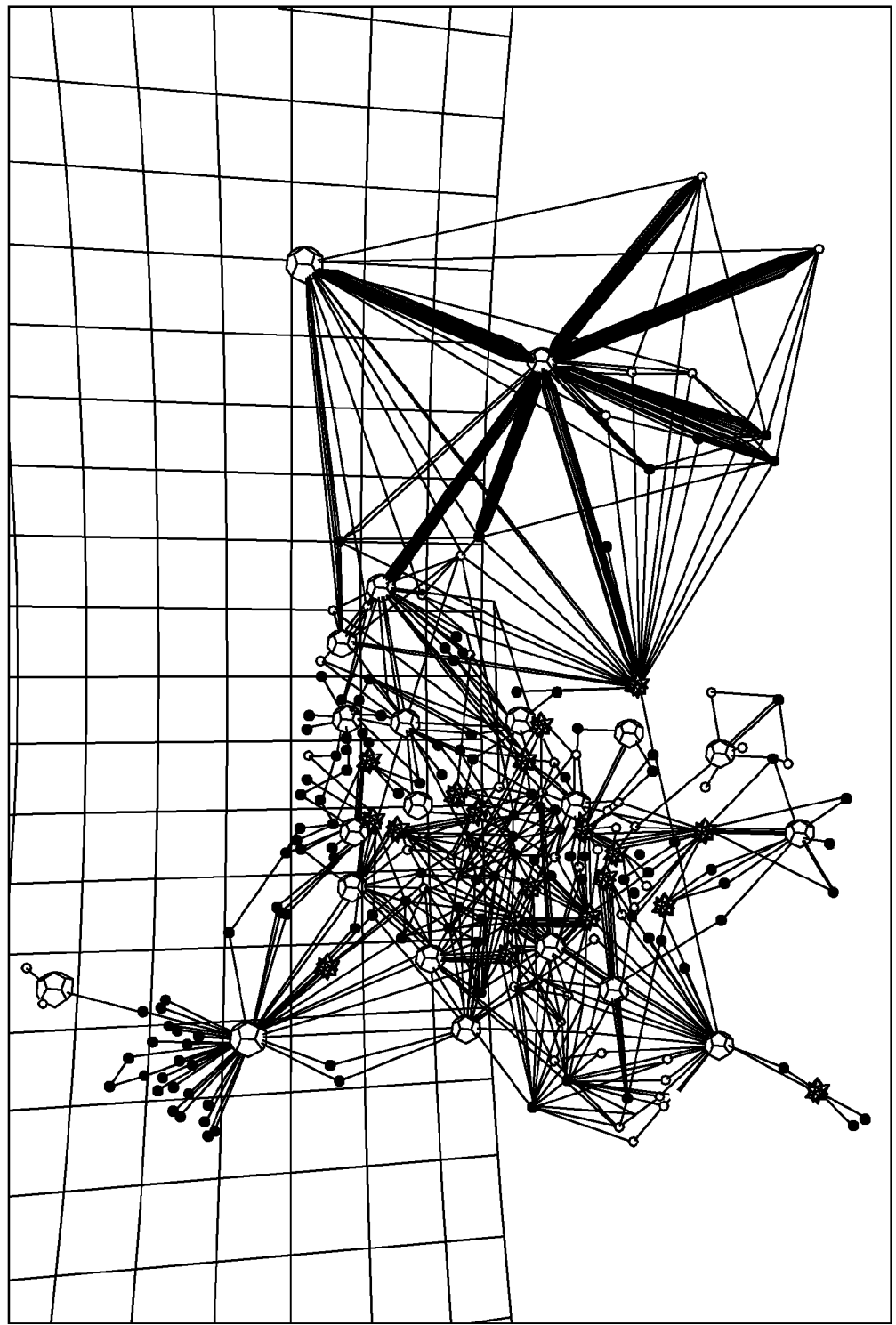
FIG. 31 is a screen shot illustrating use of a network view in accordance with various embodiments of the invention being used to find and interpret features in Web page hyperlink structures.
Figure 32:
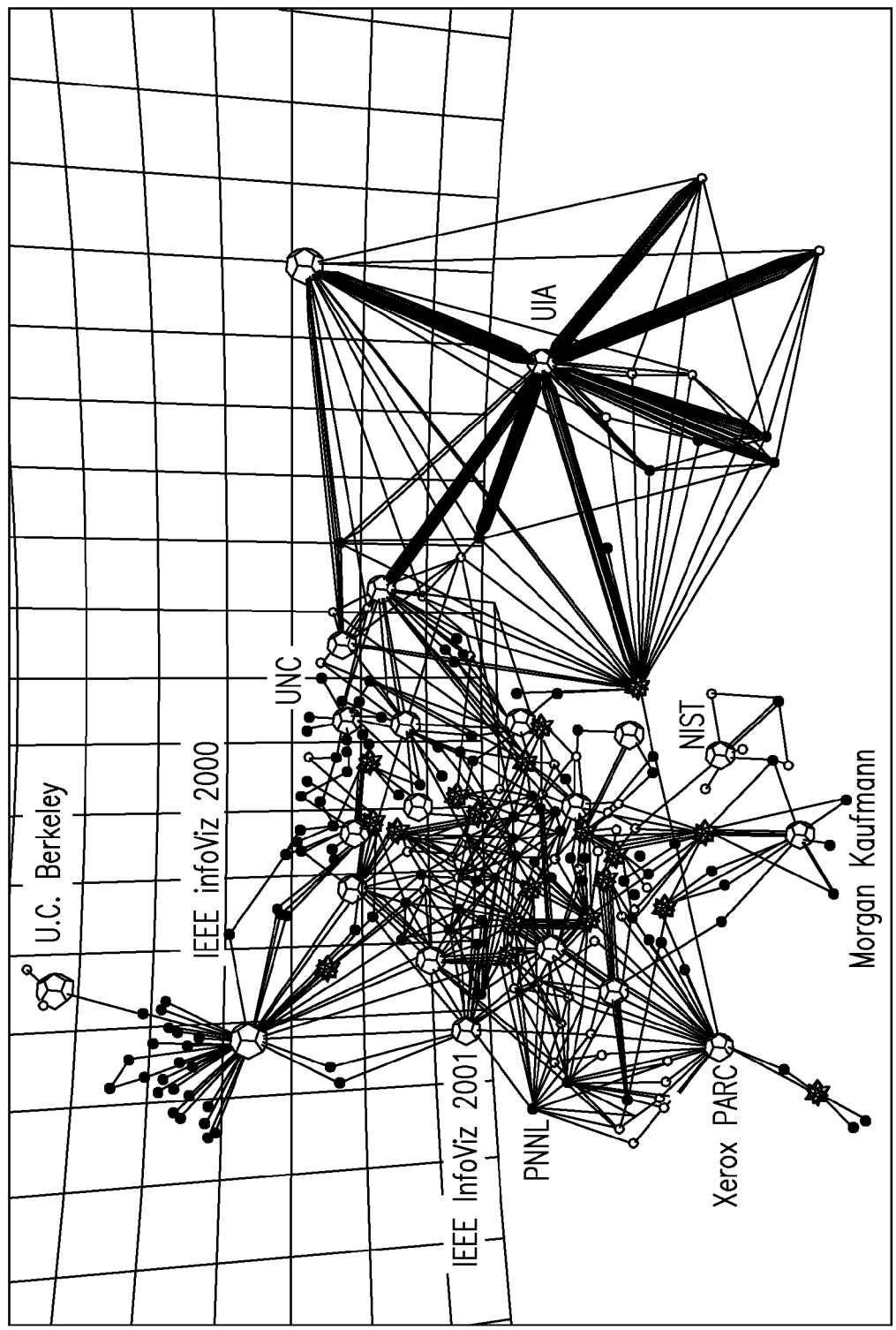
FIG. 32 is a screen shot of an annotated version of FIG. 31 showing selected organizations responsible for the pages in the collection.
Figure 33:
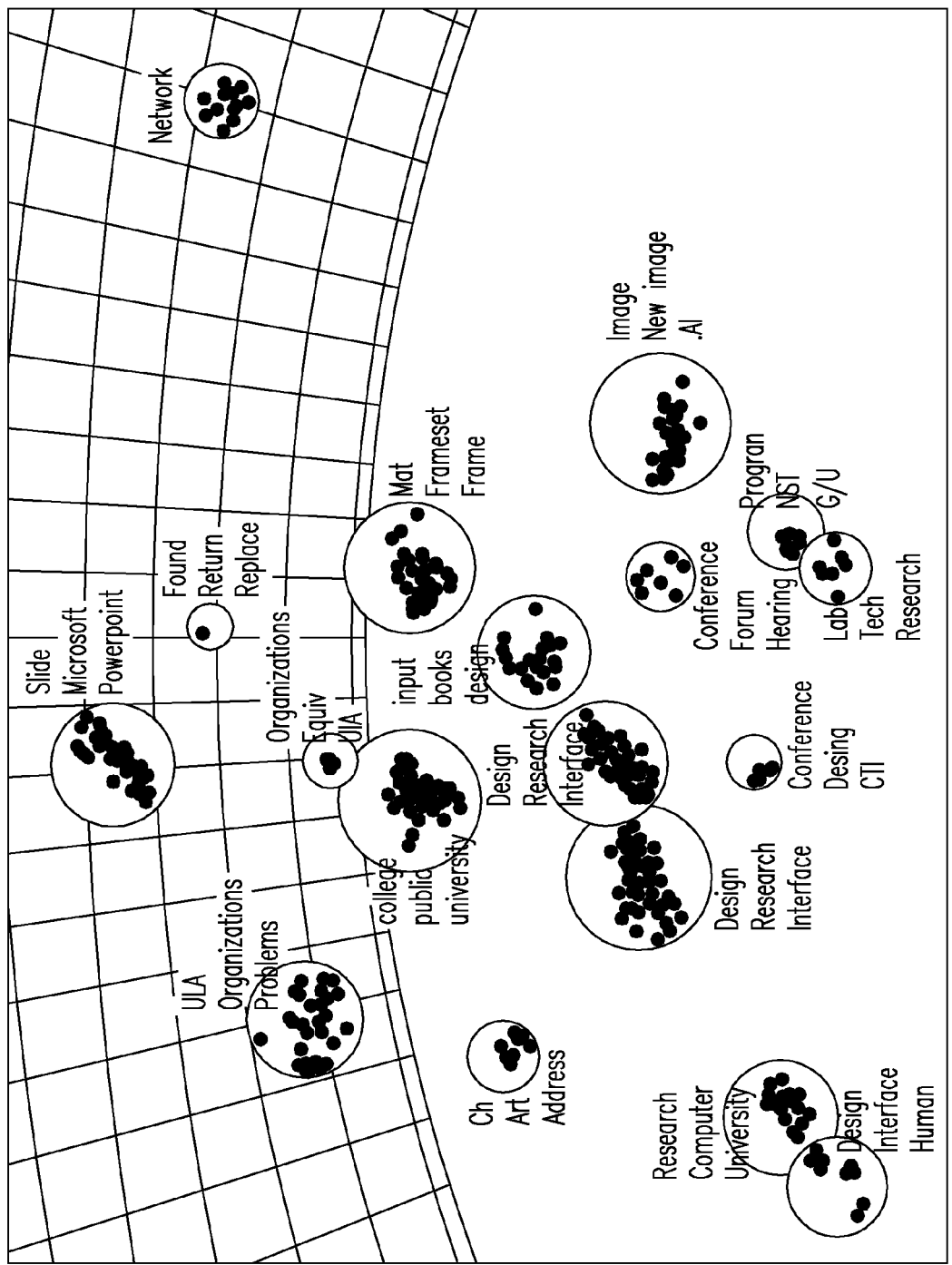
FIG. 33 is a screen shot that illustrates the same Web page collection shown in FIGS. 31-32 displayed as a concept view in accordance with embodiments of the invention.

Recent work by researchers at IBM Almaden and elsewhere has shown that document hyperlink topologies reveal a great deal of information about the relative importance the authors of the documents confer on the material produced by themselves and others. Analysis of such link topologies can reveal the presence and structure of so-called "web communities," collections of closely related Web pages that reference one another. FIGS. 31-33 illustrate how the system can be used to interpret not only the hyperlink structure of such communities, but also the topical content of the documents, and their relative locations in Web taxonomies such as Yahoo or the Open Directory. For example, FIG. 31 shows a Network View representation of the "Information Visualization" Web community. This collection of Web pages was harvested using the Google™ search engine to retrieve the top 100 ranked pages containing the phrase "information visualization," as well as all pages that link to, or are linked to from, the pages in the query result set. The collection has approximately 1500 pages. In this view, nodes represent discrete Web pages, and edges represent hyperlink references among the pages. In some embodiments, the pages are color-encoded according to their link class, with pages in the original result set colored green, result set inlinks colored blue, and result set outlinks colored yellow, for example. Note that the majority of the result set pages are embedded in the clique (dodecahedra) and cluster (stellated dodecahedra) nodes.

FIG. 32 is an annotated version of FIG. 31 showing selected organizations responsible for the pages in the collection. The majority of pages are from organizations who are actively engaged in information visualization research, chiefly universities. Note the collection of pages associated with the 2000 and 2001 IEEE Information Visualization conferences in the upper left. In the lower center-left of the image are a group of pages from the site of publishers Morgan Kaufmann describing a variety of HCl-related texts, including the authoritative survey text "Readings in Information Visualization: Using Vision to Think," which is referenced by a number of the pages in this collection. The large complex to the right is, surprisingly, a large collection of pages from the "Union of International Associations" website. Having assembled a large database of information related to international issues of critical importance (crime, racism, poverty, terrorism, etc.), the UIA is now apparently experimenting with techniques (chiefly network diagrams) for visualizing its contents. Most of the pages in the site co-reference one-another, resulting in the relatively coherent link structure shown. This webpage complex is only tenuously linked to the main community at a couple of locations (chiefly via the Atlas of Cyberspaces site), resulting in its location on the periphery of the overall diagram.

FIG. 33 illustrates the same Web page collection, now displayed as a Concept View. Again, green points represent pages in the query result set, blue represent inlinked pages, and yellow represent outlinked pages, for example. Note the relative abundance of inlinked and outlinked pages relative to result pages. This display shows conceptual correlations among the contents of the page text. Groups of conceptually related pages are shown displayed in the same cluster, and the clusters are arranged spatially such that clusters that are most similar are spatially adjacent. Likewise, within each cluster, the pages are spatially arranged in 3D such that pages that are most similar are spatially adjacent. Each cluster is labeled with a series of terms that best summarize the content of that cluster. Note that the individual concept clusters may be graphically selected in this view, resulting in them being highlighted in the display. When the display is switched back to the Network View, the highlight state is maintained. This provides an extremely effective means for quickly identifying the locations of pages describing key concepts within the link topology of the collection.

File Management

Many information resources are organized into hierarchical structures. The system's Hierarchy View can be used to explore the contents of extremely large categorical ontologies such as large, multipart documents, Web directories such as Yahoo, or, as shown in FIG. 34, large file directory structures.

As anyone who has navigated large file directory structures using a command line interface (or even graphical applications such as Windows Explorer) knows, keeping track of where things are (including where you are) can be a difficult problem. This becomes increasingly true as the size of such structures grow into the thousands or tens of thousands of items. With computer hard disk sizes of forty gigabytes or more now common, file management has become an increasingly pressing issue for many information workers. The system's visualization capabilities can provide an interesting and effective new approach to file management.

Figure 34:
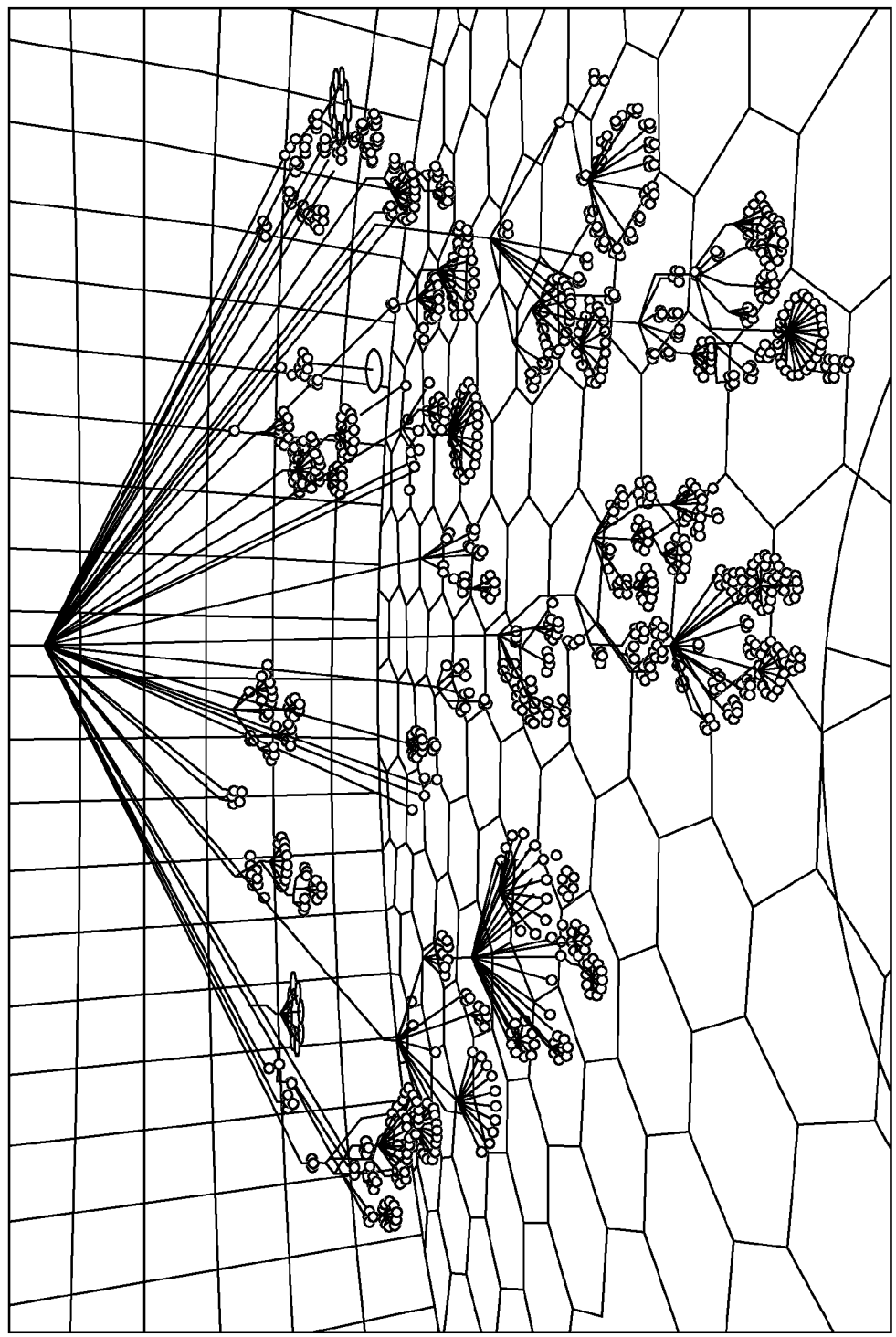
FIG. 34 is a screen shot of a Hierarchy View of a typical Microsoft Windows™ "Program Files" directory structure.

FIG. 34 shows a Hierarchy View of a typical Microsoft Windows™ "Program Files" directory structure that was mapped out using a DirCrawler information harvesting utility of the system 10, included in some embodiments. Provided with a starting directory, DirCrawler will, in the illustrated embodiment, navigate downwards through all constituent subdirectories, collecting file and directory property information as it goes. After this process has been completed, the application outputs an XML file (along with a corresponding DTD and stylesheet for displaying the XML file's contents) that can be used as input to the system. The directory structure shown in FIG. 34, by way of example, contains approximately 41,000 individual files organized into about 1400 discrete directories. The individual file glyphs have been color-encoded according to file extension, with image files (e.g., .jpg, .gif, .bmp) colored green, text documents blue, computer programming-related (e.g., source code) files orange, etc. Executable files (.exe, .dll, etc.) are shown in yellow.

Figure 35:
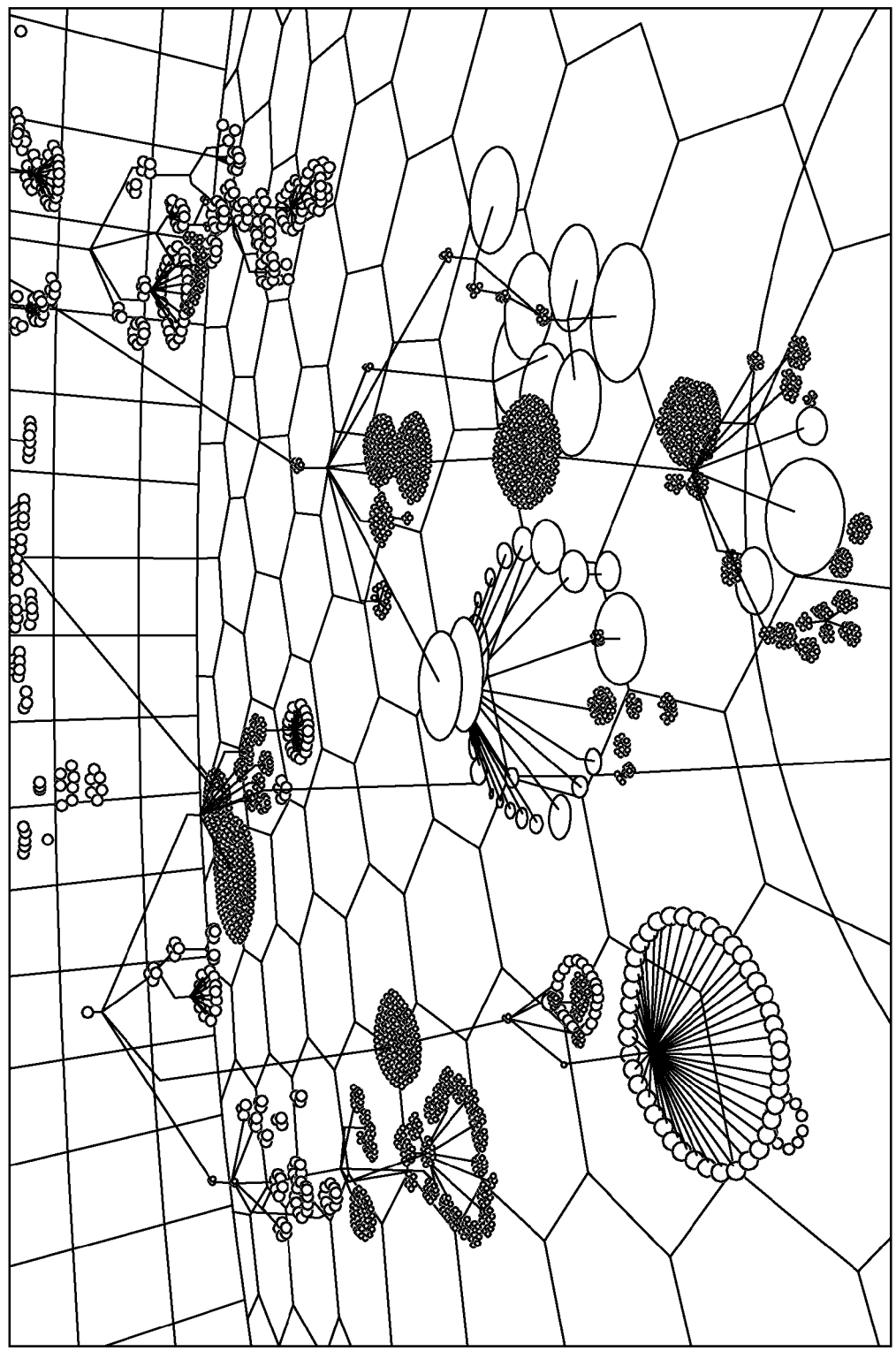
FIG. 35 is a screen shot of a close-up view of a directory structure created by a Microsoft Office™ installation.

FIG. 35 shows a close-up view of the directory structure created by a Microsoft Office™ installation. Note that the relative diameters of the "pans" associated with each directory in this View indicate the relative number of files in each directory. At the same time, the file extension color-encoding provides a general sense of the distributions of the various file types in each directory. Finally, the geometry of the "pan-tree" conveys additional directory tree breadth and depth information, along with parent/child relationships.

Figure 36:
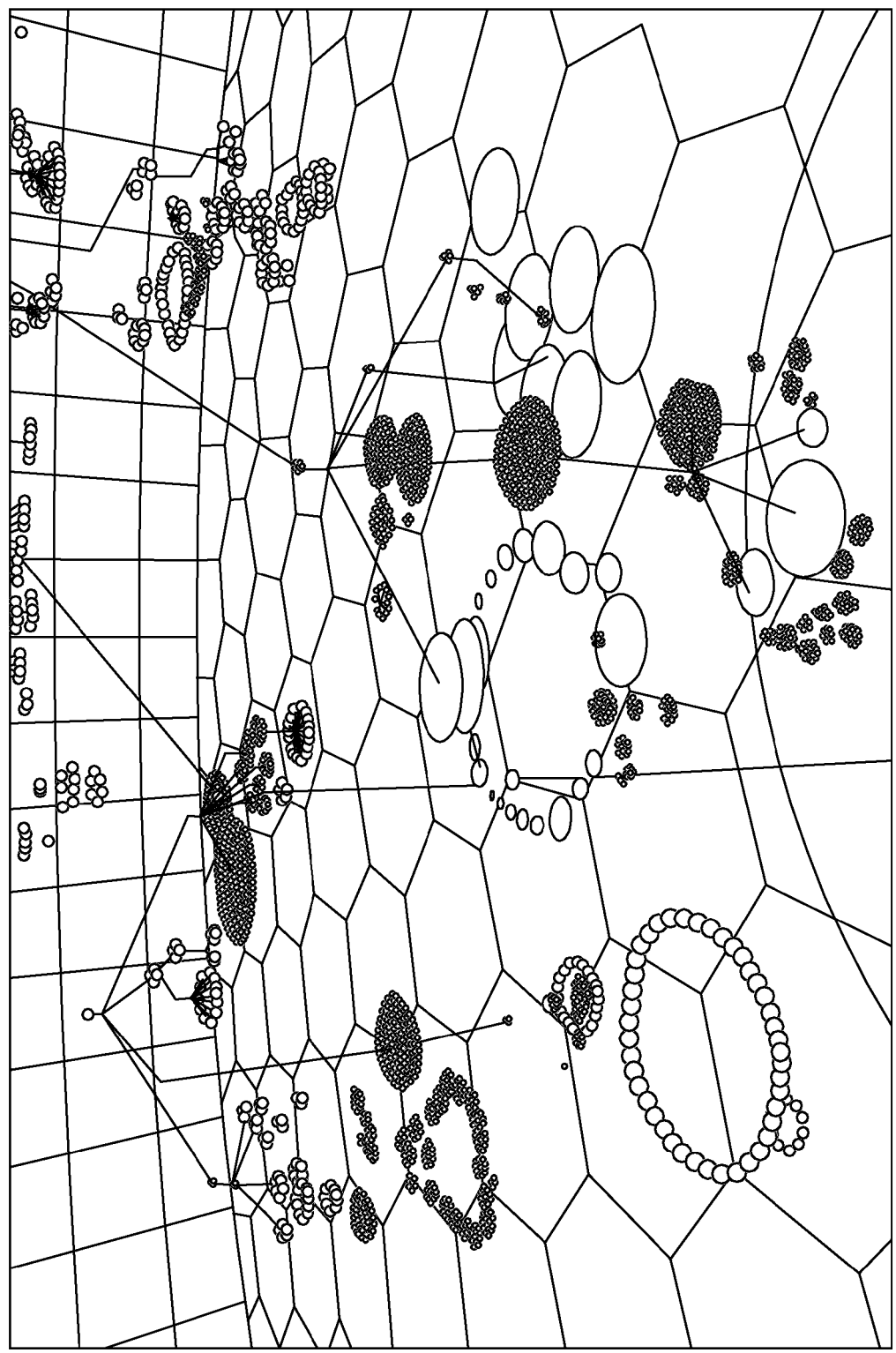
FIG. 36 is a screen shot of the same subdirectory structure of FIG. 35 above after a Content Query has been executed for certain files and directories.

FIG. 36 shows the same subdirectory structure shown above after a Content Query has been executed for all files and directories larger than 1 megabyte in size. Note that the majority of the larger files in this part of the directory structure are either executable files or library files (in the Microsoft Platform SDK directory, to the left). A number of large text files can be seen in the background, however. Should the user wish to investigate these files further, he or she could execute an Association Query against this result set to generate a Link Array showing detailed file property information, such as creation or modification dates. Additionally, the DirCrawler-generated stylesheet used to display the file property information contains a hyperlink that enables the user to open a particular file of interest from the system in whatever Windows application is associated with its specific file extension.

Network Security

Computer network security has become an increasingly pressing issue for many organizations. The system can enable network analysts to quickly achieve and maintain an in-depth understanding of network vulnerabilities and security status.

The system's network modeling and visualization capabilities can be used to analyze computer network data, such as data from Network Intrusion Detection Systems (NIDSs). Unlike most existing dedicated network visualization software, however, the system's data model is not limited to a few predefined, fixed fields. As a consequence, network analysts have complete flexibility in terms of the types of information they can associate with nodes (e.g., machine-specific information, such as installed security patches) and edges (e.g., NIDS log data, syslog data) in the diagram. This provides a powerful capability for jointly analyzing the full range of information types that may be available to network administrators.

Figure 37:
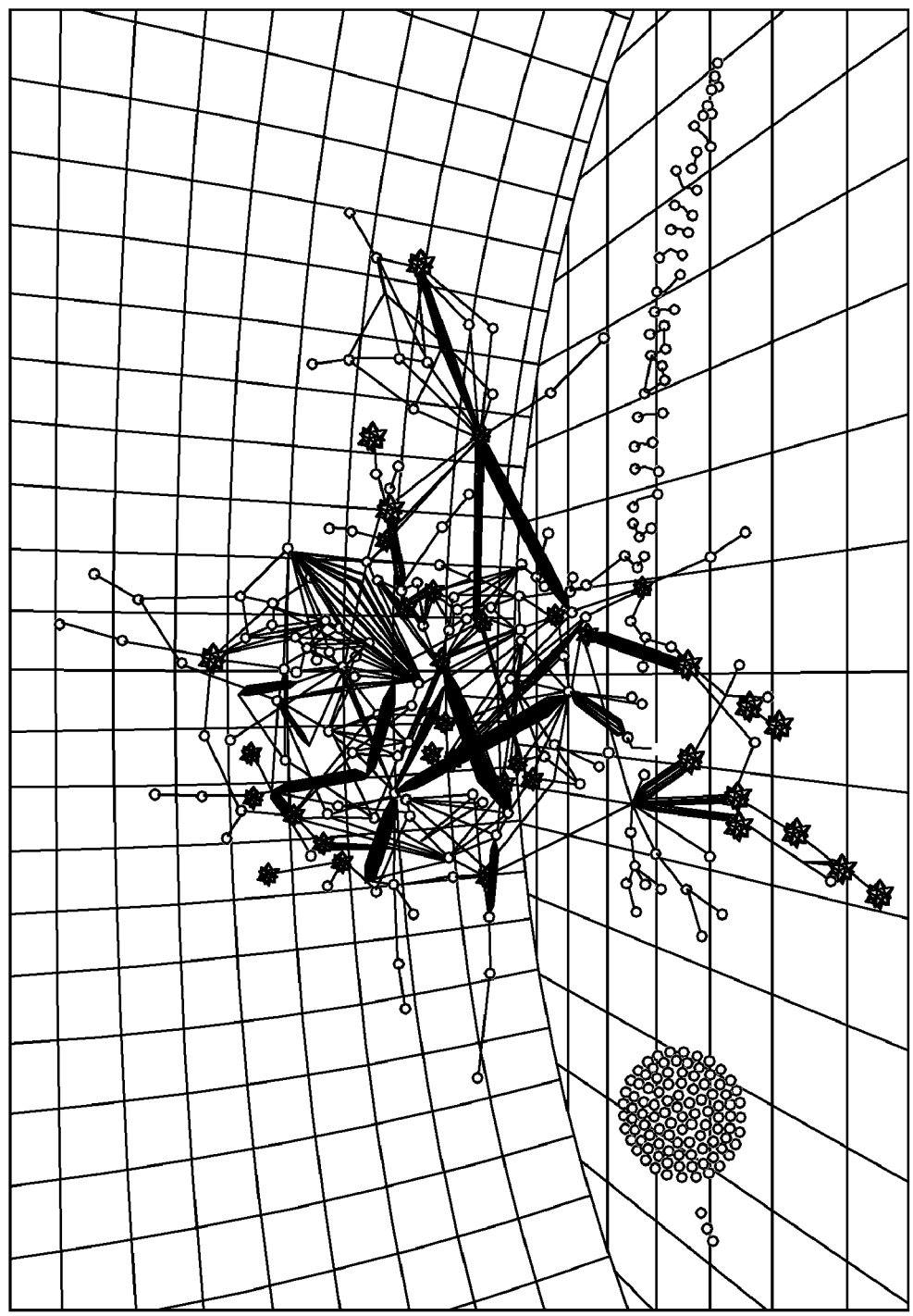
FIG. 37 is a screen shot of a network view of an example of computer network intrusion detection system data associated with an actual network intrusion incident.

FIG. 37 shows a Network View of computer network intrusion detection system (NIDS) data associated with an actual network intrusion incident. In this incident, several unauthorized users gained access to computers on official U.S. Government computer networks. In this example of "edge-oriented" network data visualization, individual NIDS log entries describing suspicious connections among computers are represented as edges in the display, with the nodes representing the individual computers (IP addresses) referenced in the data. This depiction portrays approximately 10,000 connections involving several hundred discrete IP addresses. In the illustrated embodiments, the edges in this display have been color-encoded according to the "warning level" of the connection, with bright yellow indicating the most critical events, for example.

Figure 38:
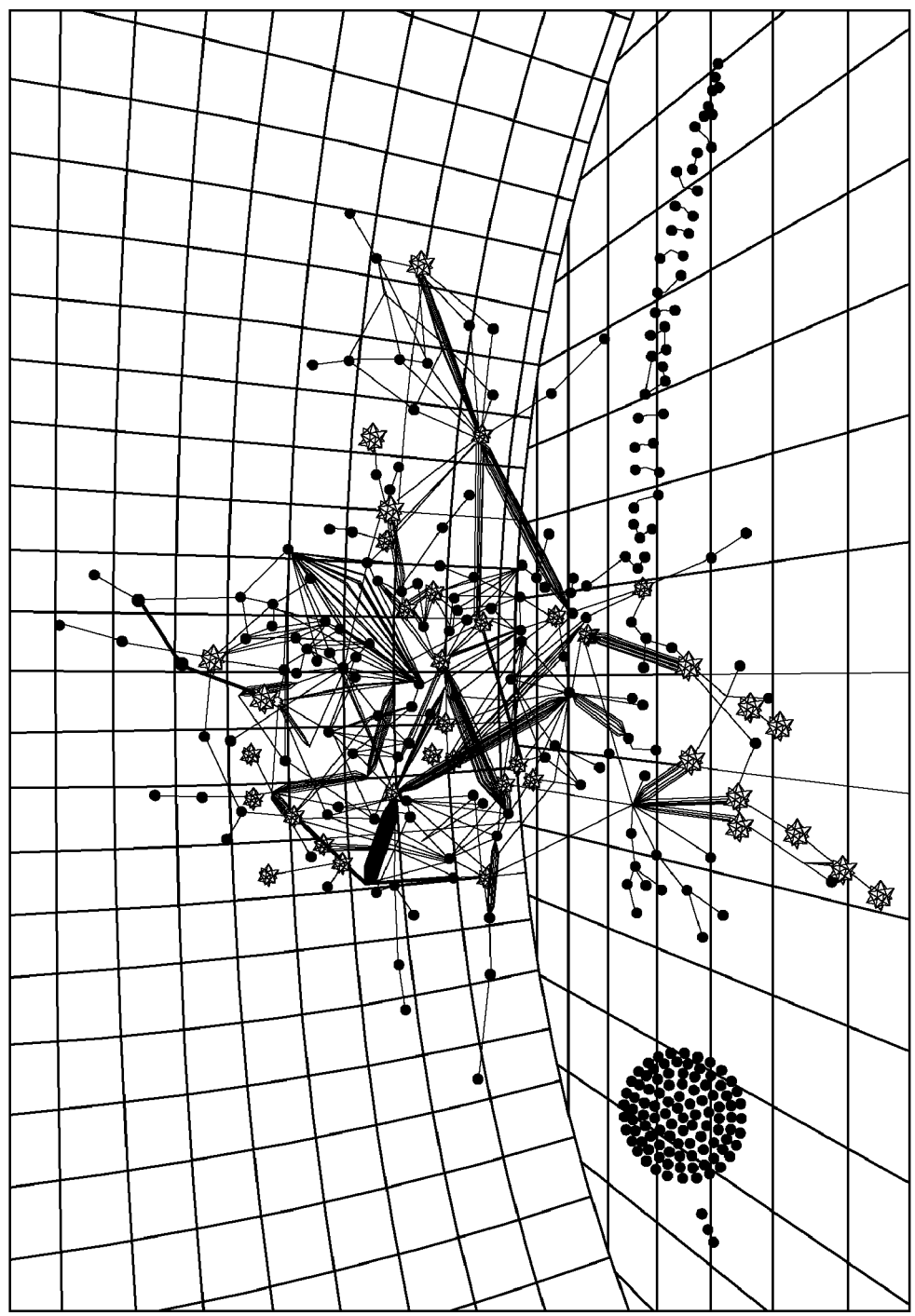
FIG. 38 is a screen shot of the same network view after a content query for all connections that originate at universities.

FIG. 38 is the same Network View after a Content Query for all connections that originate at universities. Note the single yellow (i.e., highest warning level) edge located at the lower right center of the image. This edge represents the initial unauthorized penetration of a machine on a Government network during the course of this incident.

Figure 39:
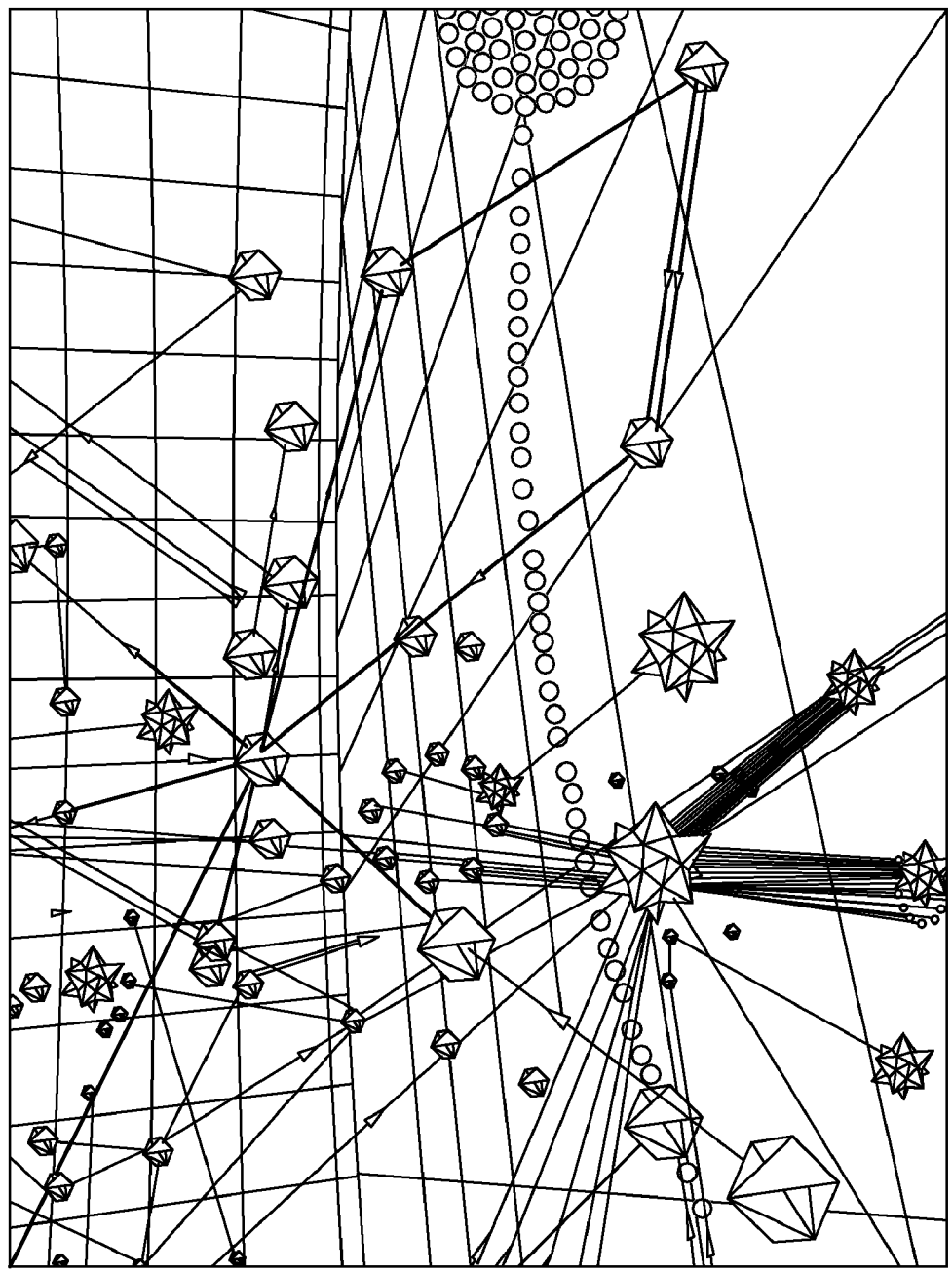
FIG. 39 is a screen shot of a close-up view of a suspicious connection from the view of FIG. 38.

FIG. 39 is a close-up view of the suspicious connection (yellow line, left) shown in the preceding image. The nodes are labeled with the IP addresses of the machines they correspond to (note that the IP addresses of the machines involved have been partially redacted for security reasons). Arrows located at the midpoints of the edges indicate the direction of connection. The initial display has been expanded to highlight additional connections branching out from the nodes in question. In this way, network security analysts can "walk"

the graph outward from any particular point to identify other machines that may have been compromised from the initial point of penetration.

Multidimensional Structured Data Visualization Apparatus and Method

These inventive aspects relate to simultaneously displaying correlations among multiple structured (i.e., field/value pair) attributes of multiple information objects. These objects may be variously items such as text documents, relational database records, or audio, video, or image metadata information. The visualization system and method enables interactive exploration of extremely complex correlations among the information objects, enabling information analysts to rapidly explore the correlation structure and identify features of interest in the data. Various aspects of the invention have been implemented in the system 10 of FIG. 1.

Figure 40:
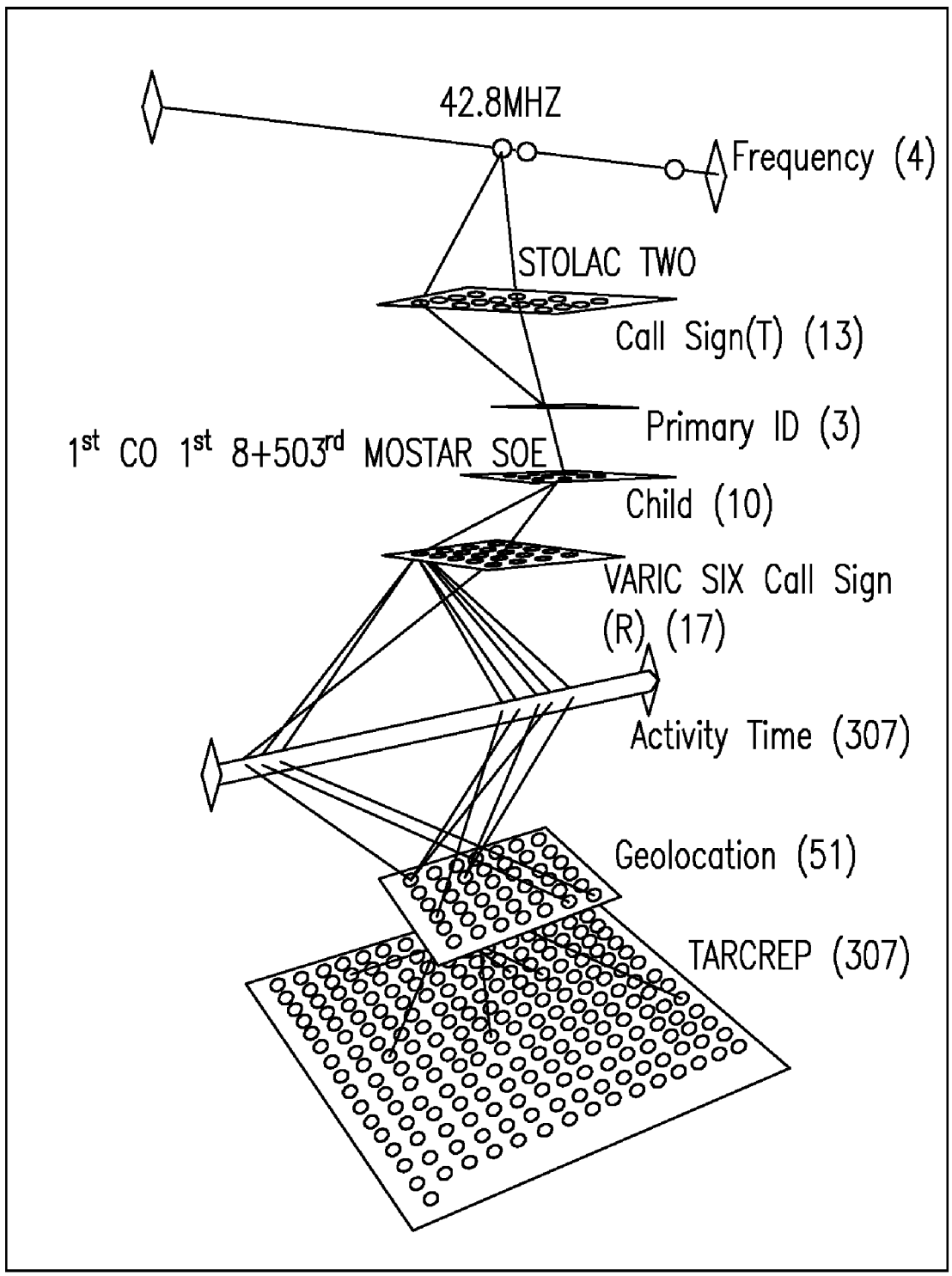
FIG. 40 is a screen shot of a typical link array in accordance with embodiments of the invention.

The visualization, called a Link Array (see FIGS. 17-19 and associated discussion, above), is generated in response to a specific query against a database. The query result set is then processed to generate a 3D geometric representation of the contents of the set. A typical Link Array is shown in FIG. 17 and in FIG. 40. The visualization consists of several components, that include planes or lines, representing data fields (e.g., "Frequency" in FIG. 40), nodes, representing data values (e.g. "42.8 MHz"), links, that show correlations among fields and values, and hence information objects, and labels, showing field names and value information.

The layout of the planes representing data fields is automatically determined based on a priori knowledge of semantic interrelationships among the fields (as captured in the database schema) and heuristics that guide plane placement in order to maximize interpretability. The lowermost plane or planes in the display contain representations of the information objects returned by the query. The planes and/or lines arrayed above the information object plane(s) represent fields members of the objects. Lines are used to show data associated with fields that have ordered values (e.g., numeric or temporal values), while planes are used for fields that are unordered (e.g., categorical data) or contain numeric value pairs (e.g., a geocoordinate consisting of a longitude, latitude pair). The nodes (3D shapes) arrayed on the planes and/or lines represent values occurring in the corresponding fields of the objects returned by the query. Link Arrays can be formed from information objects of different types that can reside in entirely separate databases. The field/value information is synthesized at query time, resulting in a single Link Array representation that shows field/value correlations among all the items that satisfied the query, regardless of object type or source.

Interactive analytical operations supported by the visualization design are as follows. The field values may be inspected by "brushing" the nodes with the cursor, or by opening a separate dialog box that shows all of the values in the result set for the corresponding plane. Selecting (i.e., "clicking on") one or more value nodes turns on a link display consisting of a set of one or lines that "tie together" all of the field/value pairs that are semantically associated with the pair represented by the selected plane/node combination. That is, the links connect all of the value nodes on the semantically related field planes that occur in all of the information objects that share the selected value. In this way, the user can generate displays that show correlations among upwards of dozens of dimensions of the data simultaneously. Further, the user is thus provided with full control over display complexity, and can elect to reveal or conceal as much of the complexity of the data as desired. Additional tools enable users to set filter "windows" to constrain the display of links associated with temporal or numeric data.

Figure 41:
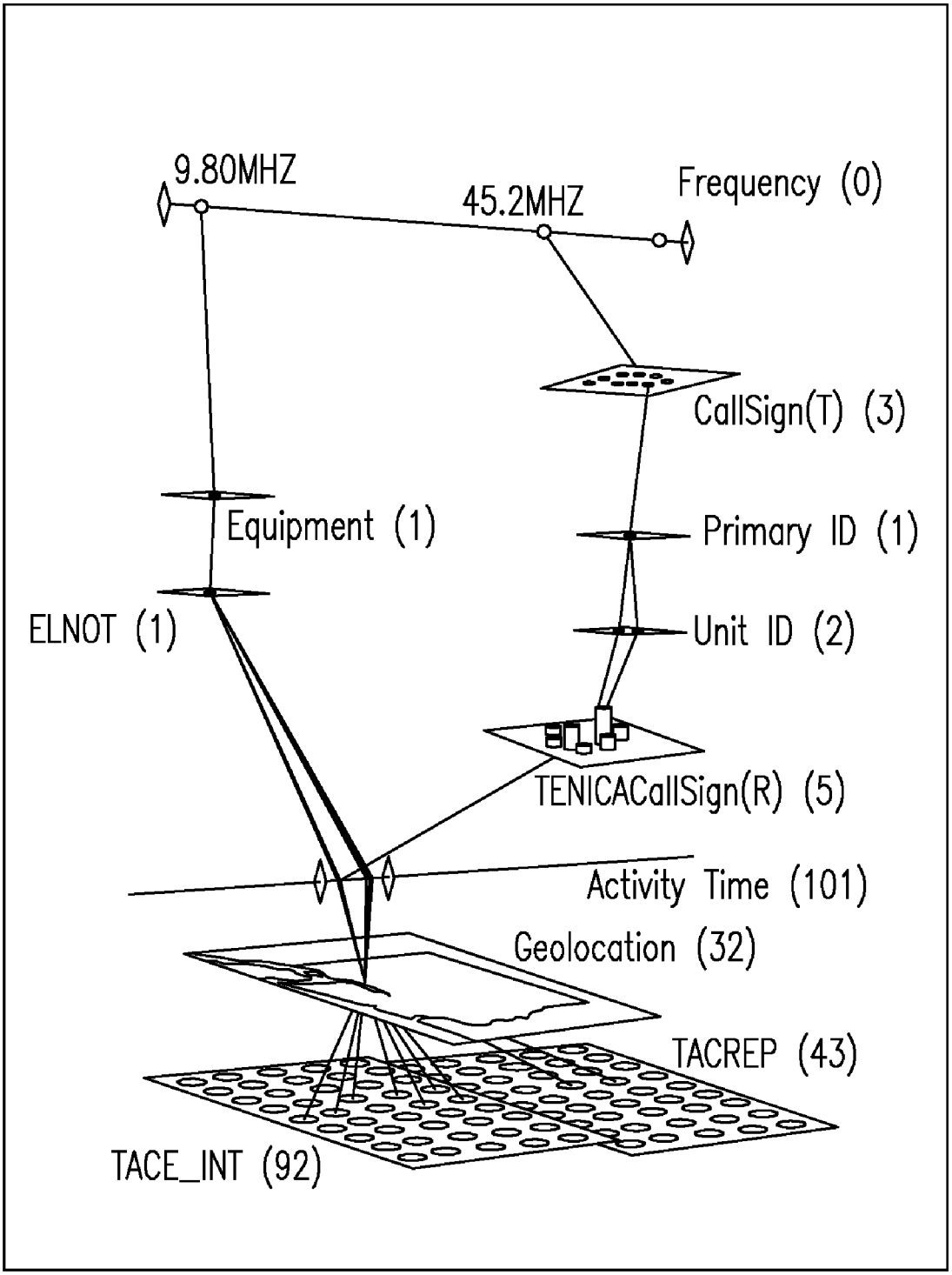
FIG. 41 is a screen shot of a slightly more complex link array than the version shown in FIG. 40.

The interpretability of the display can be enhanced by applying various color- or shape-encodings to the field values and information object representations, and by placing 2D digital maps or images in planes to provide a graphical context for the information under study. FIG. 41 shows a slightly more complex Link Array showing some of these more advanced capabilities. Note that the Array shown in FIG. 41 is displaying, in a very concise form, correlations across nine dimensions of the information contained in 135 objects of two distinct types.

The Link Array device serves not only as a visualization tool in it's own right, but also as a control device for manipulating other, associated visualization components of the system 10. For example, manipulation of links in a Link Array may cause changes to the symbology display on a map that has been tied to the Array. Likewise, Link Array manipulations may cause changes to the link display in an Information Space display. This coupling of visualizations helps enable information analysts to develop a comprehensive understanding of highly complex, multifaceted data interrelationships occurring in large, heterogeneous, information collections.

This work can be considered an extension and generalization of the technique of Parallel Coordinates, see Inselberg, A., and Dimsdale, B., 1990, "Parallel Coordinates: A Tool For Visualizing Multi-Dimensional Geometry," In: Proceedings of Visualization '90, pp. 371-378.

FIG. 41 is a more complex Link Array showing color encoding of field values, the use of image data (in this case, a map) to provide a visual context for field values, and correlations across multiple information object types. Note the filter setting on the "Activity Time" field is currently limiting the link display to only those links associated with time values occurring within a set range.

Text Visualization Apparatus and Method

There are at least two major aspects of these inventions. The first is a novel system and method for generating geometric representations of large collections of digital text information. These representations convey to the viewer information about the general concepts described by the text serving as a graphical "table of contents' for a collection. The second aspect of the invention is an approach for interacting with the generated text representations in a way that makes it possible to visually intercompare other characteristics of the text collection (e.g., publication date, author, etc.) with the general concepts they describe. These aspects enable information analysts to rapidly develop an in-depth understanding of the "who, what, when, and where" semantics of the text set. These aspects are implemented in the system 10 of FIG. 1 that has been described above in connection with FIGS. 1-39.

A set of vectors characterizing, in mathematical form, the conceptual content of a collection of text documents, is used as an input. Each document is represented by a vector of arbitrary length (but typically 100-200 elements). Each element of the vector contains a numeric value representing the strength of occurrence of certain linear combinations of words that describe the major concepts or topics occurring in the collection as a whole. Numerous methods exist for generating such vectors. For example, such vectors can be generated using the Boeing Phantom Works TRUST (Text Representation Using Subspace Transformation) algorithm.

The visualization method processes the input vectors to generate a three-dimensional (3D) spatial representation of the document collection that conveys information about the general topics and subtopics described by the documents in the set. In this representation, each document is represented by a three-dimensional glyph, or shape, that can be color- and/or shape-encoded to convey information about the document's internal properties. The document glyphs are sorted into groups by a novel clustering algorithm (described below), and the groups are arranged in 3D space such that clusters containing documents that are conceptually similar are located together in near proximity. Further, the clusters are labeled with descriptive terms describing the general conceptual content of the clusters. These labels can be thought of as "chapter headings" for the set. Additionally, documents that are conceptually similar to one-another within a particular document cluster are also arranged near one another in the display, and the various regions of the individual cluster display are also labeled ("sub-chapter headings"). The intended effect is to (automatically) generate a sort-of graphical "table-of-contents" for the text collection, concisely summarizing its content and serving as the basis for "top-down" browsing of the collection.

The three-dimensional geometry of the display is generated by a vector quantization-projection (VQ-P) algorithm. First, the document vectors are quantized, or clustered, into topically related subsets. These subsets can be recursively quantized, if necessary, in order to accommodate larger (100,000+ element) document collections.

Then the cluster centroids are derived and down-projected to 3D via a nonlinear projection method such as multidimensional scaling (MDS) or Sammon's Mapping. This generates a set of 3D coordinates for each cluster centroid such that the centroids for clusters that are topically similar to one another are located near one another in 3-space. Next, a new "local" coordinate system is established at the location of each cluster centroid, scaled according to the number of vectors in the cluster. The document vectors within each cluster are then individually downprojected in these "nested" coordinate systems in isolation from the vectors contained in the other clusters. Unlike other previously developed methods, this nested "global" plus "local" down-projection technique enables the generation of displays that convey information about not only the gross topical features of a text information space, but also the detailed information about local, intra-cluster topical relationships.

The vector quantization method employed is a hybrid approach that is fast, accurate, and enables the detection of irregularly shaped clusters. First, the (text) vector feature space is "mapped" using a variant of the Growing Neural Gas (GNG) algorithm, a self-organizing neural network that iteratively grows in size and adapts itself to match the features of a set of input vectors. The operation of the GNG algorithm is diagrammed in FIG. 42. The network continues to adapt and grow until a stopping criteria is met, which is the achievement of either a minimum acceptable mapping error or a maximum number of nodes. At the conclusion of the GNG mapping, the input vectors are assigned to the nearest GNG node, providing a low-level discrete partitioning of the input feature space.

Figure 42A:
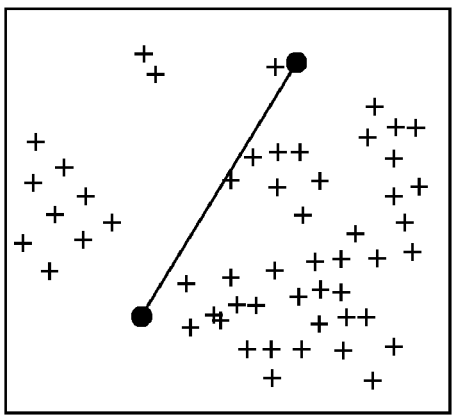
FIG. 42 illustrates operation of a growing neural gas (GNG) algorithm.
Figure 42B:
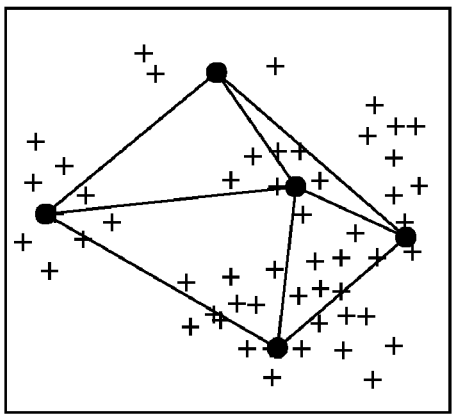
Figure 42C:
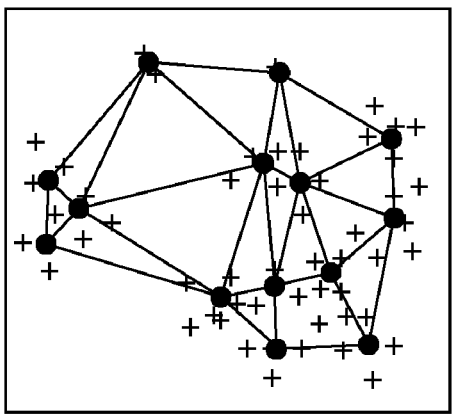

FIG. 42 illustrates a conceptual operation of the Growing Neural Gas (GNG) algorithm (document vectors represented as crosses). The network initially consists of two connected nodes (a). At each iteration of the algorithm a random vector is selected from the feature set, and the nearest network node is adapted towards it, along with that node's immediately connected neighbors. At regular intervals, new nodes are introduced into the network in the region of highest error (b). In this way, the network rapidly "grows", adapting itself to the configuration of the feature space (c). Note that while the operation of the algorithm is diagrammed here in two dimensions, the text feature spaces mapped in practice are typically on the order of 100-200 dimensions.

After the neural network has converged on a solution, the Minimal Spanning Tree (MST) of the nodes generated by the GNG procedure is found. The edges of the MST are sorted by length, then progressively broken starting with the longest edge in order to generate a hierarchical partitioning of the node collection (and hence of the input feature space). The nodes are initially assigned to a single cluster. As each MST edge is broken, the cluster in which it resides is found. That cluster is then divided in two and the member GNG nodes are reassigned accordingly. The edge-breaking procedure continues until a specified number of clusters is obtained. After this process is completed, the centroid of each cluster is found by determining the mean of the (n-dimensional) coordinates of all the document vectors in the cluster. At the end of the procedure, the input vector space has been partitioned at two levels of granularity, which we call the "cluster" (complete MST branches connected to one or more GNG nodes) and "subcluster" (individual GNG nodes) levels.

The clustering algorithm described here has several advantages over existing approaches. First, the GNG algorithm has a smaller time complexity and is less susceptible to poor initialization than other partitioning-type clustering algorithms (e.g., K-means). This translates into the ability to more accurately and comprehensively map a given vector feature space in a fixed amount of time. Secondly, fitting an MST to the set of cluster prototypes generated by the GNG algorithm converts a discrete partitioning to a hierarchical one, enabling cluster discovery at arbitrary levels of granularity. From a signal-processing standpoint, this hybrid approach enables better sampling of the input feature space, avoiding the aliasing problems inherent in other quantizing schemes and enabling the discovery of irregularly shaped clusters.

Figure 43A:
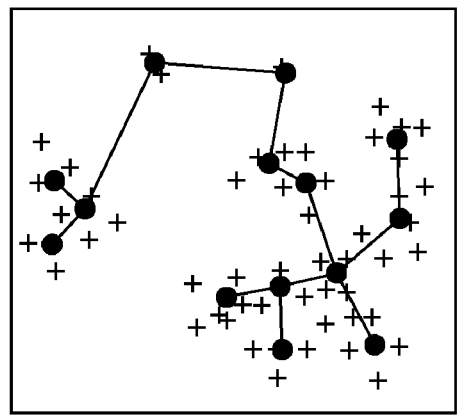
FIG. 43 shows quantization of the feature space map generated by the GNG algorithm.
Figure 43B:
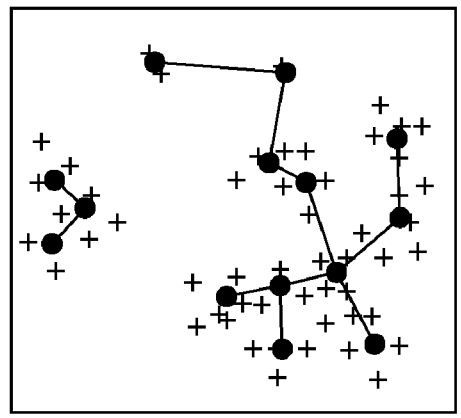
Figure 43C:
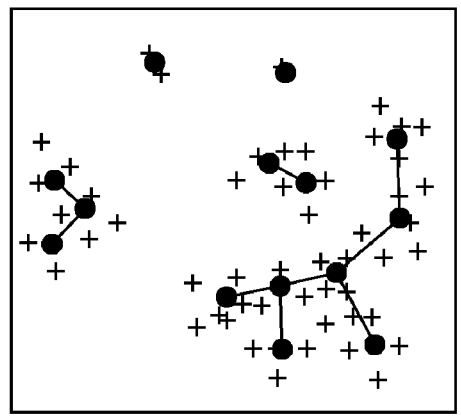

FIG. 43 shows quantization of the feature space map generated by the GNG algorithm. First, the Minimal Spanning Tree (MST) of the set of cluster prototypes generated by the GNG algorithm is found (a). Next, the MST edges are sorted according to length, then progressively broken, starting with the longest edge (b). Edge elimination continues until a stopping criterion related to desired final display complexity is satisfied. FIG. 43 (c) shows five clusters found in the input feature space after elimination of the four longest MST edges.

The next step in the process is the generation of a 3D geometric representation of the document set based on the results of the vector quantization operation. This involves first down-projecting the derived cluster centroids from n-dimensions to three dimensions using the metric MDS algorithm. Metric MDS attempts to find (in this case) a 3D spatial configuration that as closely as possible simultaneously reflects the true n-space distance relationships among the text vectors. While there is inherently a great deal of distortion resulting from this process, in practice the inventors have found that even algorithms that simply try to preserve rank-ordering relationships (not absolute distances, e.g., Sammon's Mapping) still provide useful and informative geometric cluster arrangements that effectively mirror topical relationships in the data.

After the cluster centroids have been downprojected, a new, "nested" coordinate system is established at the location of each 3D-cluster coordinate. The new coordinate system is volumetrically scaled according to the number of items in the cluster. Then, the individual document vectors assigned to the cluster are downprojected in this new coordinate system, along with the coordinates of GNG nodes assigned to the cluster. In the illustrated embodiment, the text and GNG node vector down-projection procedure uses a hybrid projection algorithm for performance reasons. In the illustrated embodiment, if there are fewer than 100 vectors in the cluster, metric MDS is used directly. If there are 100 or more vectors, a total of 100 vectors, comprised of all of the GNG nodes and a representative sampling of document vectors from the GNG clusters is first down-projected using metric MDS to form an initial "framework" in 3-space. Then the remaining text vectors are down-projected relative to this framework via triangulation using the 3-space coordinates and distances to the four closest framework vectors in n-space. The algorithm used is substantially similar to that used by GPS receivers to determine the location of the receiver relative to the known locations of four satellites given the pseudo-range distances to the satellites.

Figure 44:
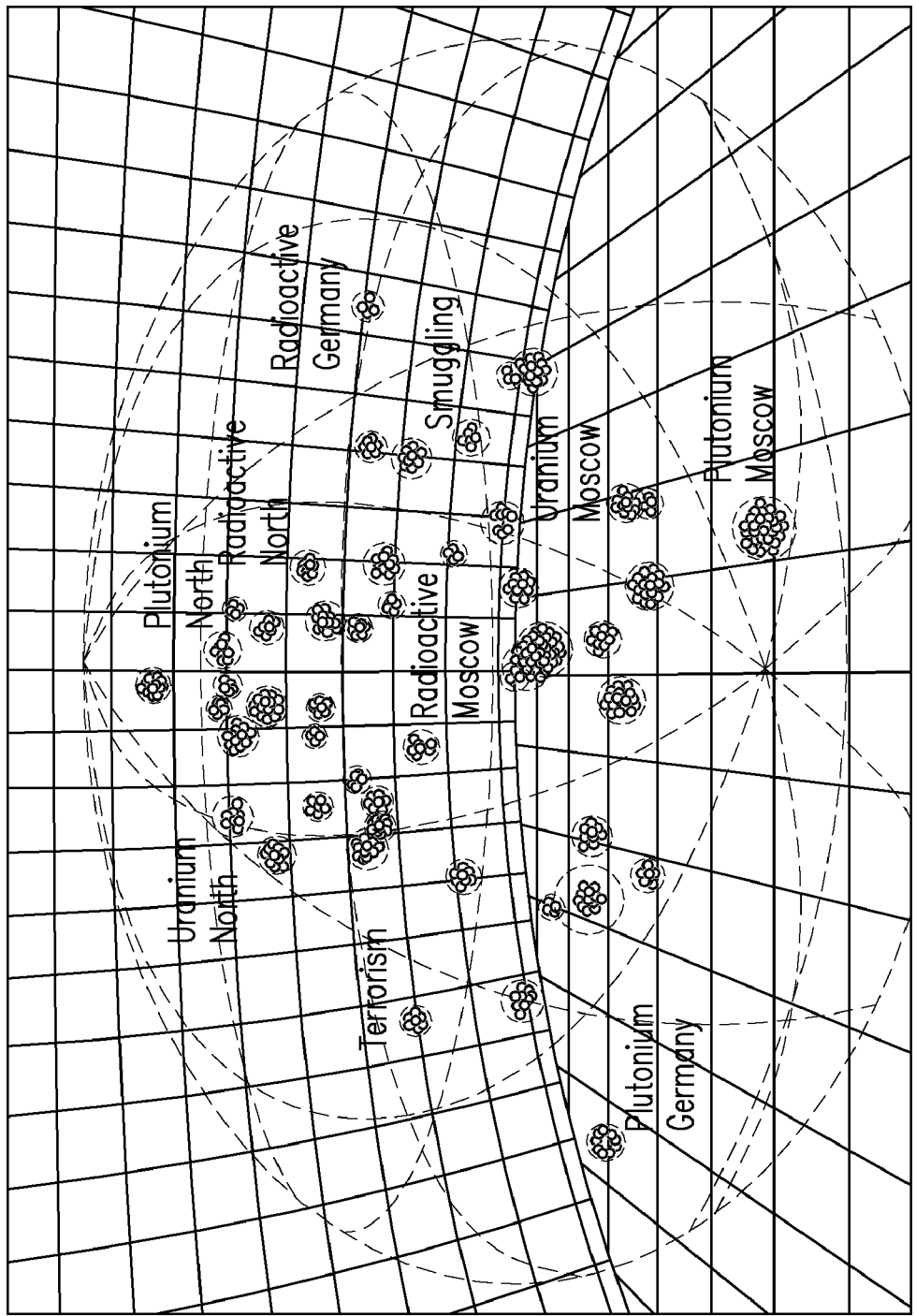
FIG. 44 is a screen shot of an exterior view of a sample text collection visualization generated by the procedure showing clusters, cluster descriptive labels, and cluster positioning.
Figure 45:
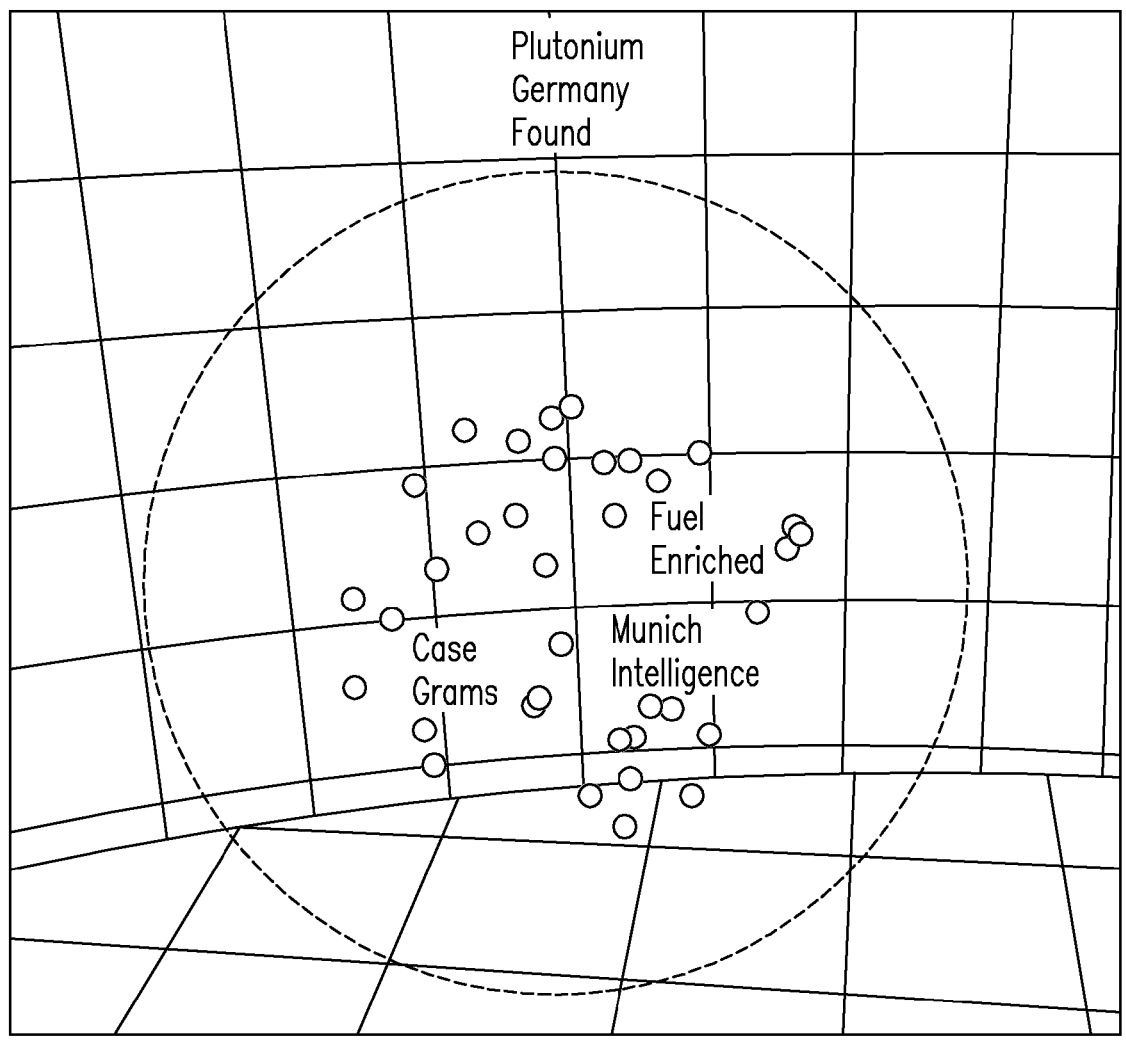
FIG. 45 is screen shot of a close up view of an individual cluster showing "local" document down-projection and subcluster labels.

On completion of the down-projection procedures, descriptive labels are generated for, both the clusters and subclusters generated by the vector quantization procedure. This is accomplished using a text summarization package capable of accepting as input a set of text documents and returning a set of characteristically descriptive terms for the set. In some embodiments, the Boeing TRUST engine is used to perform this function, however, other text summarization solutions exist and could be used instead. In the case of clusters, the labels are located above the cluster representation. In the case of subclusters, the labels are located at the down-projected GNG node coordinates. Recall that the GNG nodes are located (in n-space) at the mean coordinate of the text vectors assigned to them. Down-projecting the GNG nodes along with the text vectors results in their location likewise in the midst of the documents assigned to them. Placing the descriptive labels at this location is similar to placing a "signpost" describing the general concepts to be found in the documents in that region of the scatterplot. FIGS. 44 and 45 show overview and detail views of a typical text visualization generated by the procedure.

FIG. 44 is an exterior view of a typical text collection visualization generated by the procedure showing clusters, cluster descriptive labels, and cluster positioning.

FIG. 45 is a close up view of an individual cluster showing "local" document down-projection and subcluster labels.

The visualization display incorporates several interactive capabilities that increase the value and utility of the base geometric representation. For example, documents satisfying queries are highlighted in the display, enabling visual cross-referencing of the occurrence of specific words, phrases, or subtopics, with the general topics described by the collection as a whole. Colors and/or shapes can be assigned to the document glyphs in order to simultaneously display additional information about the internal properties of the documents. The system's link analysis system has been coupled to the text visualization system described here to provide additional visualization capabilities, for example the ability to view relationships between general text concepts and the locations of places mentioned in the documents as shown on concurrently displayed maps. An example of a more complex visualization incorporating the previously described text visualization is shown in FIG. 46.

Figure 46:
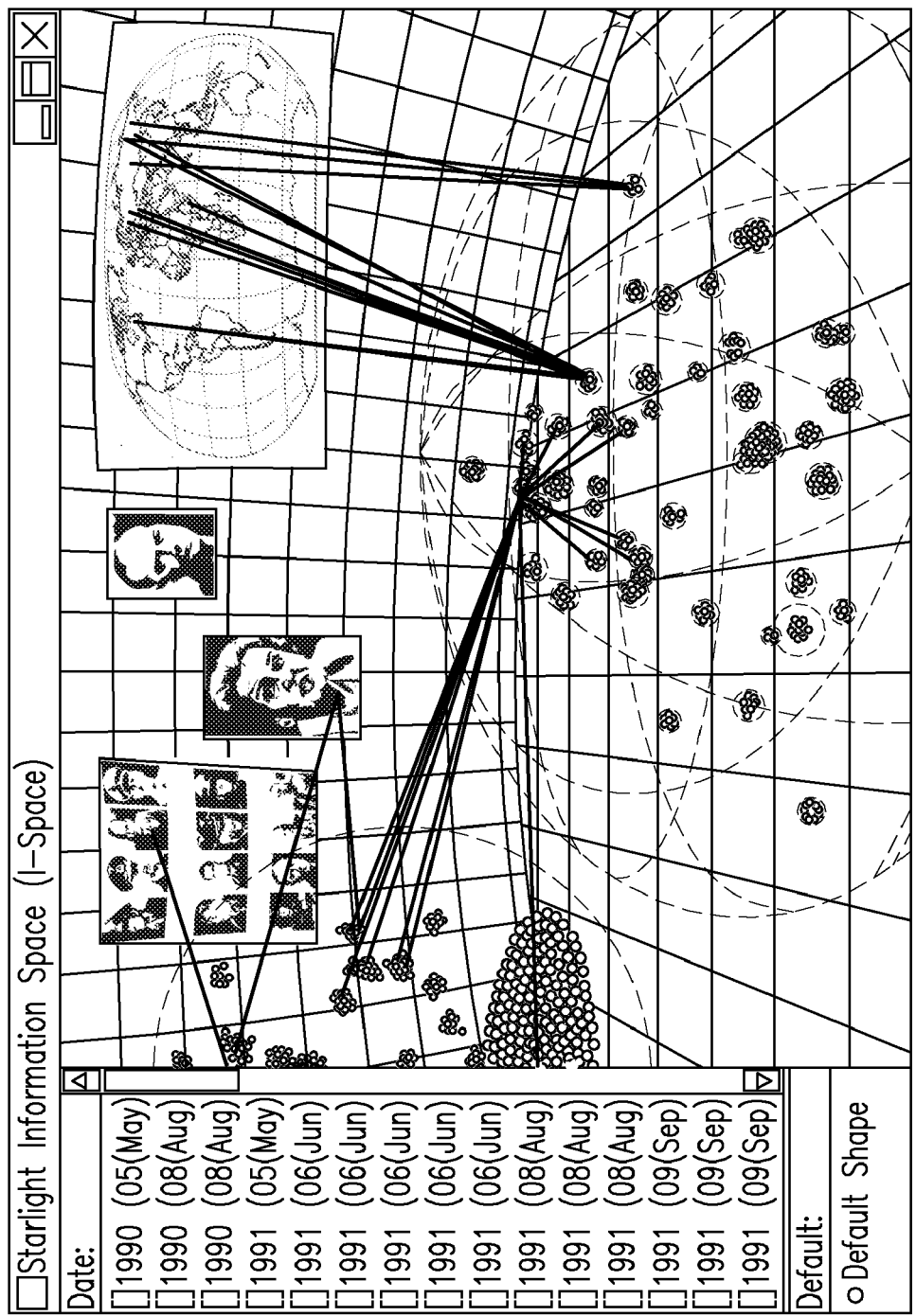
FIG. 46 is a screen shot of an Information Space display showing integration of a text visualization method, in accordance with various embodiments of the invention, with other system visualization components.

FIG. 46 is a screen capture of an Information Space display showing integration of the described text visualization method with other system visualization components.

Apparatus and Method for Visualizing and Graphically Navigating the World Wide Web These embodiments include at least three major aspects. The first is a system and method for generating graphical representations of the contents of large Internet directory structures (e.g., Yahoo, Open Directory). The visual metaphor employed for this purpose is that of a shaded-relief terrain image. The second is a design for a human-computer interface capable of supporting a variety of graphical interactions with such representations, including graphical browsing, querying, and "bookmarking" of sites or features of interest. The third is an information delivery architecture that enables Internet browser users to use such maps to browse, query, bookmark, and otherwise navigate the display to locate web sites of interest.

A system and method is provided for generating spatial representations of large quantities (10,000,000+) of web sites that organizes, depicts, and enable graphical navigation of the sites.

A system and method is provided for generating a graphical underlayment for such spatial representations, in the form of a shaded-relief terrain image, that conveys to the viewer information about the topical variability of the site distribution in an intuitive and visually compelling way.

A user interface is provided that seamlessly integrates directory, query results, and "bookmark" browsing and that enables their visual cross-referencing.

A general architecture is provided for delivering the previously described visualization components to Internet browser users that has extremely low bandwidth requirements.

Various embodiments could serve as the basis for an Internet portal, providing users with an exciting and effective new means for accessing and interacting with information on the World Wide Web.

Spatial Representation Generation

This section describes a method and apparatus for generating spatial representations of large collections of Web pages that illustrate semantic associations among the pages. Such representations can serve as guides to assist viewers in navigating to particular sites of interest, or in interpreting query results. The approach takes advantage of a priori categorization information (as embodied in Internet directory structures) in order to support the generation of meaningful graphical representations of enormous quantities of information.

The following descriptions refer to the contents and structure of the Open Directory Project (http://dmoz.org/) for illustrative purposes, but the method described here should apply equally well to any large Internet directory. The Open Directory is of special interest, however, in that it is entirely in the public domain, and has, as of this writing, recently surpassed Yahoo as the largest Internet directory on the Web.

The approach described here involves the application of a recursive layout algorithm that allocates space in the plane for each level of the directory, performs a layout of the directories in that level, then descends and processes the next level until all leaf nodes of the directory tree have been reached. The general concept is diagrammed in FIG. 47.

More particularly, FIG. 47 *a)-e)* illustrate a directory layout procedure. FIG. 47 *a)* illustrates a downprojection of directory centroids via MDS, FIG. 47 *b)* illustrates establishment of directory region areas, FIG. 47 *c)* illustrates triangulation of centroids and initialization of force-directed placement routine, and FIG. 47 *d)* results of force-directed layout. The procedure continues recursively, generating layouts for the subdirectories of the root-level directories in a similar fashion.

The specific steps in the algorithm are as follows:

1) Generate an independent set of text vectors for each root-level (e.g., "Sports" in the Open Directory) directory in the directory hierarchy using the contents of the Web pages that are referenced. As an alternative, the sum total of the text in all of the Web pages at each referenced site may be used in order to provide a more comprehensive basis for comparison. Suitable text vectors can be generated in a variety of ways, e.g., by using the Boeing Phantom Works TRUST text engine.

2) Derive vectors ("directory centroids") for each directory in the hierarchy using the previously generated Web page vectors. Starting with the leaf directories, find the mean vector of all of the text vectors in that directory and assign it to the directory. Then propagate upwards through the directory structure, generating and assigning vectors in a similar fashion using the previously generated directory vectors for the subdirectories in each (non-leaf) directory, along with the vectors for any Web pages directly referenced in that directory.

Figure 47A:
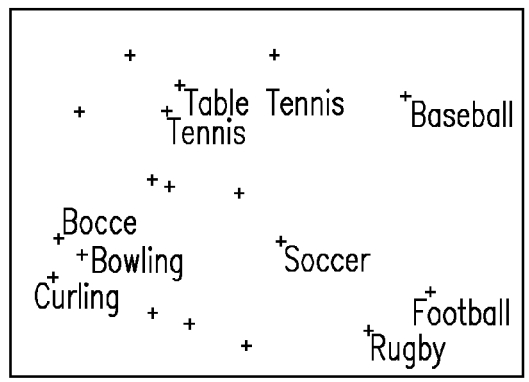
FIGS. 47a-d illustrate a directory layout procedure.

3) Starting at the root, locate each directory in the plane by down-projecting the directory centroids using a nonlinear projection method. Metric multidimensional scaling is suitable for this purpose. This generates a spatial configuration in which directories with similar content are located in near proximity (FIG. 47a).

Figure 47B:
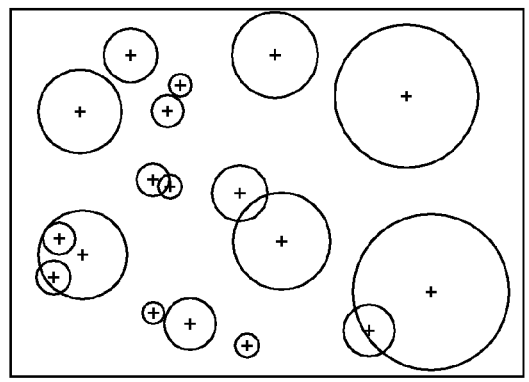

4) Next, establish a circle centered on each directory centroid with area proportional to the total number of Web pages in the directory (FIG. 47b).

Figure 47C:
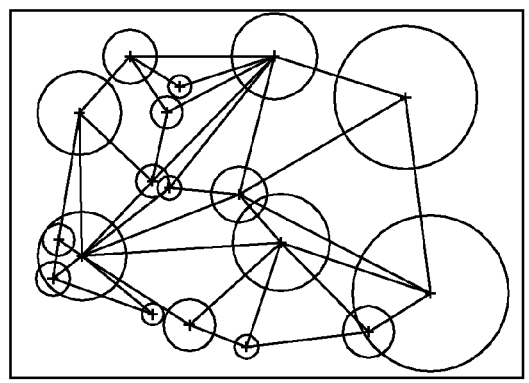

5) Form the Delaunay triangulation of the downprojected directory centroids (FIG. 47c).

Figure 47D:
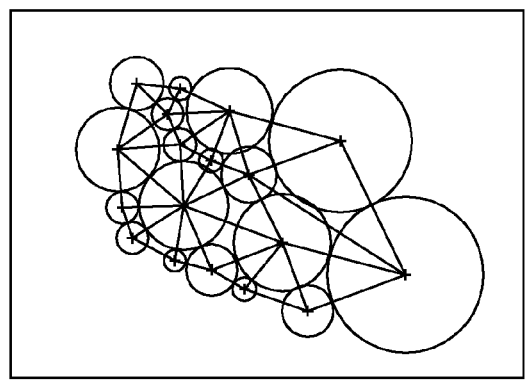

6) Using the triangulation and directory diameter information, perform a force-directed (aka "spring embedding") layout of the directory centroids. The intent is to "compact" the layout to reduce the amount of unused space in the display, while simultaneously eliminating overlap. After the system has converged on a solution, fix the centroids in place (FIG. 47d).

7) Now visit each of the previously arranged directories, in turn. Form a new coordinate system in the space provided (inscribed within the circle). If the directory is a leaf directory, downproject its associated Web pages in the allocated space and quit. Otherwise, go to Step 3 and process the subdirectories in the next level of the hierarchy. Recur as necessary.

On completion, each of the referenced Web pages in the root directory that was processed will have a corresponding point location in the plane. Further, the locations of the pages in any given directory will be arranged according to similarity of their text content, with similar pages grouped more closely together than pages that are dissimilar. Directories in the display are represented as contiguous regions, with nested directories represented as nested regions of space. Finally, the directories themselves are arranged according to similarity of content, providing a "semantic map" equating similarity of Web text content with spatial proximity.

Note that Web directory content is highly dynamic, with hundreds, if not thousands, of new Web sites being added to the typical directory on a daily basis. In addition, new directories or entire directory hierarchies may be added, deleted, or moved on an arbitrary basis. It is useful for any graphical depiction of such data be able to accommodate this change in a graceful manner. The force-directed directory layout mechanism described above provides such adaptability. The circular regions representing directories can grow or shrink, or accommodate the arbitrary addition or removal of subdirectories, and the layout can adjust accordingly. Addition or removal of individual sites from the layout could be handled in a similar fashion, via the construction of a "local" spring-embedder model for the sites in each leaf directory.

A limitation of the approach described here is related to the fact that sites (or even directories) that are in near proximity in the layout may, in fact, be unrelated. This occurs principally at directory boundaries, where sites located in different directory regions may actually end up spatially adjacent. The consequence of this effect is that viewers may infer semantic relationships among sites based on their proximity which do not exist.

To offset this tendency, additional visual cues are employed, in some embodiments, to counteract the effects of the Gestalt proximity grouping principle. The inventors suggest that Palmer's postulated Gestalt grouping principles of Common Region and Uniform Connectedness can be employed to offset this effect. In the illustrated embodiment, this is accomplished by generating a "pseudoterrain" underlayment that provides boundary cues demarcating regions of differing content. First, a grid of arbitrary resolution is established over the layout. Then, a "pseudoelevation" value is determined for each grid cell by computing the variance of all of the page vectors within an arbitrary, fixed radius of the cell. Note that the directory vectors are not used in this procedure. After the variance values have been determined, a polynomial surface is fit to them. The intent is to generate a response surface of the conceptual variance among the text vectors in which "high" areas correspond to high levels of variance and "low" or "flat" areas correspond to regions of generally similar content. When overlain with the site/directory distribution, the response surface will show delineating "ridges" between areas of disparate content, while areas of similar content will appear as broad planes. In some embodiments, the counterbalancing grouping effects of this "pseudoterrain" is enhanced or otherwise adjusted through judicious selection of height function and use of color.

To add an additional degree of visual interest, a terrain erosion/deposition model may be applied to the text variability response surface. The erosion/deposition model will generate simulated stream channels, outwash fans, etc., adding an additional degree of "realism" and visual texture to the display. Further, predefined stream locations (possibly calculated to further reinforce Gestalt grouping tendencies) can be used to seed the erosion/deposition model to ensure the model produces the desired results. The end result of this process is a more compelling and richer visual framework (i.e., the generation of literal "landmarks") capable of assisting mental recall and recognition of particular regions of interest.

Figure 48:
FIG. 48 is a screen shot of an example of a representation of the output of a site/directory layout and pseudoterrain generation procedures.

After the final surface has been generated, a shaded-relief image of the pseudoterrain model is generated, and the previously generated site and directory distribution is plotted on top of it. An example of an illustration of the final output of the procedure is shown in FIG. 48. FIG. 48 is an example of a representation of the output of the site/directory layout and pseudoterrain generation procedures. Note that not all directory labels or site locations are displayed in this view. In some embodiments, red flags represent user "bookmarked" sites ("sitemarks"), and white circles correspond to query results.

User Interface Design

The previously described representation generation method is capable of calculating spatial layouts for, for example, thousands of directories containing millions of individual Web pages. A single image that attempts to simultaneously portray all of this information may be uninterpretable. The solution, in some embodiments, is to limit the complexity of the information display at any given moment to just those things that are germane to the particular task the user is currently engaged in.

For the task of browsing, a common (particularly in the GIS and computer mapping community) and effective technique is that of progressive refinement. In the present context, progressive refinement is caused to work as follows. Initially, the user is presented with a "high altitude" overview image showing the "landscape" at a relatively small scale (i.e., showing a large area). The display includes only the shaded pseudoterrain and a few high-level directory labels. Selected (based, for example, on prespecified user interests) mid-level directory labels might also be shown at this point. The user selects a region to browse in more detail by clicking-and-dragging to specify a bounding box about his or her subregion of interest. The view in the main window at that point will "zoom" to display the selected region in more detail. Additional (sub) directory labels will appear, the pseudoterrain will appear more detailed, etc. At this point, the user could elect to scroll the view laterally to browse adjacent regions at the same level of detail, or zoom further to reveal additional detail. On continued zooming, eventually individual site icons would appear. The user could elect to "brush" the icons to reveal further information about the Web pages they reference (e.g., the title of the page and/or its synopsis), or click on them to navigate to them directly.

In some embodiments, to prevent the user from getting "lost", a generalized location map would be provided in an adjacent window. The location map would show the size and position of the view shown in the main window as a small rectangle. The location map could be used as an alternate navigation tool by providing the ability to "move" the view shown in the main window to another area simply by dragging the rectangle in the location map.

A useful feature of the system described here is support for the ability to run a query against the text of the component Web pages in order to generate a display showing the locations of the pages that satisfy the query. This is illustrated in FIG. 48. In this way, the locations of the query results with respect to the overall semantic "framework" could be used to guide browsing of the results. For example, a query for the occurrence of the word "salsa" would likely generate hits in pages discussing the condiment, the dance, salsa music. If what the user was actually interested in was recipes for salsa (the condiment), he or she can zoom directly to the "food" region to browse just the query results in that area, bypassing irrelevant material that would otherwise have to be waded through using existing Internet query tools.

Another useful feature is the ability to establish "sitemarks" to mark particular sites of interest for later revisiting. The use of such features provides a number of distinct enhancements to the "bookmarking" features supported by standard browsers. In particular, while bookmarks are semantically organized in to a hierarchy by the user, sitemarks would be located within the overall semantic framework of the Web directory as a whole, providing an alternative method for finding and navigating to previously selected sites of interest. Further, the ability to be able to simultaneously visually cross-reference the locations of known sites of interest with those of unknown sites and the locations of specific query results within the overall semantic structure of the information provide powerful and exciting methods for accessing and exploiting information on the World Wide Web.

Delivery Mechanism

Figure 49:
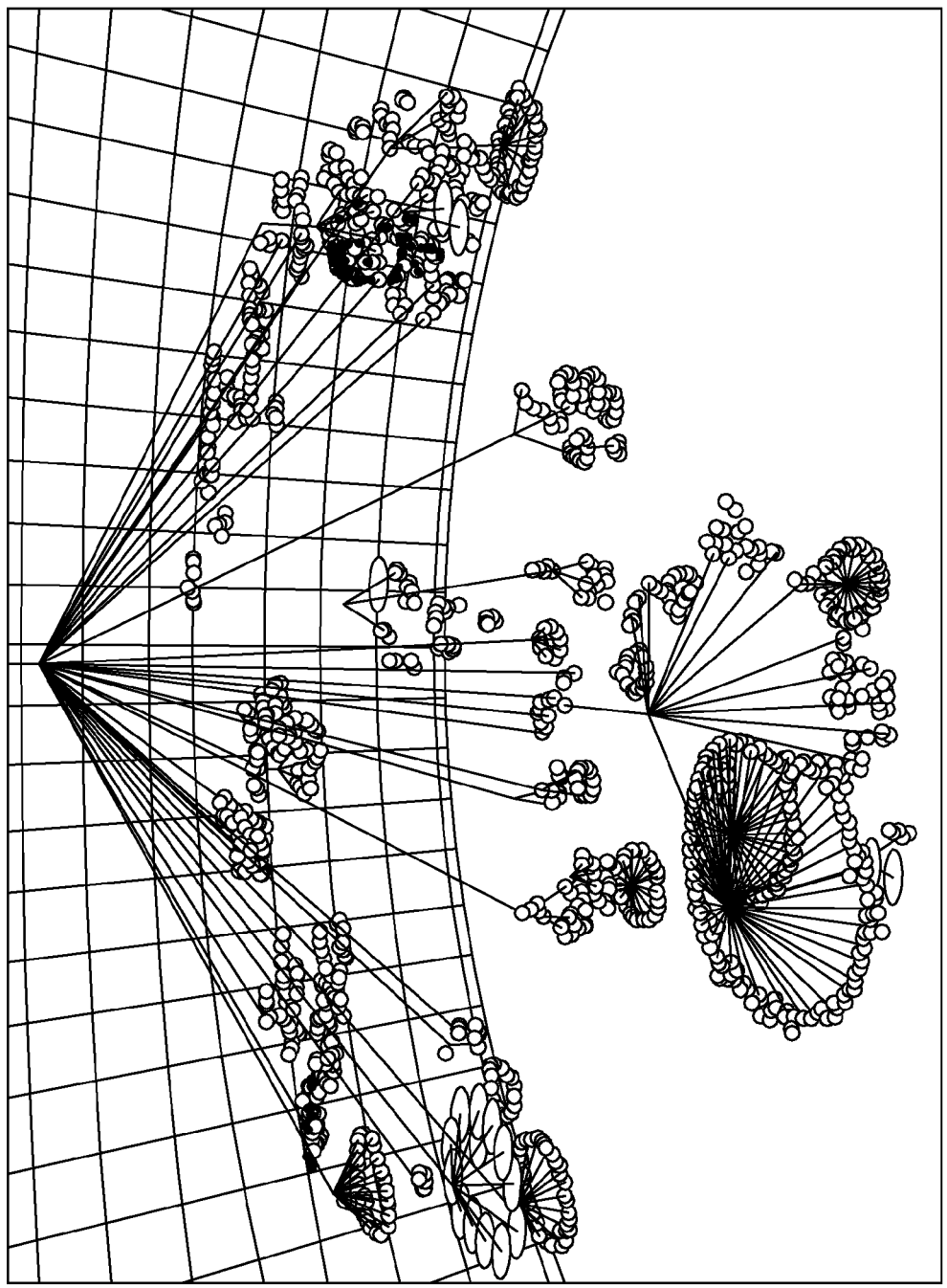
FIG. 49 is a screen shot of a "pan-tree" representation of a large Windows directory in accordance with embodiments for visualizing hierarchies.

The visualization system and method described here naturally lends itself to high-speed delivery over the Internet. Conceptually, the various components of the visualization design can be divided into several different layers, as shown in FIG. 49. FIG. 49 is a representation of invention components. The display components can be grouped into two classes, a) the pseudoterrain raster image layer, and b) the vector layers that are plotted over the raster.

These layers can be grouped into two distinct classes, namely the pseudoterrain image layer, and the symbol and label layers that are plotted on top of the pseudoterrain. With the exception of the image layer, the remaining components of the display have extremely low bandwidth transmission requirements, as they are defined generally of just xy coordinate and feature attribute information. Additionally, at any given moment, a particular user is likely to require only a very limited subset of this information. As a consequence, server loads on any system implementation are relatively light.

The pseudoterrain image layer is another matter. To effectively delineate the separate regions of the display, as well as to provide a rich, compelling, and intriguing user experience, an extensive graphical "region" is provided to the user, in the preferred embodiment. This requirement translates into an image many thousands of pixels on a side. The conventional options for delivering an image of this size to a user are either to require the user to download the whole thing up front, or to serve up various image "tiles" a few at a time based on user interactions. Both options impose unacceptable bandwidth requirements.

The solution employed in various embodiments of the system 10 is to require a one-time initial download of a wavelet-compressed "master" image, then serve up the wavelet coefficients needed to uncompress selected subregions based on user interactions. These coefficients are cached, in some embodiments, for later reuse as people tend to return to the same regions of interest. They are also pre-fetched, in some embodiments, to further improve interaction speed. The commercial "Mr. SID" wavelet-based image compression/decompression SDK is suitable for this purpose, for example.

System and Method for Visualizing (e.g., Very Large) Hierarchies

These embodiments relate to graphically representing the structure and properties of large collections of hierarchically organized information, such as large computer file directory structures or Web directories such as "Yahoo." These representations enable rapid assessment of the overall form, depth and contents of such structures.

The server 26 takes as input data records with a field that identifies the position of the record in the hierarchy. This field, or path element, defines a path that uniquely identifies the position of the record in the hierarchy. Each node of the hierarchy (e.g., a directory in a file directory structure) is represented by a corresponding label in the path element, with the labels separated by arbitrary delimiter characters. For example, a path element corresponding to the location of a file in a Windows directory structure could be represented using the standard Windows™ file path convention, e.g., "C:\Program Files\Napster\My Music\song.mp3." In this example, the delimiter separating the various nodes of the hierarchy is the backslash character ("\"). This approach is very flexible, and can be used with a wide range of conventional hierarchy specification methods, such as document section labels (e.g., "AR 2001-127-18A") or computer IP addresses (e.g., "128.17.337.12").

The system 10 graphically represents the structure of the hierarchy and the location of the data within the hierarchy based on the previously described path data. Each branch of the hierarchy has a representative node displayed as a glyph in the display at each level. A branch node may have a corresponding data record that describes other (i.e., non-hierarchical) properties of the branch.

In the illustrated embodiment, branch nodes corresponding to the same level of the hierarchy are arranged radially in the lateral direction in 3D space. Child branch nodes are arranged in a similar fashion directly beneath their common parent. Branch nodes are connected by 3D arcs or lines to, for example, clearly portray the hierarchical relationships among the display elements. An appropriate amount of space is allocated on the periphery of each level of the diagram according to the size of the sub-tree corresponding to the associated node. In the illustrated embodiment, certain large sub-trees are lowered beneath the smaller ones, enabling the radius of the parent level to be reduced, generating a more compact representation and improving interpretability. In some embodiments, branch nodes are labeled with descriptive terms identifying the level within the branch. The display of these labels can be manually or automatically controlled so that the labels do not clutter the view unnecessarily.

Records that have a path terminating at a given level/node are displayed as glyphs arranged generally circularly on a pan located immediately beneath the node. This organization keeps records in a pan visibly separate from any nodes that are contained within the same level or other levels in the branch, and enables spatial compression of the overall structure (and hence, an increase in the information density of the display) with no corresponding loss in interpretability. Within each pan, descriptive labels are generated for each record. These labels display the content of the fields of a record. The displayed label can be selected from any field within the record. The display of each label can be individually controlled.

Colors and/or shapes can be selectively assigned to the hierarchy node and record glyphs to simultaneously display information about the internal properties of the records. The system 10, in some embodiments, is capable of providing the hierarchical representation described here as well as or in addition to the other visualizations described above. For example, this enables the display of relationships between individual records in the hierarchy and the geographic locations of places referenced in the record, shown on concurrently displayed maps.

The visualization display of these embodiments incorporates several interactive capabilities that increase the value and utility of the base geometric representation. In some embodiments, the entire display is selectively automatically rotated about a vertical axis in order to improve interpretation of its 3D structure by inducing the effect of motion parallax. The contents of individual records in the display can be accessed via graphical selection. An open item is emphasized in the visualization display by blinking its glyph so that the opened item may be understood in context with the other record items to which it is hierarchically related. In addition, the glyphs associated with records that satisfy arbitrary queries are highlighted in the visualization display, enabling visual cross-referencing of the occurrence of specific attributes (field values in the records), words, phrases, and/or subtopics with hierarchical placement of the record within the collection. In some embodiments, queries can also be specified based on the hierarchical relationships between items (e.g., retrieve the entire contents of a particular pan or sub-tree), as well as based on the internal properties of individual data (record) items. Further, the paths and branch node labels along the paths leading to the items satisfying queries are also highlighted, enabling rapid determination of the exact location of the query results within the hierarchy. In some embodiments, a "lazy Susan" interface enables a user to rotate a selected pan (along with other pans in the selected sub-tree) by "grabbing" it with the mouse cursor and dragging it laterally. This enables the user to naturally and dynamically bring into view different pieces of the hierarchy that may otherwise be obscured.

By collecting leaf nodes into "pans" (rather than arranging them around the periphery of the base of a cone) the overall size and graphical complexity of the display is substantially reduced. Further display simplification is achieved by allocating variable arc sizes within a given level of the hierarchy based on the sizes of the sub-trees at that level, and by "dropping" certain large sub-trees to free additional space in the levels above. This results in a display that is more easily interpreted and capable of accommodating at least an order of magnitude more items. Another important difference between the present visualization design and preexisting designs is the use of highlighting to draw attention to not only the records that satisfy a query, but also the hierarchical path to those items. Finally, the "lazy Susan" graphical interaction for moving selected sub-tree towards the user's viewpoint is more effective and intuitive than other methods.

FIG. 49 is a "pan-tree" representation of a large Windows directory structure as displayed using the embodiments described herein. The root directory contains, for example, approximately 400 subdirectories and 15,000 files. The files in this view are selectively color-coded according to attributes. For example, in the embodiment of FIG. 49, files are color coded based on file extension: image files are green, executable files are yellow, text documents are blue, etc.

Figure 50:
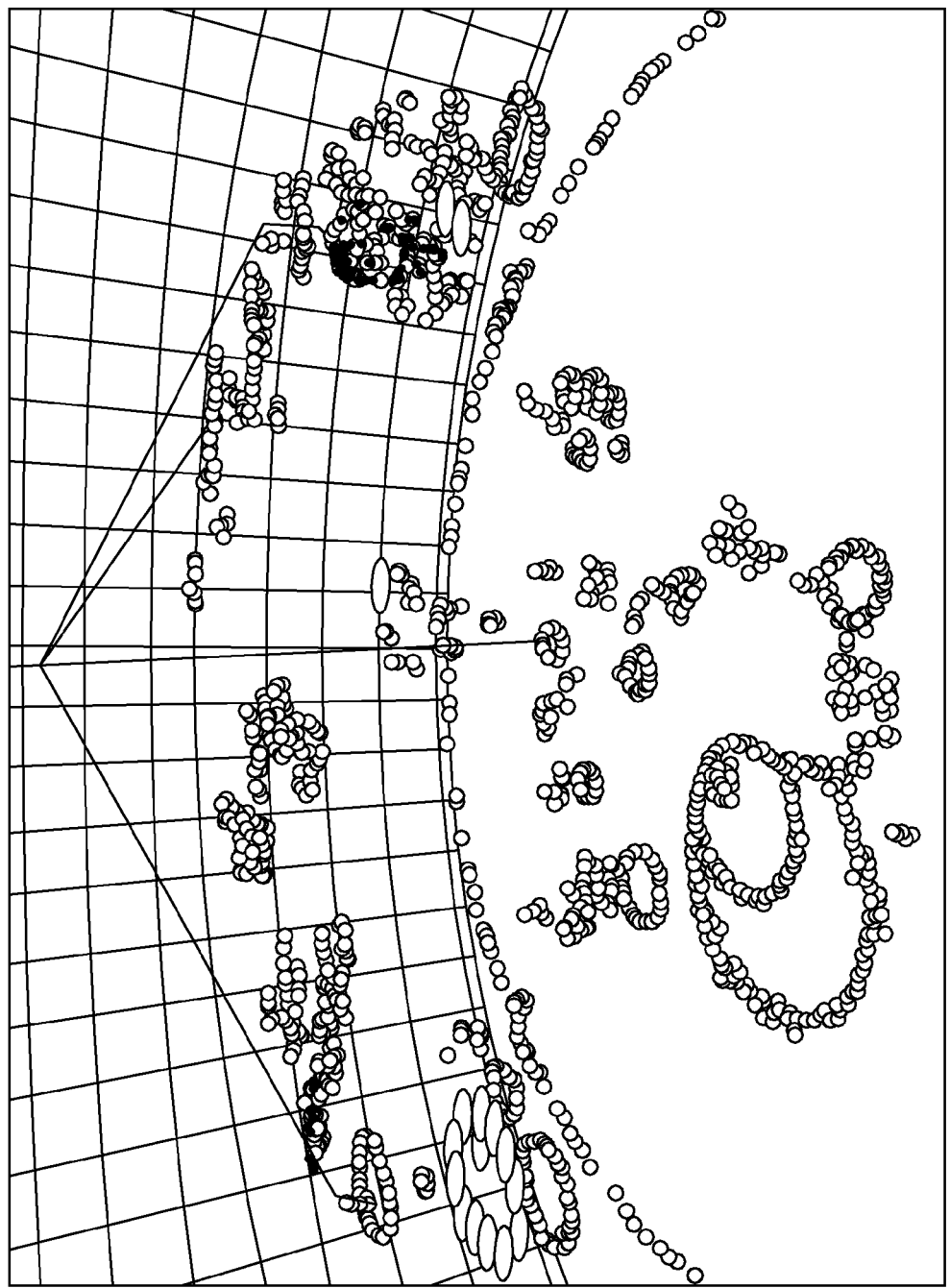
FIG. 50 is a screen shot of the pan-tree of FIG. 49 after a query.

FIG. 50 is a view of the pan-tree of FIG. 49 after a query. For example, in the illustrated embodiment, FIG. 49 is a view of the pan-tree of FIG. 49 after a query for all files with a specific creation date.

Various embodiments of the invention include computer storage media bearing computer program code configured to perform the various functions described above when loaded in a computer. The computer storage media could be or include a floppy drive, CD, optical disk, hard drive, storage array, remote storage, any kind of RAM or ROM such as EPROM or RAM or ROM included in a processor, or any other kind of memory capable of storing computer program code. In the illustrated embodiment, the computer storage media can be defined by the server shown in FIG. 1. In other embodiments of the invention, a carrier wave embodies computer program code configured to perform the various functions described above.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

The invention claimed is:

1. A text visualization method comprising:
receiving vectors that characterize conceptual content of a plurality of text documents, each document being represented by a vector of arbitrary length; and
displaying a multi-dimensional representation of the document collection that conveys information about topics and subtopics described by the plurality of text documents, each document being represented by a multi-dimensional glyph, the displaying including sorting the glyphs into groups and arranging the groups into clusters, and deriving centroids of clusters and down-projecting the centroids, such that clusters containing documents that are conceptually similar are located together in near proximity.

2. A method in accordance with claim 1 and further comprising color coding a glyph to convey information about properties of the document represented by that glyph.

3. A method in accordance with claim 1 and further comprising shape coding a glyph to convey information about properties of the document represented by that glyph.

4. A method in accordance with claim 1 and further comprising displaying labels for respective clusters, the labels including descriptive terms respectively generally describing the content of the clusters.

5. A method in accordance with claim 1 wherein the displaying comprises generating a three dimensional spatial representation for viewing on a generally two dimensional monitor.

6. A method in accordance with claim 5 and comprising, after arranging the groups into clusters, deriving centroids of clusters and down-projecting the centroids to three dimensions using Sammon's Mapping.

7. A method in accordance with claim 6 and comprising, after deriving centroids of clusters and down-projecting the centroids to three-dimensions, establishing a new local coordinate system at the location of each cluster centroid, scaled according to the number of vectors in the cluster, and down-projecting the document vectors within each cluster into these coordinate systems in isolation from the vectors contained in other clusters.

8. A method in accordance with claim 1 and comprising, after deriving centroids of clusters and down-projecting the centroids to three dimensions using multidimensional scaling (MDS), establishing a new local coordinate system at the location of each cluster centroid, scaled according to the number of vectors in the cluster, and downprojecting the document vectors within each cluster into these coordinate systems in isolation from the vectors contained in other clusters.

9. A method in accordance with claim 1 wherein the displaying comprises using a neural network to organize the vectors.

10. A method in accordance with claim 1 and comprising mapping the vectors using a growing neural gas algorithm and determining the minimal spanning tree of nodes generated by the neural gas algorithm.

11. A text visualization method comprising:
generating vectors that characterize conceptual content of a plurality of text documents, each document being represented by a vector of arbitrary length; and displaying a multi-dimensional representation of the document collection that conveys information about topics and sub-topics described by the plurality of text documents, each document being represented by a multi-dimensional glyph, the glyphs being sorted into groups and the groups being arranged into clusters, and centroids of clusters being derived and the centroids being down-projected, such that clusters containing documents that are conceptually similar are located together in near proximity.

12. A method in accordance with claim 11 and further comprising color coding a glyph to convey information about properties of the document represented by that glyph.

13. A method in accordance with claim 11 and further comprising shape coding a glyph to convey information about properties of the document represented by that glyph.

14. A method in accordance with claim 11 and further comprising displaying labels for respective clusters, the labels including descriptive terms respectively generally describing the content of the clusters.

15. A method in accordance with claim 11 wherein the displaying comprises generating a three dimensional spatial representation for viewing on a generally two dimensional monitor.

16. A method in accordance with claim 15 and comprising, after arranging the groups into clusters, deriving centroids of clusters and down-projecting the centroids to three dimensions using Sammon's Mapping.

17. A method in accordance with claim 16 and comprising, after deriving centroids of clusters and down-projecting the centroids, establishing a new local coordinate system at the location of each cluster centroid, scaled according to the number of vectors in the cluster, and downprojecting the document vectors within each cluster into these nested coordinate systems in isolation from the vectors contained in other clusters.

18. A method in accordance with claim 11 and comprising, after deriving centroids of clusters and down-projecting the centroids to three dimensions using multidimensional scaling (MDS), establishing a new local coordinate system at the location of each cluster centroid, scaled according to the number of vectors in the cluster, and downprojecting the document vectors within each cluster into these nested coordinate systems in isolation from the vectors contained in other clusters.

19. A computer readable medium embodying computer program code which, when loaded in a computer, causes the computer, in operation, to:
receive vectors that characterize conceptual content of a plurality of text documents, each document being represented by a vector of arbitrary length; and display a multi-dimensional representation of the document collection that conveys information about topics and sub-topics described by the plurality of text documents, each document being represented by a multi-dimensional glyph, the displaying including sorting the glyphs into groups and arranging the groups into clusters, wherein the computer program code is further configured to derive centroids of clusters and down-project the centroids, such that clusters containing documents that are conceptually similar are located together in near proximity.

20. A computer readable medium in accordance with claim 19 wherein the computer program code is further configured to cause the computer to selectively color code a glyph to convey information about properties of the document represented by that glyph.

21. A computer readable medium in accordance with claim 19 wherein the computer program code is further configured to cause the computer to selectively shape code a glyph to convey information about properties of the document represented by that glyph.

22. A computer readable medium in accordance with claim 19 wherein the computer program code is further configured to cause the computer to display labels for respective clusters, the labels including descriptive terms respectively generally describing the content of the clusters.

23. A computer readable medium in accordance with claim 19 wherein the displaying comprises generating a three dimensional spatial representation for viewing on a generally two dimensional monitor.

24. A computer readable medium in accordance with claim 23 wherein the computer program code is further configured to, after arranging the groups into clusters, derive centroids of clusters and down-project the centroids to three dimensions using Sammon's Mapping.

25. A computer readable medium in accordance with claim 24 wherein the computer program code is further configured to, after deriving centroids of clusters and down-projecting the centroids to three-dimensions, establish a new local coordinate system at the location of each cluster centroid, scaled according to the number of vectors in the cluster, and down-project the document vectors within each cluster into these coordinate systems in isolation from the vectors contained in other clusters.

26. A computer readable medium in accordance with claim 19 wherein the computer program code is further configured to, after deriving centroids of clusters and down-projecting the centroids to three dimensions using multidimensional scaling (MDS), establish a new local coordinate system at the location of each cluster centroid, scaled according to the number of vectors in the cluster, and downproject the document vectors within each cluster into these coordinate systems in isolation from the vectors contained in other clusters.

27. A computer readable medium in accordance with claim 19 wherein the displaying comprises using a neural network to organize the vectors.

28. A computer readable medium in accordance with claim 19 wherein the computer program code is further configured to map the vectors using a growing neural gas algorithm and determine the minimal spanning tree of nodes generated by the neural gas algorithm.

* * * * *